US012766728B2

(12) United States Patent
Hamilton et al.

(10) Patent No.: US 12,766,728 B2
(45) Date of Patent: Oct. 20, 2026

(54) LARGE OBJECT ROBOTIC FRONT LOADING ALGORITHM

(71) Applicant: Clutterbot, Inc., Claymont, DE (US)

(72) Inventors: Justin David Hamilton, Wellington (NZ); Jack Alexander Bannister-Sutton, Wellington (NZ); Bryden James Frizzell, Wellington (NZ)

(73) Assignee: Clutterbot, Inc., Claymont, DE (US)

( * ) Notice: Subject to any disclaimer, the term of this patent is extended or adjusted under 35 U.S.C. 154(b) by 630 days.

(21) Appl. No.: 18/045,735

(22) Filed: Oct. 11, 2022

(65) Prior Publication Data

US 2023/0116896 A1 Apr. 13, 2023

Related U.S. Application Data

(60) Provisional application No. 63/253,867, filed on Oct. 8, 2021, provisional application No. 63/253,812, filed on Oct. 8, 2021.

(51) Int. Cl.

*B25J 9/16* (2006.01)
*B66F 9/06* (2006.01)
(Continued)

(52) U.S. Cl.

CPC ............. *B25J 9/1687* (2013.01); *B25J 9/162* (2013.01); *B25J 9/163* (2013.01); *B25J 9/1666* (2013.01);
(Continued)

(58) Field of Classification Search

CPC . B25J 9/1687; B25J 9/162; B25J 9/163; B25J 9/1666; B25J 9/1612; B25J 5/00;
(Continued)

(56) References Cited

U.S. PATENT DOCUMENTS 6,338,013 B1 1/2002 Ruffner
6,810,305 B2 10/2004 Kirkpatrick, Jr.
(Continued)

FOREIGN PATENT DOCUMENTS

AU 2015218522 A1 * 9/2015 ............ B25J 11/009
AU 2020101865 A4 10/2020
(Continued)

OTHER PUBLICATIONS

Bahl, Laavanye et al. "CuBi: A Decluttering Robot ". Dec. 2018. Retrieved from the Internet (Year: 2018).*
(Continued)

*Primary Examiner* — Ramon A. Mercado
*Assistant Examiner* — Tyler Roger Robarge
(74) *Attorney, Agent, or Firm* — Carnelian Law, LLC

(57) ABSTRACT

A method and system are herein disclosed wherein a robot handles objects that are large, unwieldy, highly-deformable, or otherwise difficult to contain and carry. The robot is operated to navigate an environment and detect and classify objects using a sensing system. The robot determines the type, size and location of objects and classifies the objects based on detected attributes. Grabber pad arms and grabber pads move other objects out of the way and move the target object onto the shovel to be carried. The robot maneuvers objects into and out of a containment area comprising the shovel and grabber pad arms following a process optimized for the type of object to be transported. Large, unwieldy, highly deformable, or otherwise difficult to maneuver objects may be managed by the method disclosed herein.

20 Claims, 38 Drawing Sheets

(51) Int. Cl.
*B66F 9/075* (2006.01)
*B66F 9/24* (2006.01)

(52) U.S. Cl.
CPC ............ *B66F 9/063* (2013.01); *B66F 9/0755* (2013.01); *B66F 9/24* (2013.01)

(58) Field of Classification Search
CPC ......... B25J 13/08; B66F 9/063; B66F 9/0755; B66F 9/24; G05B 2219/39473; G05B 2219/39536; G05B 2219/40499
See application file for complete search history.

(56) References Cited

U.S. PATENT DOCUMENTS

| | | | | |
|---|---|---|---|---|
| 9,089,969 | B1 | 7/2015 | Theobald | |
| 9,827,677 | B1 | 11/2017 | Gilbertson et al. | |
| 9,827,678 | B1 * | 11/2017 | Gilbertson | A47L 11/4055 |
| 10,207,408 | B1 * | 2/2019 | Ebrahimi Afrouzi | B25J 9/1676 |
| 11,020,858 | B2 | 6/2021 | Amacker et al. | |
| 11,407,118 | B1 | 8/2022 | Augenbraun et al. | |
| 11,409,296 | B1 | 8/2022 | Kim et al. | |
| 11,720,117 | B1 | 8/2023 | Kim et al. | |
| 11,789,457 | B1 | 10/2023 | Woo et al. | |
| 12,064,880 | B2 | 8/2024 | Hamilton et al. | |
| 12,287,639 | B1 | 4/2025 | Queiroz et al. | |
| 12,310,545 | B1 | 5/2025 | Hamilton | |
| 2002/0116089 | A1 | 8/2002 | Kirkpatrick, Jr. | |
| 2006/0116973 | A1 | 6/2006 | Okamoto et al. | |
| 2007/0239315 | A1 * | 10/2007 | Sato | B25J 9/1612 700/245 |
| 2009/0137348 | A1 | 5/2009 | Tsai | |
| 2016/0260161 | A1 | 9/2016 | Atchley et al. | |
| 2017/0329333 | A1 | 11/2017 | Passot et al. | |
| 2018/0104815 | A1 * | 4/2018 | Yang | B25J 11/0085 |
| 2018/0284792 | A1 | 10/2018 | Kleiner et al. | |
| 2018/0312095 | A1 | 11/2018 | Eletrabi | |
| 2018/0329425 | A1 * | 11/2018 | Watts | G05D 1/0297 |
| 2019/0217476 | A1 * | 7/2019 | Jiang | G05D 1/0274 |
| 2020/0026301 | A1 | 1/2020 | Taylor | |
| 2020/0086182 | A1 | 3/2020 | New et al. | |
| 2020/0156246 | A1 * | 5/2020 | Srivastav | G06V 10/82 |
| 2020/0279436 | A1 | 9/2020 | Bleyer et al. | |
| 2020/0376675 | A1 | 12/2020 | Bai et al. | |
| 2021/0038950 | A1 | 2/2021 | Sullivan | |
| 2021/0069904 | A1 * | 3/2021 | Duan | B25J 9/161 |
| 2021/0128989 | A1 | 5/2021 | Legg et al. | |
| 2021/0132213 | A1 | 5/2021 | Advani et al. | |
| 2021/0138311 | A1 | 5/2021 | Wang et al. | |
| 2021/0339393 | A1 * | 11/2021 | Dan | B25J 5/007 |
| 2021/0373560 | A1 | 12/2021 | Koga et al. | |
| 2022/0168893 | A1 * | 6/2022 | Hamilton | G05D 1/0274 |
| 2022/0171907 | A1 * | 6/2022 | Chang | G06N 3/047 |
| 2022/0253056 | A1 | 8/2022 | Ranjan et al. | |
| 2022/0398775 | A1 | 12/2022 | Streem et al. | |
| 2023/0015751 | A1 | 1/2023 | Serackis et al. | |
| 2023/0116896 | A1 | 4/2023 | Hamilton et al. | |
| 2023/0206755 | A1 | 6/2023 | Jha et al. | |
| 2023/0401837 | A1 | 12/2023 | Yan et al. | |
| 2024/0142994 | A1 | 5/2024 | Ebrahimi Afrouzi | |
| 2024/0192690 | A1 | 6/2024 | Ebrahimi Afrouzi et al. | |
| 2024/0218863 | A1 | 7/2024 | Eletrabi et al. | |
| 2024/0292990 | A1 | 9/2024 | Hamilton | |
| 2024/0424355 | A1 | 12/2024 | Zhang et al. | |
| 2024/0428560 | A1 | 12/2024 | Buerkle et al. | |

FOREIGN PATENT DOCUMENTS

| | | | | |
|---|---|---|---|---|
| AU | 2022360549 | A1 | 5/2024 | |
| CN | 202526850 | U | 11/2012 | |
| CN | 107137890 | A | 9/2017 | |
| CN | 107378958 | A | 11/2017 | |
| CN | 107650147 | A | 2/2018 | |
| CN | 108217183 | A * | 6/2018 | B65G 47/902 |
| CN | 108786065 | A | 11/2018 | |
| CN | 110558900 | A | 12/2019 | |
| CN | 210616549 | U | 5/2020 | |
| CN | 111633627 | A | 9/2020 | |
| CN | 112828847 | A | 5/2021 | |
| CN | 114468859 | A | 5/2022 | |
| CN | 218552245 | U | 3/2023 | |
| CN | 116616642 | A | 8/2023 | |
| CN | 116709962 | A * | 9/2023 | B25J 11/008 |
| CN | 117442132 | A | 1/2024 | |
| DE | 102017112740 | A1 | 12/2018 | |
| EP | 1942223 | B1 | 7/2008 | |
| EP | 3766591 | A1 | 1/2021 | |
| JP | 2019092999 | A | 6/2019 | |
| JP | 2020138046 | A | 9/2020 | |
| JP | 2023052271 | A | 4/2023 | |
| KR | 1020190130941 | | 11/2019 | |
| KR | 20200126036 | A | 11/2020 | |
| KR | 20230139407 | A | 10/2023 | |
| KR | 20240133919 | A | 9/2024 | |
| WO | 2012103525 | A2 | 8/2012 | |
| WO | 2016105702 | A1 | 6/2016 | |
| WO | 2019126332 | A1 | 6/2019 | |
| WO | 2020071669 | A1 | 4/2020 | |
| WO | 2020190272 | A1 | 9/2020 | |
| WO | 2022029730 | A1 | 2/2022 | |
| WO | 2022115761 | A1 | 6/2022 | |
| WO | 2023031620 | A1 | 3/2023 | |
| WO | 2023060285 | A1 | 4/2023 | |
| WO | 2023110103 | A1 | 6/2023 | |
| WO | 2025184405 | A1 | 9/2025 | |

OTHER PUBLICATIONS

Bahl, Laavanye et al. "CuBi: Room De cluttering Robot". May 2019. Retrieved from the Internet (Year: 2019).*

Dimitrios et al., "CuBi: A Decluttering Robot Conceptual Design Review," 2018. Accessed: Jan. 19, 2026. [Online]. Available: https://mrsdprojects.ri.cmu.edu/2018teamd/wp-content/uploads/sites/34/2019/02/TeamD_CoDR.pdf (Year: 2018).*

Changsheng Shen (Bobby), "CMU MRSD 2020: Team D—CuBi—A Decluttering Robot," YouTube, Dec. 10, 2019. https://www.youtube.com/watch?v=IA-MaF_m8QA (accessed Jan. 19, 2026). (Year: 2019).*

PCT/US2021/061143 International Search Report Feb. 8, 2022.

PCT/US2021/061143 Written Opinion of the International Searching Authority Feb. 6, 2022.

Bahl, CuBi: Room Decluttering Robot May 2019 pp. 1-29 (chromeextension://efaidnbmnnnibpcajpcglclefindmkaj/ https://mrsdprojects. ri.cmu.edu/2018teamd/wpcontent/uploads/sites/34/2019/12/TeamD_FinalReport 10.pdf).

U.S. Appl. No. 63/253,867, filed Oct. 8, 2021, Justin David Hamilton, Entire Document.

FSP2024PCT PCT/US2022/077917 International Search Report dated Jan. 25, 2023.

FSP2024PCT PCT/US2022/077917 Written Opinion of the ISA Date of Mailing Jan. 25, 2023.

Official Action Translation from Japanese Patent Office dated Apr. 2, 2024 for application JP 2023-533262 100107766.

Gonzalez et al., Multi-Li DAR Mapping for Scene Segmentation in Indoor Environments for Mobile Robots, May 2022, MDPI, pp. 1-19. (Year: 2022).

U.S. Appl. No. 63/119,533, filed Nov. 30, 2020, Justin David Hamilton, Entire Document.

Canberk Alper et al: "Cloth Funnels: Canonicalized-Alignment for Multi-Purpose Garment Manipulation", 2023 IEEE International Conference on Robotics and Automation (ICRA), IEEE, May 29, 2023 (May 29, 2023), pp. 5872-5879.

Guanqi Chen et al: "Language-Augmented Symbolic Planner for Open-world Task Planning", arxiv.org, Cornell University Library, Jul. 13, 2024.

PCT/US25/43792, International Search Report, Dec. 10, 2025.

PCT/US25/43792, Written Opinion, Dec. 10, 2025.

PCT/US25/43802, International Search Report, Dec. 16, 2025.

PCT/US25/43802, Written Opinion, Dec. 16, 2025.

(56) References Cited

OTHER PUBLICATIONS

PCT/US25/43805, International Search Report, Dec. 16, 2025.
PCT/US25/43805, Written Opinion, Dec. 16, 2025.
PCT/US25/44087, International Search Report, Jan. 8, 2026.
PCT/US25/44087, Written Opinion, Jan. 8, 2026.
PCT/US25/44271, International Search Report, Jan. 5, 2026.
PCT/US25/44271, Written Opinion, Jan. 5, 2026.
PCT/US25/44310, International Search Report, Nov. 27, 2025.
PCT/US25/44310, Written Opinion, Nov. 27, 2025.
PCT/US25/44316, International Search Report, Jan. 8, 2026.
PCT/US25/44316, Written Opinion, Jan. 8, 2026.
PCT/US25/44322, International Search Report, Dec. 11, 2025.
PCT/US25/44322, Written Opinion, Dec. 11, 2025.
PCT/US25/44326, International Search Report, Dec. 15, 2025.
PCT/US25/44326, Written Opinion, Dec. 15, 2025.
Tsurumine Yoshihisa et al: "Variationally Autoencoded Dynamic Policy Programming for Robotic Cloth Manipulation Planning based on Raw Images", 2022 IEEE/SiCe International Symposium on System Integration (SII), IEEE, Jan. 9, 2022, pp. 416-421.
China National Intellectual Property Administration Application No. 202180080246.2 filing date May 30, 2023 First Office Action, entire document dated Dec. 3, 2025.

* cited by examiner

LARGE OBJECT ROBOTIC FRONT LOADING ALGORITHM

This application claims the benefit of U.S. provisional patent application Ser. No. 63/253,812, filed on Oct. 8, 2021, and U.S. provisional patent application Ser. No. 63/253,867, filed on Oct. 8, 2021, the contents of each of which are incorporated herein by reference in their entirety.

BACKGROUND

Objects underfoot represent not only a nuisance but a safety hazard. Thousands of people each year are injured in a fall at home. A floor cluttered with loose objects may represent a danger, but many people have limited time in which to address the clutter in their homes. Automated cleaning or robots may represent an effective solution.

However, some objects present a variety of challenges in how they may be effectively captured and contained for transport to an appropriate repository or deposition location. Objects that are proportionally large in comparison with the containment area may not be simply swept up and moved. A set of small, lightweight objects may scatter or roll with initial contact, and capturing them one at a time may present a drain on both time and robot energy. Highly deformable objects may simply slide out of or bunch away from rigid capturing mechanisms. And some objects may stack neatly with care but present an unpleasantly dispersed and disorganized pile if simply dropped and left as they land.

There is, therefore, a need for a capture, containment, transport, and deposition algorithm that accounts for the geometry and capabilities of the robot's components and potential difficulties associated with certain types of objects.

In one aspect, a method includes receiving a starting location and attributes of a target object to be lifted by a robot. The robot includes a robotic control system, a shovel, grabber pad arms with grabber pads and at least one wheel or one track for mobility of the robot. The method also includes determining an object isolation strategy, including at least one of using a reinforcement learning based strategy including rewards and penalties, a rules based strategy, relying upon observations, current object state, and sensor data. The method also includes executing the object isolation strategy to separate the target object from another object. The method also includes determining a pickup strategy, including an approach path for the robot to the target object, a grabbing height for initial contact with the target object, a grabbing pattern for movement of grabber pads while capturing the target object, and a carrying position of the grabber pads and the shovel that secures the target object in a containment area on the robot for transport, the containment area including at least two of the grabber pad arms, the grabber pads, and the shovel. The method also includes executing the pickup strategy, including extending the grabber pads out and forward with respect to the grabber pad arms and raising the grabber pads to the grabbing height, approaching the target object via the approach path, coming to a stop when the target object is positioned between the grabber pads, executing the grabbing pattern to allow capture of the target object within the containment area, and confirming the target object is within the containment area. On condition that the target object is within the containment area, the method includes exerting pressure on the target object with the grabber pads to hold the target object stationary in the containment area, and raising the shovel and the grabber pads, holding the target object, to the carrying position. On condition that the target object is not within the containment area, the method also includes altering the pickup strategy with at least one of a different reinforcement learning based strategy, a different rules based strategy, and relying upon different observations, current object state, and sensor data, and executing the altered pickup strategy.

In one aspect, a robotic system includes a robot including a shovel, grabber pad arms with grabber pads, at least one wheel or one track for mobility of the robot, a processor, and a memory storing instructions that, when executed by the processor, allow operation and control of the robot. The robotic system also includes a base station. The robotic system also includes a plurality of bins storing objects. The robotic system also includes a robotic control system. The robotic system also includes logic that allows the robot and robotic system to perform the disclosed actions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
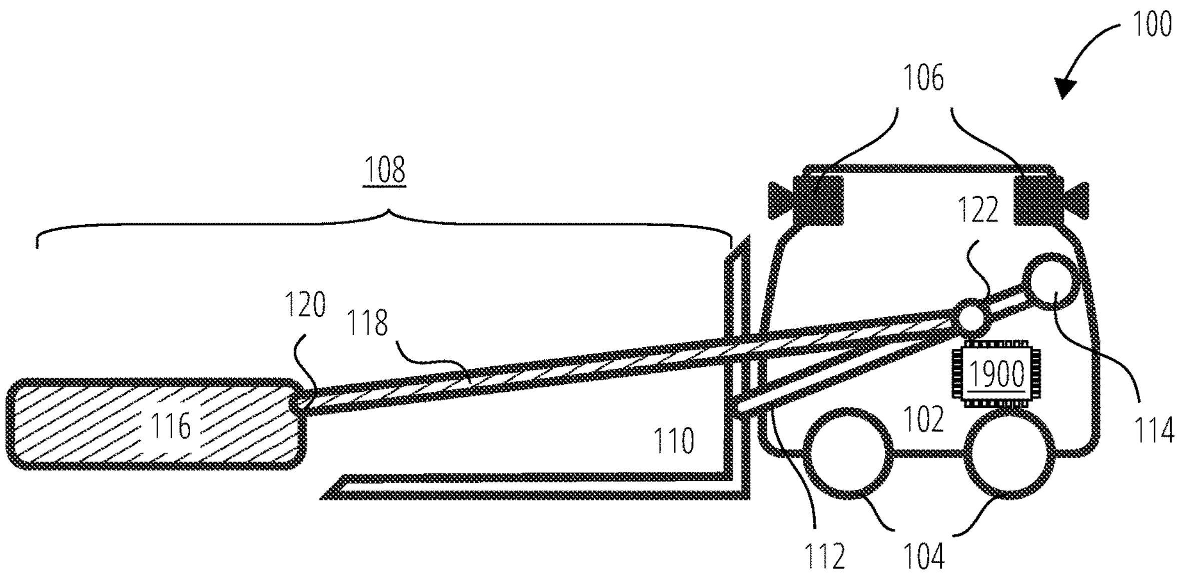
FIG. 1A-FIG. 1D illustrate aspects of a robot 100 in accordance with one embodiment.

Embodiments of a robotic system are disclosed that operate a robot to navigate an environment using cameras to map the type, size and location of toys, clothing, obstacles and other objects. The robot comprises a neural network to determine the type, size and location of objects based on input from a sensing system, such as images from a forward camera, a rear camera, forward and rear left/right stereo cameras, or other camera configurations, as well as data from inertial measurement unit (IMU), lidar, odometry, and actuator force feedback sensors. The robot chooses a specific object to pick up, performs path planning, and navigates to a point adjacent and facing the target object. Actuated grabber pad arms move other objects out of the way and maneuver grabber pads to move the target object onto a shovel to be carried. The shovel tilts up slightly and, if needed, grabber pads may close in front to keep objects in place, while the robot navigates to the next location in the planned path, such as the deposition destination.

In some embodiments the system may include a robotic arm to reach and grasp elevated objects and move them down to the shovel. A companion "portable elevator" robot may also be utilized in some embodiments to lift the main robot up onto countertops, tables, or other elevated surfaces, and then lower it back down onto the floor. Some embodiments may utilize an up/down vertical lift (e.g., a scissor lift) to change the height of the shovel when dropping items into a container, shelf, or other tall or elevated location.

Some embodiments may also utilize one or more of the following components:

- Left/right rotating brushes on actuator arms that push objects onto the shovel
- An actuated gripper that grabs objects and moves them onto the shovel
- A rotating wheel with flaps that push objects onto the shovel from above
- One servo or other actuator to lift the front shovel up into the air and another separate actuator that tilts the shovel forward and down to drop objects into a container
- A variation on a scissor lift that lifts the shovel up and gradually tilts it backwards as it gains height
- Ramps on the container with the front shovel on a hinge so that the robot just pushes items up the ramp such that the objects drop into the container with gravity at the top of the ramp
- A storage bin on the robot for additional carrying capacity such that target objects are pushed up a ramp into the storage bin instead of using a front shovel and the storage bin tilts up and back like a dump truck to drop items into a container The robotic system may be utilized for automatic organization of surfaces where items left on the surface are binned automatically into containers on a regular schedule. In one specific embodiment, the system may be utilized to automatically neaten a children's play area (e.g., in a home, school, or business) where toys and/or other items are automatically returned to containers specific to different types of objects, after the children are done playing. In other specific embodiments, the system may be utilized to automatically pick clothing up off the floor and organize the clothing into laundry basket(s) for washing, or to automatically pick up garbage off the floor and place it into a garbage bin or recycling bin(s), e.g., by type (plastic, cardboard, glass). Generally the system may be deployed to efficiently pick up a wide variety of different objects from surfaces and may learn to pick up new types of objects.

Some objects have attributes making them difficult to maneuver and carry using the grabber pads, grabber pad arms and shovel. These difficulties may be overcome by following an algorithm that specifically accounts for the attributes from which difficulties arise. For example, objects too large to fit completely within the shovel may be secured partially within the shovel through positioning the grabber pads above the object's center of gravity and lowering the grabber pad arms slightly causing the grabber pads to exert a slight downward pressure and hold the object securely within the shovel or even against the shovel bottom or edges. Small, light, and easily scattered objects such as plastic construction blocks or marbles may be dispersed if swept at too quickly with the grabber pads. Alternately, the pads may contact such objects at a point at a height where a direct and constant pressure by the pads may act to press the objects firmly to the floor rather than sweeping them along it. In such cases, a reduced force may be applied initially and then increased as the objects begin to move, or a series of gentle batting motions may be employed by the grabber pads in order to impart a horizontal force that moves the objects while avoiding the downward force that may increase their friction with the floor and prevent their motion. While many objects may simply be dropped from the shovel at their destination, such as into an assigned bin, a class of flat, stackable objects such as books, CDs, DVDs, narrow boxes, etc., may be easier and tidier to place by being raised above previously stacked objects and maneuvered out of the shovel by the grabber pads. An algorithm for handling objects such as these is disclosed herein.

Figure 1B:
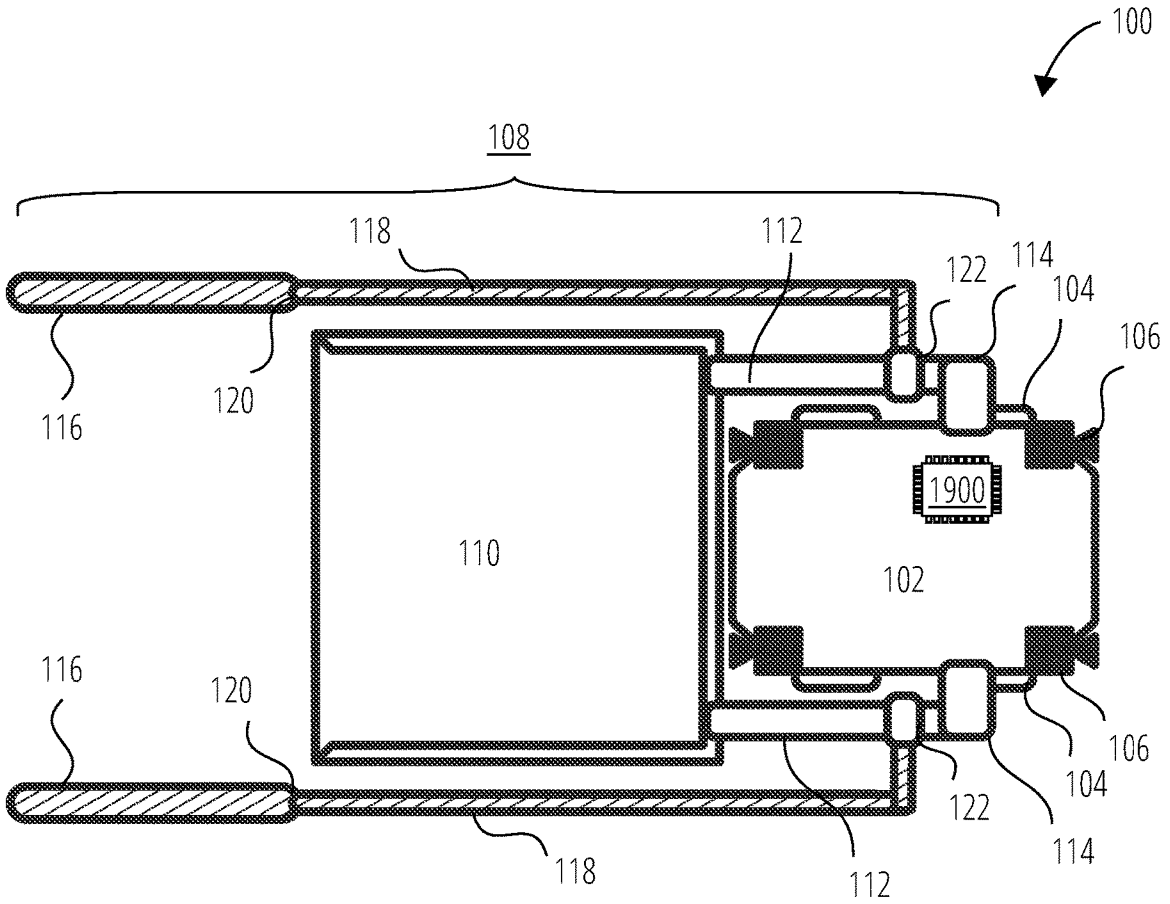

FIG. 1A through FIG. 1D illustrate a robot 100 in accordance with one embodiment. FIG. 1A illustrates a side view of the robot 100, and FIG. 1B illustrates a top view. The robot 100 may comprises a chassis 102, a mobility system 104, a sensing system 106, a capture and containment system 108, and a robotic control system 1900. The capture and containment system 108 may further comprise a shovel 110, a shovel arm 112, a shovel arm pivot point 114, two grabber pads 116, two grabber pad arms 118, and two pad arm pivot points 122.

The chassis 102 may support and contain the other components of the robot 100. The mobility system 104 may comprise wheels as indicated, as well as caterpillar tracks, conveyor belts, etc., as is well understood in the art. The mobility system 104 may further comprise motors, servos, or other sources of rotational or kinetic energy to impel the robot 100 along its desired paths. Mobility system 104 components may be mounted on the chassis 102 for the purpose of moving the entire robot without impeding or inhibiting the range of motion needed by the capture and containment system 108. Elements of a sensing system 106, such as cameras, lidar sensors, or other components, may be mounted on the chassis 102 in positions giving the robot 100 clear lines of sight around its environment in at least some configurations of the chassis 102, shovel 110, grabber pad 116, and grabber pad arm 118 with respect to each other.

The chassis 102 may house and protect all or portions of the robotic control system 1900, (portions of which may also be accessed via connection to a cloud server) comprising in some embodiments a processor, memory, and connections to the mobility system 104, sensing system 106, and capture and containment system 108. The chassis 102 may contain other electronic components such as batteries, wireless communication devices, etc., as is well understood in the art of robotics. The robotic control system 1900 may function as described in greater detail with respect to FIG. 19. The mobility system 104 and or the robotic control system 1900 may incorporate motor controllers used to control the speed, direction, position, and smooth movement of the motors. Such controllers may also be used to detect force feedback and limit maximum current (provide overcurrent protection) to ensure safety and prevent damage.

The capture and containment system 108 may comprise a shovel 110, a shovel arm 112, a shovel arm pivot point 114, a grabber pad 116, a grabber pad arm 118, a pad pivot point 120, and a pad arm pivot point 122. In some embodiments, the capture and containment system 108 may include two grabber pad arms 118, grabber pads 116, and their pivot points. In other embodiments, grabber pads 116 may attach directly to the shovel 110, without grabber pad arms 118. Such embodiments are illustrated later in this disclosure.

The geometry of the shovel 110 and the disposition of the grabber pads 116 and grabber pad arms 118 with respect to the shovel 110 may describe a containment area, illustrated more clearly in FIG. 2A through FIG. 2E, in which objects may be securely carried. Servos, direct current (DC) motors, or other actuators at the shovel arm pivot point 114, pad pivot points 120, and pad arm pivot points 122 may be used to adjust the disposition of the shovel 110, grabber pads 116, and grabber pad arms 118 between fully lowered shovel and grabber positions and raised shovel and grabber positions, as illustrated with respect to FIG. 2A through FIG. 2C.

The point of connection shown between the shovel arms and grabber pad arms is an exemplary position and not intended to limit the physical location of such points of connection. Such connections may be made in various locations as appropriate to the construction of the chassis and arms, and the applications of intended use.

In some embodiments, gripping surfaces may be configured on the sides of the grabber pads 116 facing in toward objects to be lifted. These gripping surfaces may provide cushion, grit, elasticity, or some other feature that increases friction between the grabber pads 116 and objects to be captured and contained. In some embodiments, the grabber pad 116 may include suction cups in order to better grasp objects having smooth, flat surfaces. In some embodiments, the grabber pads 116 may be configured with sweeping bristles. These sweeping bristles may assist in moving small objects from the floor up onto the shovel 110. In some embodiments, the sweeping bristles may angle down and inward from the grabber pads 116, such that, when the grabber pads 116 sweep objects toward the shovel 110, the sweeping bristles form a ramp, allowing the foremost bristles to slide beneath the object, and direct the object upward toward the grabber pads 116, facilitating capture of the object within the shovel and reducing a tendency of the object to be pressed against the floor, increasing its friction and making it more difficult to move.

Figure 1C:
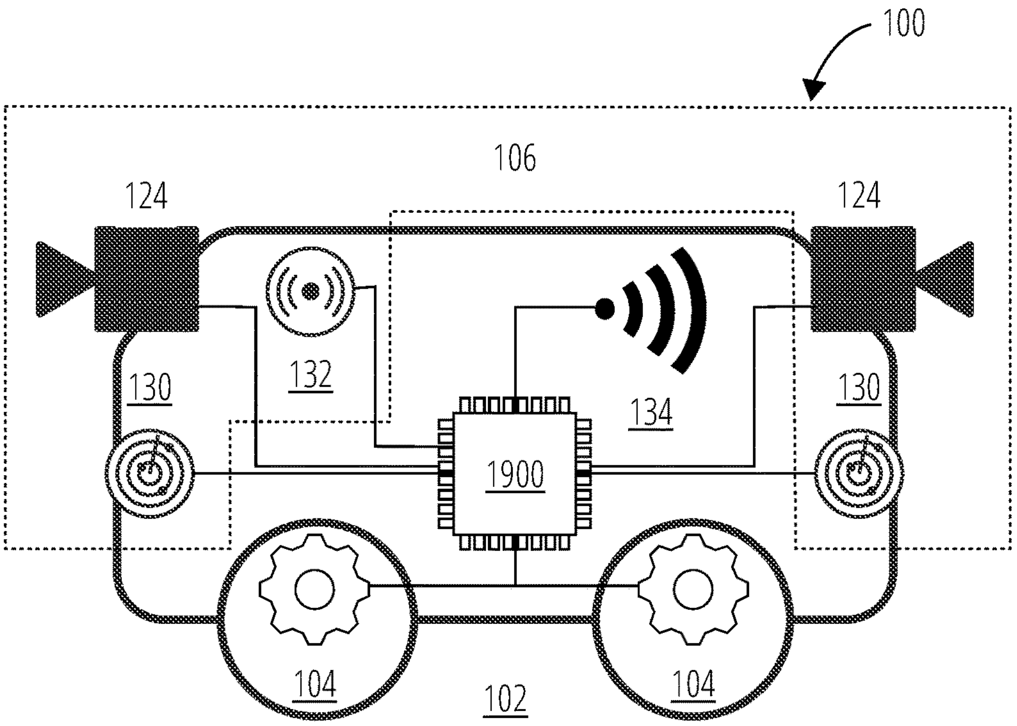
Figure 1D:
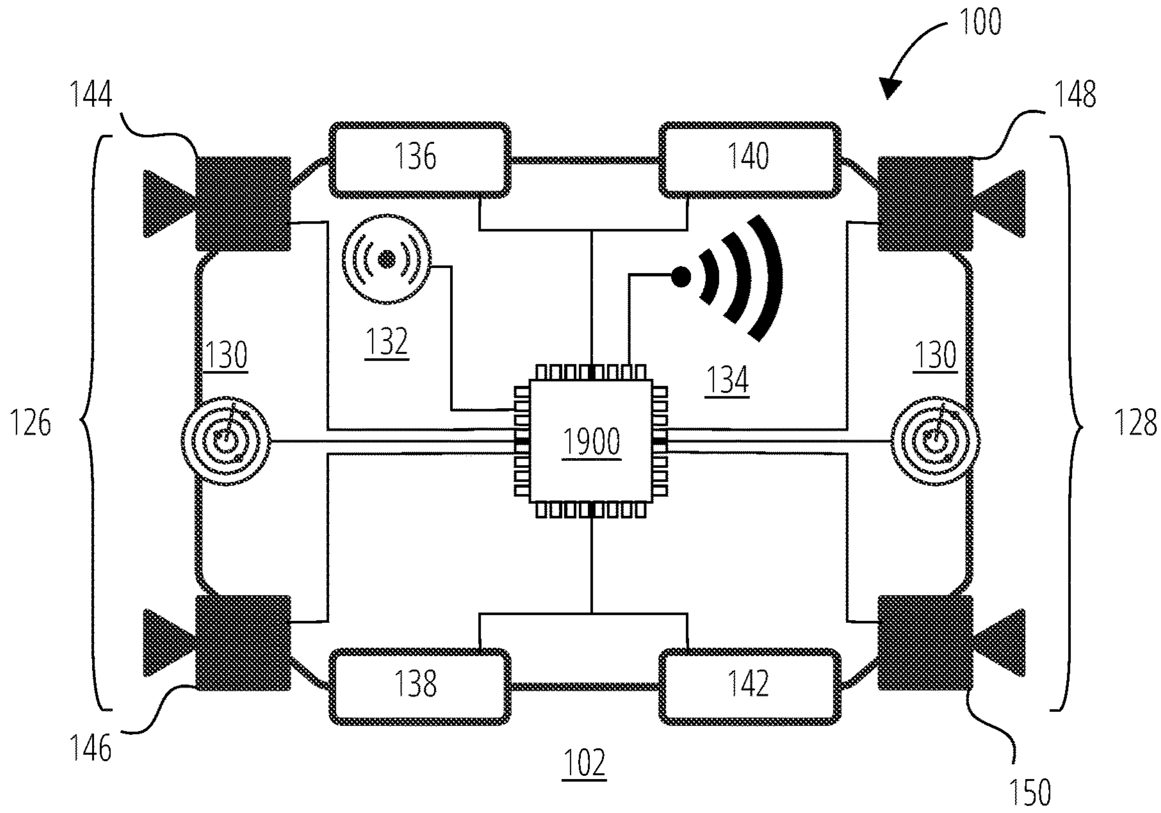

FIG. 1C and FIG. 1D illustrate a side view and top view of the chassis 102, respectively, along with the general connectivity of components of the mobility system 104, sensing system 106, and communications 134, in connection with the robotic control system 1900. In some embodiments, the communications 134 may include the network interface 1912 described in greater detail with respect to robotic control system 1900.

In one embodiment, the mobility system 104 may comprise a right front wheel 136, a left front wheel 138, a right rear wheel 140, and a left rear wheel 142. The robot 100 may have front wheel drive, where right front wheel 136 and left front wheel 138 are actively driven by one or more actuators or motors, while the right rear wheel 140 and left rear wheel 142 spin on an axle passively while supporting the rear portion of the chassis 102. In another embodiment, the robot 100 may have rear wheel drive, where the right rear wheel 140 and left rear wheel 142 are actuated and the front wheels turn passively. In another embodiment, each wheel may be actively actuated by separate motors or actuators.

The sensing system 106 may further comprise cameras 124 such as the front cameras 126 and rear cameras 128, light detecting and ranging (LIDAR) sensors such as lidar sensors 130, and inertial measurement unit (IMU) sensors, such as IMU sensors 132. In some embodiments, front camera 126 may include the front right camera 144 and front left camera 146. In some embodiments, rear camera 128 may include the rear left camera 148 and rear right camera 150.

Additional embodiments of the robot that may be used to perform the disclosed algorithms are illustrated in FIG. 2A through FIG. 2E, FIG. 3A through FIG. 3C, FIG. 4A through FIG. 4C, FIG. 5, FIG. 6, FIG. 7, FIG. 8, FIG. 9, FIG. 10, FIG. 11, FIG. 12, and FIG. 13. FIG. 15, FIG. 16 and FIG. 17, and FIG. 18A and FIG. 18B illustrate exemplary mechanical embodiments of a robot that may be used to perform the disclosed algorithms.

Figure 2A:
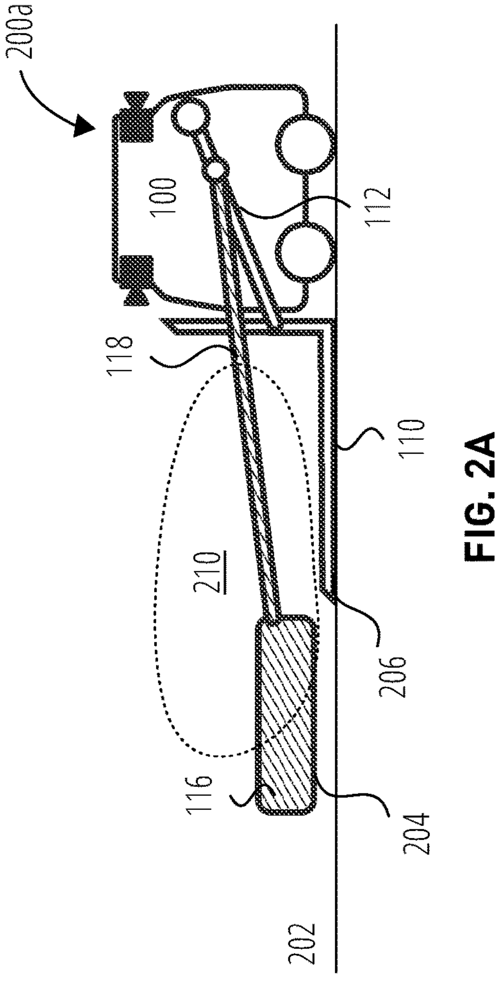
FIG. 2A illustrates a lowered shovel position and lowered grabber position 200*a* for the robot 100 in accordance with one embodiment.

FIG. 2A illustrates a robot 100 such as that introduced with respect to FIG. 1A disposed in a lowered shovel position and lowered grabber position 200*a*. In this configuration, the grabber pads 116 and grabber pad arms 118 rest in a lowered grabber position 204 and the shovel 110 and shovel arm 112 rest in a lowered shovel position 206 at the front 202 of the robot 100. In this position the shovel 110 and grabber pads 116 may roughly describe a containment area 210 as shown.

Figure 2B:
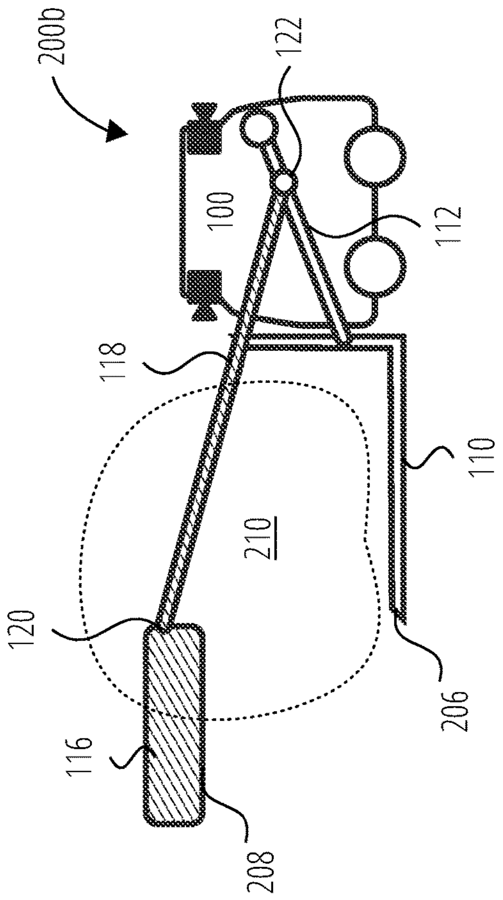
FIG. 2B illustrates a lowered shovel position and raised grabber position 200*b* for the robot 100 in accordance with one embodiment.

FIG. 2B illustrates a robot 100 with a lowered shovel position and raised grabber position 200*b*. Through the action of servos or other actuators at the pad pivot points 120 and pad arm pivot points 122, the grabber pads 116 and grabber pad arms 118 may be raised to a raised grabber position 208 while the shovel 110 and shovel arm 112 maintain a lowered shovel position 206. In this configuration, the grabber pads 116 and shovel 110 may roughly describe a containment area 210 as shown, in which an object taller than the shovel 110 height may rest within the shovel 110 and be held in place through pressure exerted by the grabber pads 116.

Figure 5:
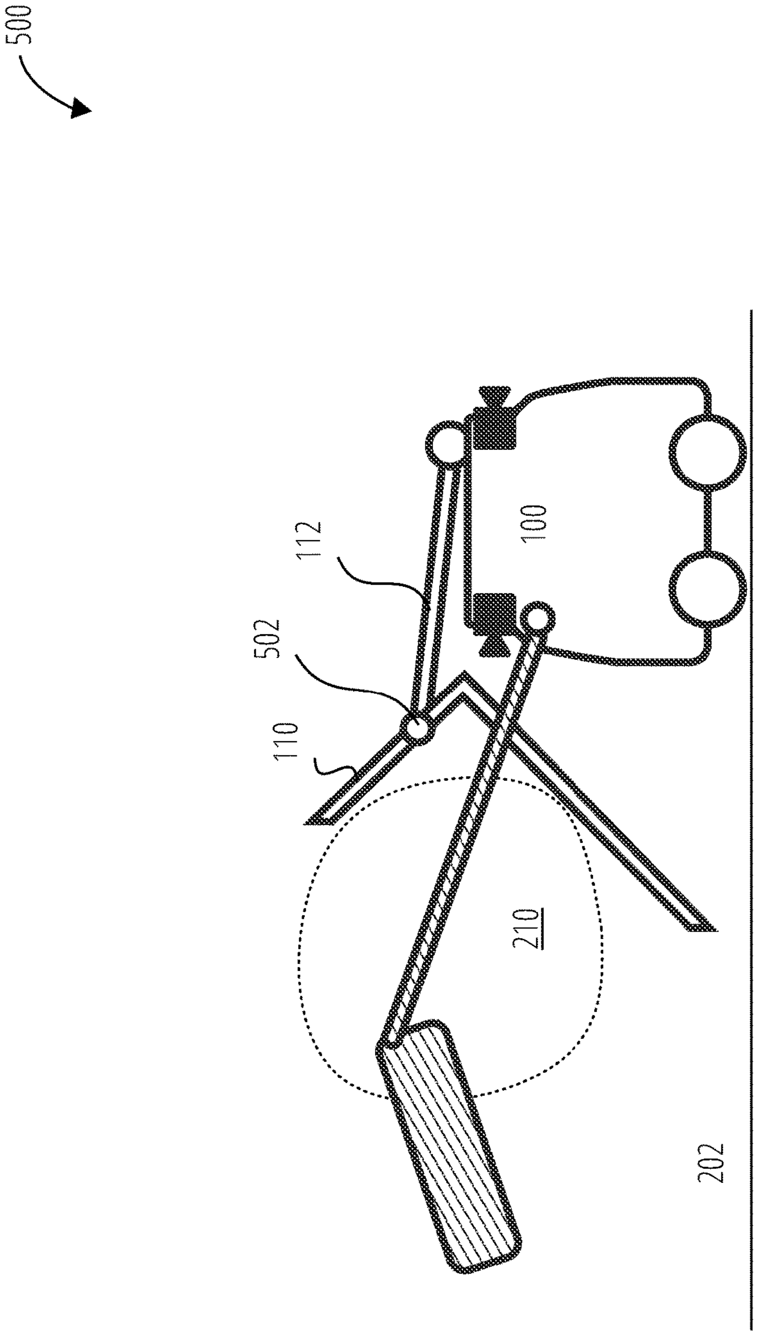
FIG. 5 illustrates a front drop position 500 for the robot 100 in accordance with one embodiment.

Pad arm pivot points 122, pad pivot points 120, shovel arm pivot points 114 and shovel pivot points 502 (as shown in FIG. 5) may provide the robot 100 a range of motion of these components beyond what is illustrated herein. The positions shown in the disclosed figures are illustrative only, and not meant to indicate the limits of the robot's component range of motion.

Figure 2C:
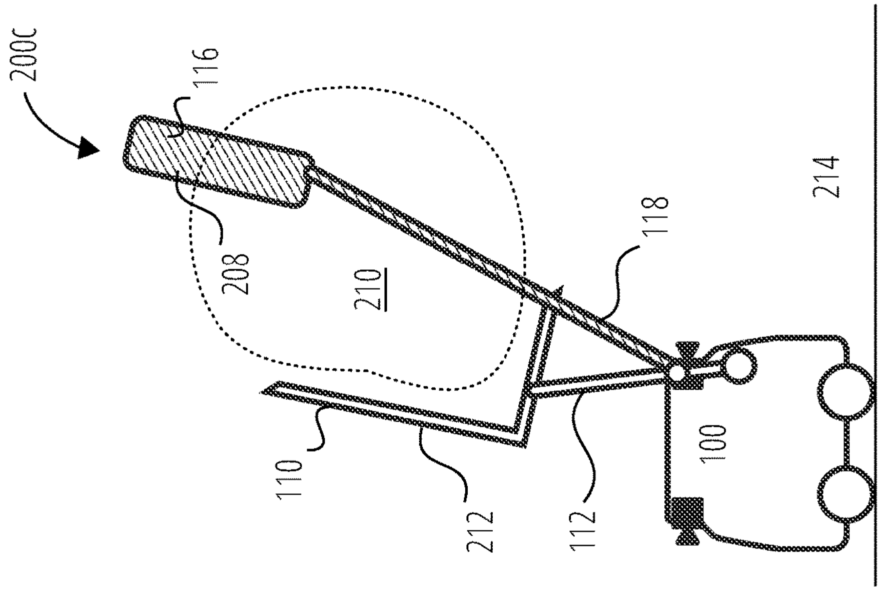
FIG. 2C illustrates a raised shovel position and raised grabber position 200*c* for the robot 100 in accordance with one embodiment.

FIG. 2C illustrates a robot 100 with a raised shovel position and raised grabber position 200*c*. The grabber pads 116 and grabber pad arms 118 may be in a raised grabber position 208 while the shovel 110 and shovel arm 112 are in a raised shovel position 212. In this position, the robot 100 may be able to allow objects drop from the shovel 110 and grabber pad arms 118 to an area at the rear 214 of the robot 100.

The carrying position, as illustrated in FIG. 27A through FIG. 30C below, may involve the disposition of the grabber pads 116, grabber pad arms 118, shovel 110, and shovel arm 112, in relative configurations between the extremes of lowered shovel position and lowered grabber position 200*a* and raised shovel position and raised grabber position 200*c*.

Figure 2D:
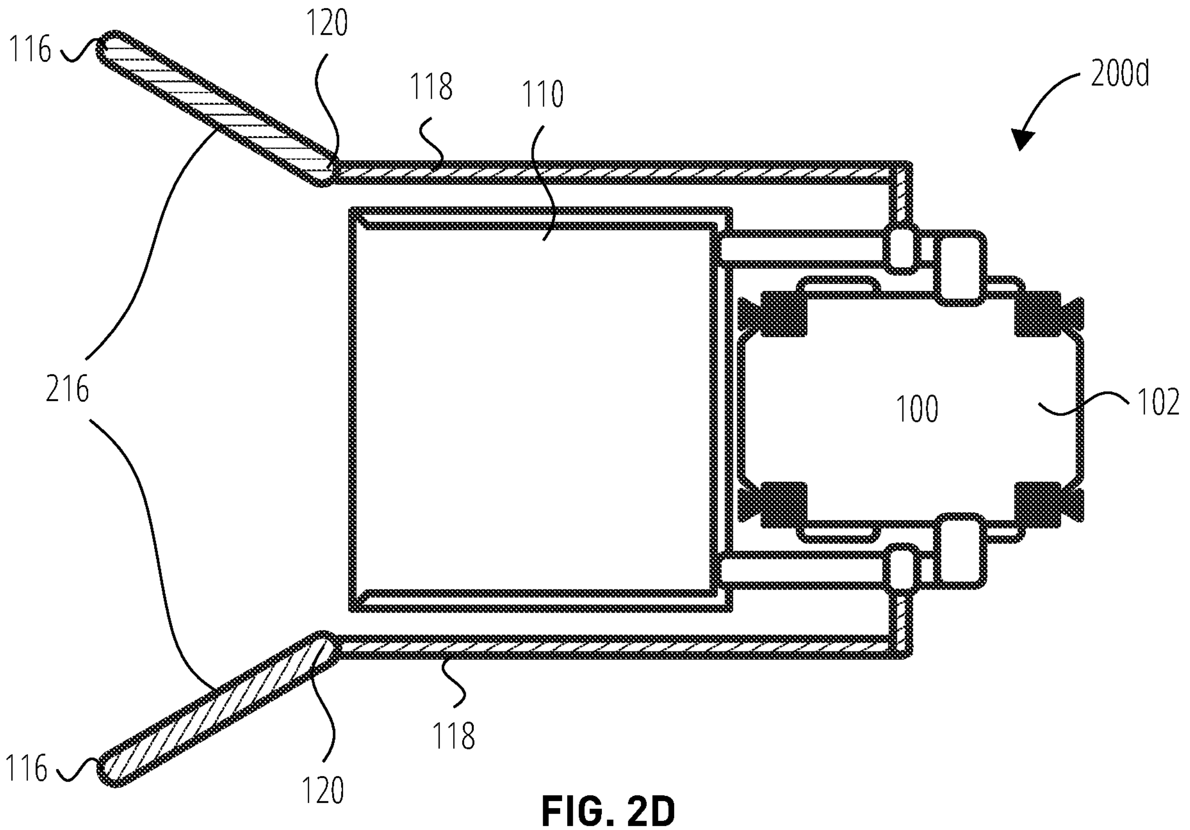
FIG. 2D illustrates a robot 100 with grabber pads extended 200*d* in accordance with one embodiment.

FIG. 2D illustrates a robot 100 with grabber pads extended 200*d*. By the action of servos or other actuators at the pad pivot points 120, the grabber pads 116 may be configured as extended grabber pads 216 to allow the robot 100 to approach objects as wide or wider than the robot chassis 102 and shovel 110. In some embodiments, the grabber pads 116 may be able to rotate through almost three hundred and sixty degrees, to rest parallel with and on the outside of their associated grabber pad arms 118 when fully extended.

Figure 2E:
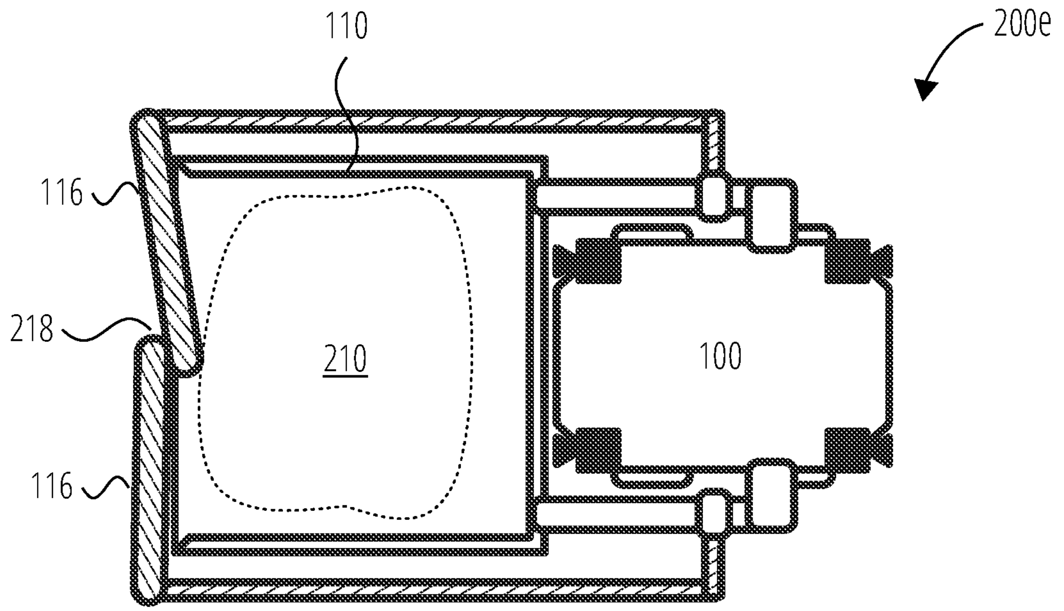
FIG. 2E illustrates a robot 100 with grabber pads retracted 200*e* in accordance with one embodiment.

FIG. 2E illustrates a robot 100 with grabber pads retracted 200*e*. The closed grabber pads 218 may roughly define a containment area 210 through their position with respect to the shovel 110. In some embodiments, the grabber pads 116 may be able to rotate farther than shown, through almost three hundred and sixty degrees, to rest parallel with and inside of the side walls of the shovel 110.

Figure 3A:
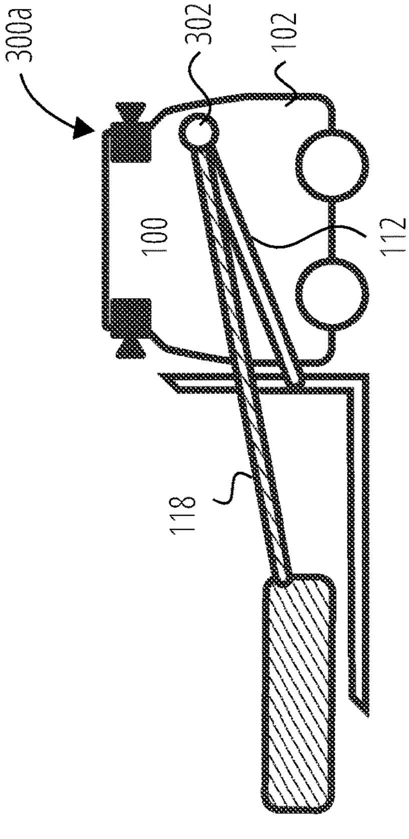
FIG. 3A illustrates a lowered shovel position and lowered grabber position 300*a* for the robot 100 in accordance with one embodiment.
Figure 3B:
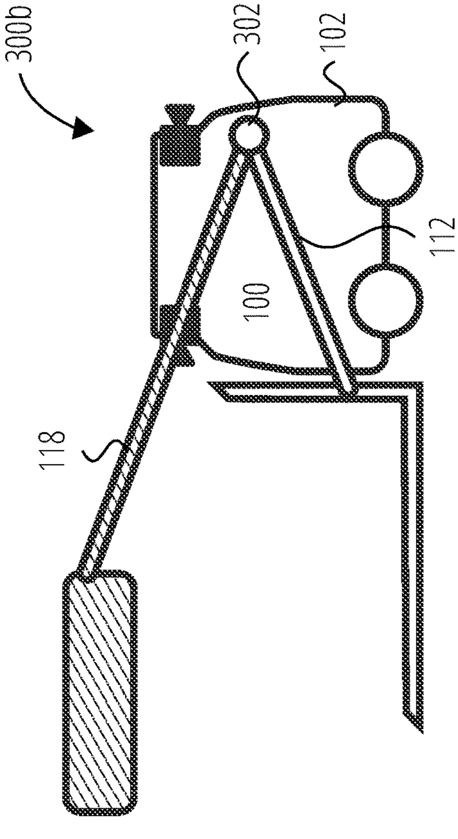
FIG. 3B illustrates a lowered shovel position and raised grabber position 300*b* for the robot 100 in accordance with one embodiment.
Figure 3C:
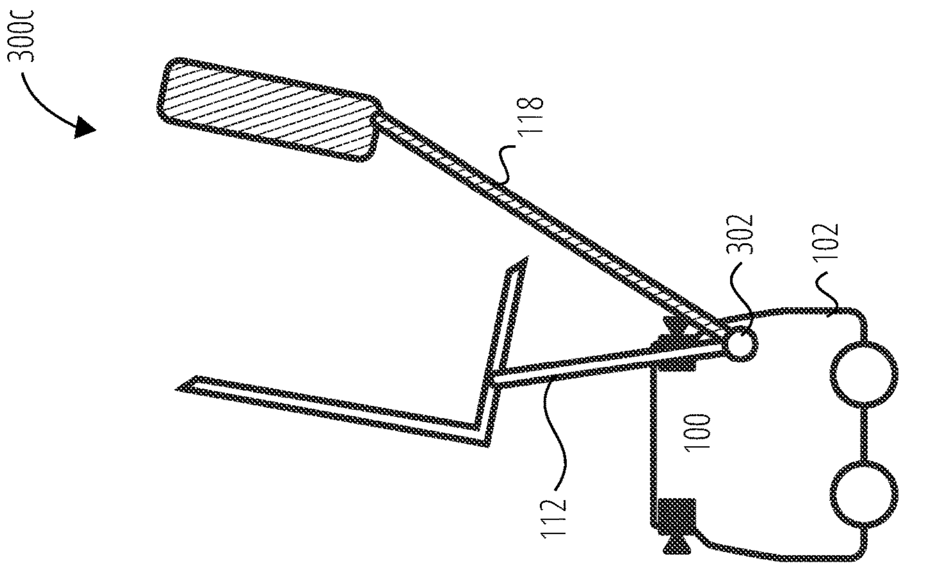
FIG. 3C illustrates a raised shovel position and raised grabber position 300*c* for the robot 100 in accordance with one embodiment.

FIG. 3A through FIG. 3C illustrate a robot 100 such as that introduced with respect to FIG. 1A through FIG. 2E. In such an embodiment, the grabber pad arms 118 may be controlled by a servo or other actuator at the same point of connection 302 with the chassis 102 as the shovel arms 112. The robot 100 may be seen disposed in a lowered shovel position and lowered grabber position 300*a*, a lowered shovel position and raised grabber position 300*b*, and a raised shovel position and raised grabber position 300*c*. This robot 100 may be configured to perform the algorithms disclosed herein.

The point of connection shown between the shovel arms 112/grabber pad arms 118 and the chassis 102 is an exemplary position and not intended to limit the physical location of this point of connection. Such connection may be made in various locations as appropriate to the construction of the chassis 102 and arms, and the applications of intended use.

Figure 4A:
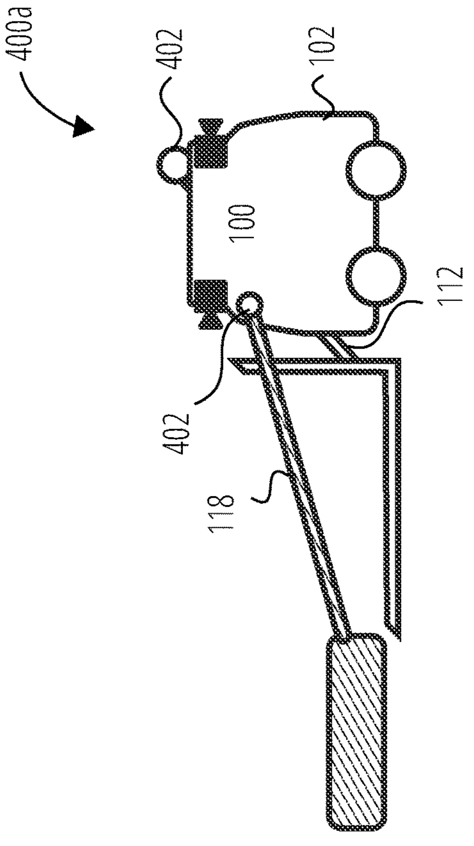
FIG. 4A illustrates a lowered shovel position and lowered grabber position 400*a* for the robot 100 in accordance with one embodiment.
Figure 4B:
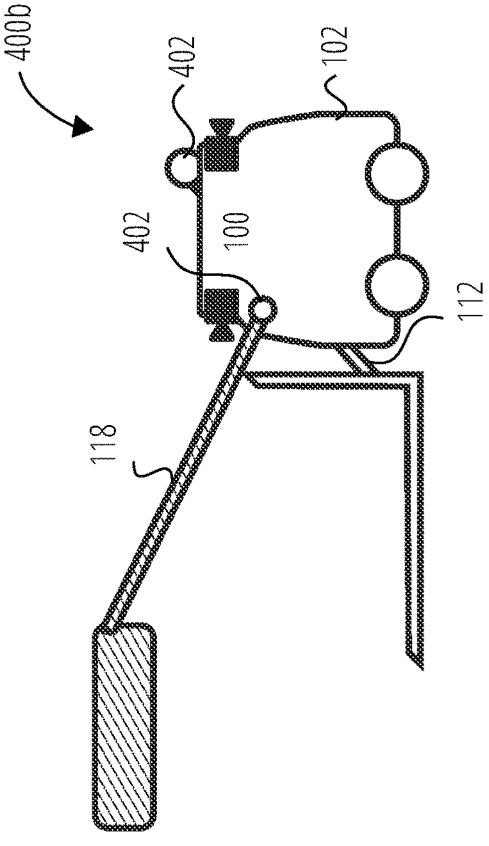
FIG. 4B illustrates a lowered shovel position and raised grabber position 400*b* for the robot 100 in accordance with one embodiment.
Figure 4C:
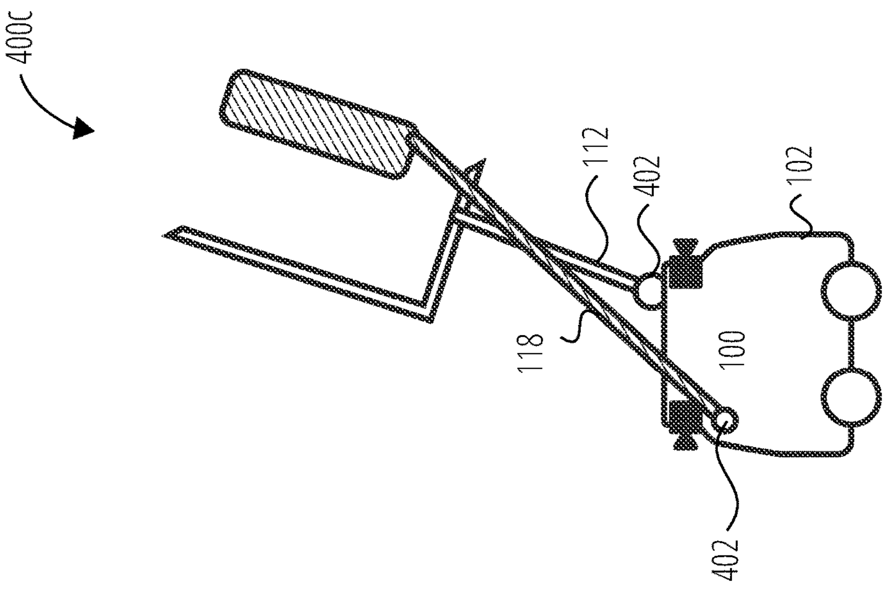
FIG. 4C illustrates a raised shovel position and raised grabber position 400*c* for the robot 100 in accordance with one embodiment.

FIG. 4A through FIG. 4C illustrate a robot 100 such as that introduced with respect to FIG. 1A through FIG. 2E. In such an embodiment, the grabber pad arms 118 may be controlled by a servo or servos (or other actuators) at different points of connection 402 with the chassis 102 from those controlling the shovel arm 112. The robot 100 may be seen disposed in a lowered shovel position and lowered grabber position 400*a*, a lowered shovel position and raised grabber position 400*b*, and a raised shovel position and raised grabber position 400*c*. This robot 100 may be configured to perform the algorithms disclosed herein.

The different points of connection 402 between shovel arm and chassis and grabber pad arms and chassis shown are exemplary positions and not intended to limit the physical locations of these points of connection. Such connections may be made in various locations as appropriate to the construction of the chassis and arms, and the applications of intended use.

FIG. 5 illustrates a robot 100 such as was previously introduced in a front drop position 500. The arms of the robot 100 may be positioned to form a containment area 210 as previously described.

The robot 100 may be configured with a shovel pivot point 502 where the shovel 110 connects to the shovel arm 112. The shovel pivot point 502 may allow the shovel 110 to be tilted forward and down while the shovel arm 112 is raised, allowing objects in the containment area 210 to slide out and be deposited in an area to the front 202 of the robot 100.

Figure 6:
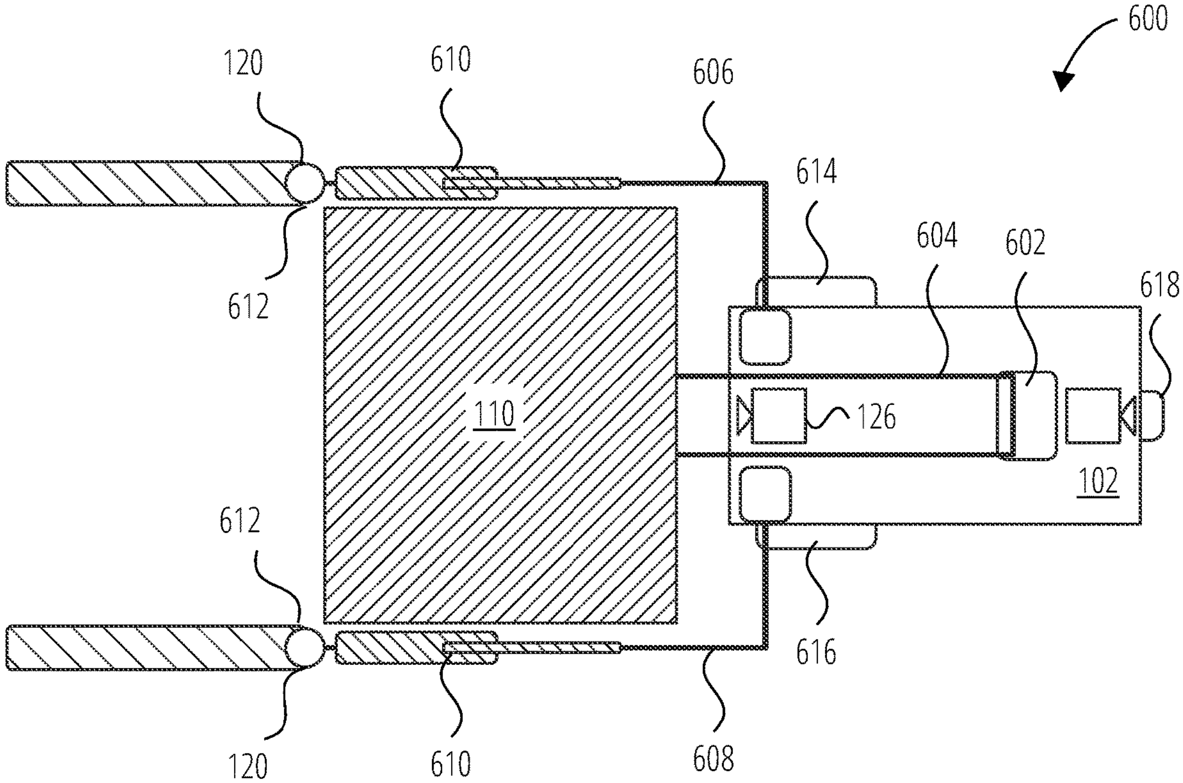
FIG. 6 illustrates a robot 600 in accordance with one embodiment.

FIG. 6 illustrates a robot 600 in accordance with one embodiment. The robot 600 may be configured to perform the algorithms disclosed herein. The robot 600 may comprise a number of features previously introduced that are not described in detail here. In addition to these, the robot 600 may comprise an elevated back shovel arm pivot point 602, a split shovel arm 604, a right telescoping grabber pad arm 606, a left telescoping grabber pad arm 608, linear actuators 610, wrist actuators 612, a right front drive wheel 614, a left front drive wheel 616, and a rear caster 618.

The elevated back shovel arm pivot point 602 may connect to a split shovel arm 604 in order to raise and lower the shovel 110. This configuration may allow the front camera 126 to capture images without obstruction from the shovel arm. Grooves or slots within the chassis 102 of the robot 600 may allow the portions of the split shovel arm 604 to move unimpeded by the dimensions of the chassis 102.

The grabber pad arms may comprise a right telescoping grabber pad arm 606 and a left telescoping grabber pad arm 608. In this manner, the grabber pad arms may extend (increase in length) and retract (decrease in length). This motion may be generated by linear actuators 610 configured as part of the grabber pad arms. Wrist actuators 612 may be positioned at the pad pivot points 120, allowing the grabber pads to pivot and push objects into the shovels 110.

The mobility system in one embodiment may comprise a right front drive wheel 614, a left front drive wheel 616, and a rear caster 618. The front drive wheels may provide the motive force that allows the robot 600 to navigate its environment, while the rear caster 618 may provide support to the rear portion of the robot 600 without limiting its range of motion. The right front drive wheel 614 and left front drive wheel 616 may be independently actuated, allowing the robot 600 to turn in place as well as while traversing a floor.

Figure 7:
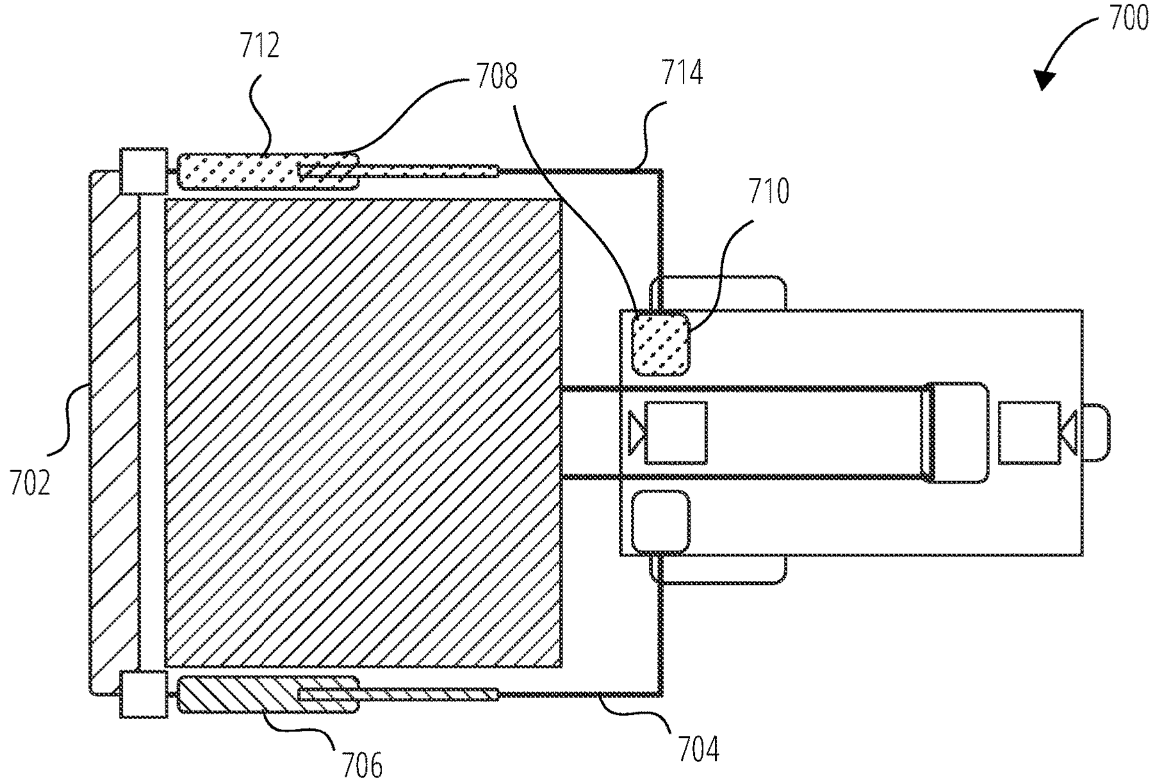
FIG. 7 illustrates a robot 700 in accordance with one embodiment.

FIG. 7 illustrates a robot 700 in accordance with one embodiment. The robot 700 may be configured to perform the algorithms disclosed herein. The robot 700 may comprise a number of features previously introduced that are not described in detail here. In addition to these, the robot 700 may comprise a single grabber pad 702, a single telescoping grabber pad arm 704, a linear actuator 706, bearings 708, an opposite pad arm pivot point 710, a sliding joint 712, and an opposite grabber pad arm 714.

The single grabber pad 702 may be raised and lowered by the grabber pad arms, and in addition may be extended and retracted through the action of a single telescoping grabber pad arm 704 impelled by a linear actuator 706. Bearings 708 at an opposite pad arm pivot point 710 and at a sliding joint 712 in the opposite grabber pad arm 714 may allow the force of the linear actuator 706, transferred through the single grabber pad 702, to allow symmetry of motion in both grabber pad arms with one arm being actively moved. In another embodiment, the single grabber pad 702 may be positioned by synchronized actuation of a right telescoping grabber pad arm 606 and a left telescoping grabber pad arm 608 as illustrated in FIG. 6.

Figure 8:
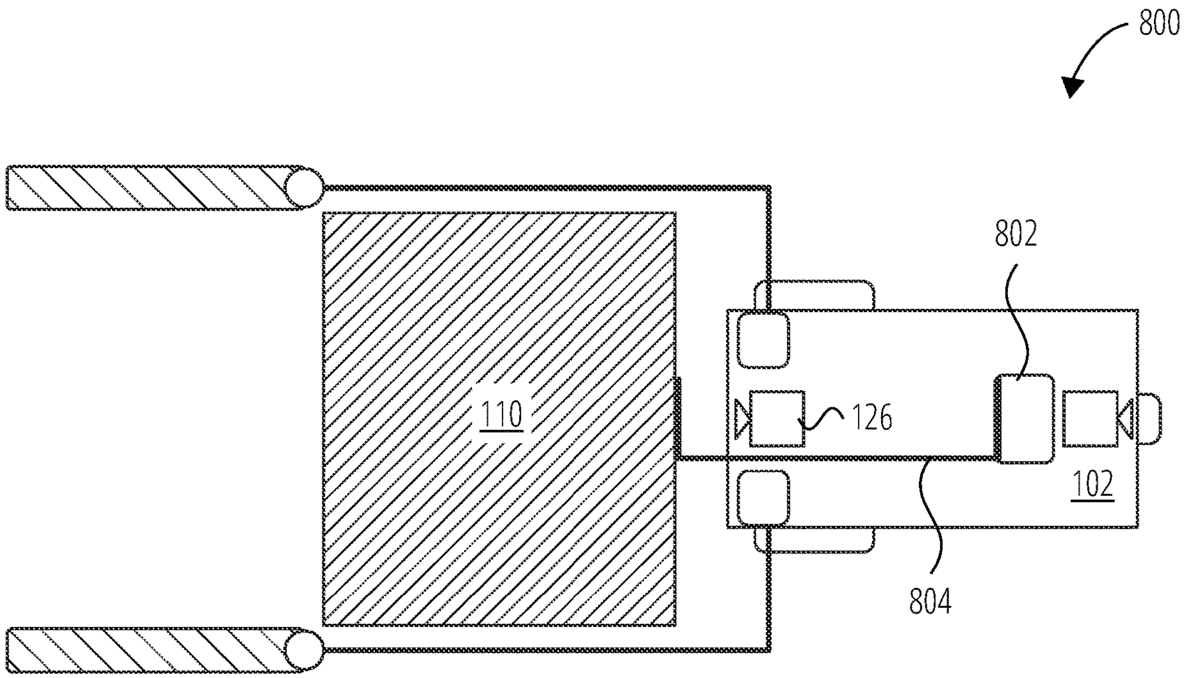
FIG. 8 illustrates a robot 800 in accordance with one embodiment.

FIG. 8 illustrates a robot 800 in accordance with one embodiment. The robot 800 may be configured to perform the algorithms disclosed herein. The robot 800 may comprise a number of features previously introduced that are not described in detail here. In addition to these, the robot 800 may comprise an elevated back shovel arm pivot point 802 and a single shovel arm 804.

The elevated back shovel arm pivot point 802 may connect to a single shovel arm 804 in order to raise and lower the shovel 110. This configuration may allow the front camera 126 to capture images without obstruction from the shovel arm. A groove or slot within the chassis 102 of the robot 800 may allow the single shovel arm 804 to move unimpeded by the dimensions of the chassis 102.

Figure 9:
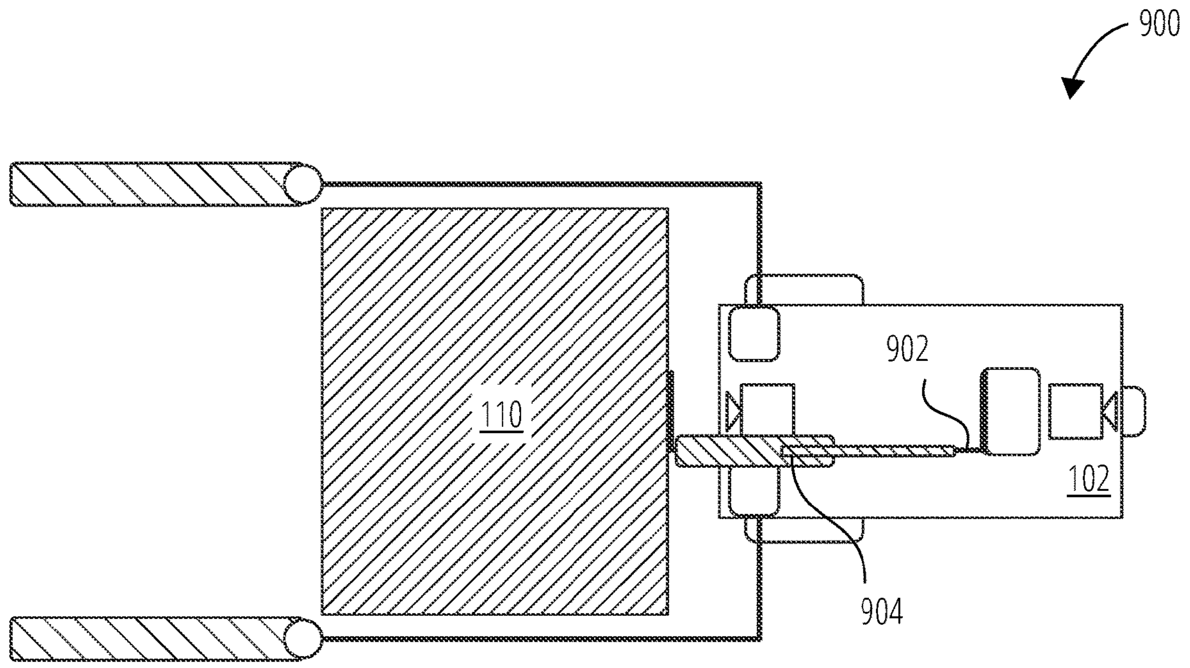
FIG. 9 illustrates a robot 900 in accordance with one embodiment.

FIG. 9 illustrates a robot 900 in accordance with one embodiment. The robot 900 may be configured to perform the algorithms disclosed herein. The robot 900 may comprise a number of features previously introduced that are not described in detail here. In addition to these, the robot 900 may comprise a single telescoping shovel arm 902 and a linear actuator 904.

The single telescoping shovel arm 902 may be able to move the shovel 110 away from and toward the chassis 102 by extension and retraction powered by a linear actuator 904.

Figure 10:
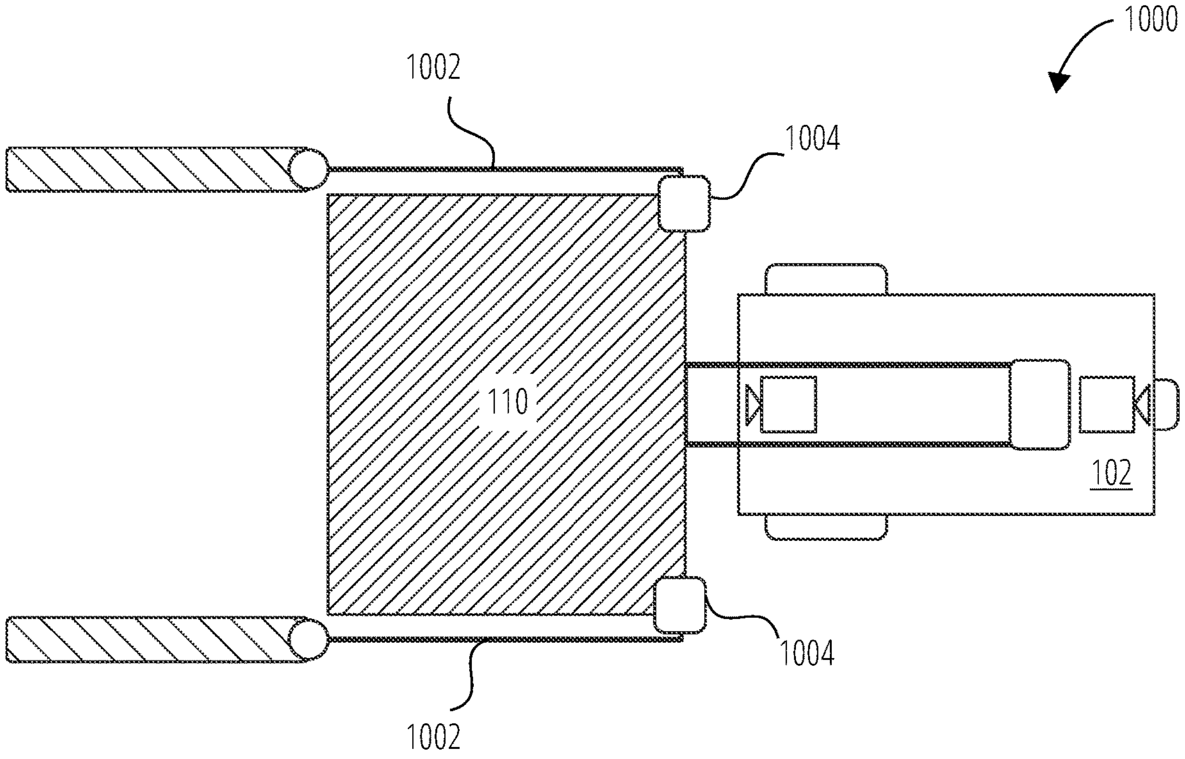
FIG. 10 illustrates a robot 1000 in accordance with one embodiment.

FIG. 10 illustrates a robot 1000 in accordance with one embodiment. The robot 1000 may be configured to perform the algorithms disclosed herein. The robot 1000 may comprise a number of features previously introduced that are not described in detail here. In addition to these, the robot 1000 may comprise shovel-mounted grabber pad arms 1002 and shovel-mounted pad arm pivot points 1004.

Rather than connecting to the chassis 102 as seen in other embodiments disclosed herein, the shovel-mounted grabber pad arms 1002 may connect to shovel-mounted pad arm pivot points 1004 positioned on the shovel 110. Actuators at the shovel-mounted pad arm pivot points 1004 may allow the shovel-mounted grabber pad arms 1002 to raise and lower with respect to the shovel 110, in addition to being raised and lowered along with the shovel 110.

Figure 11:
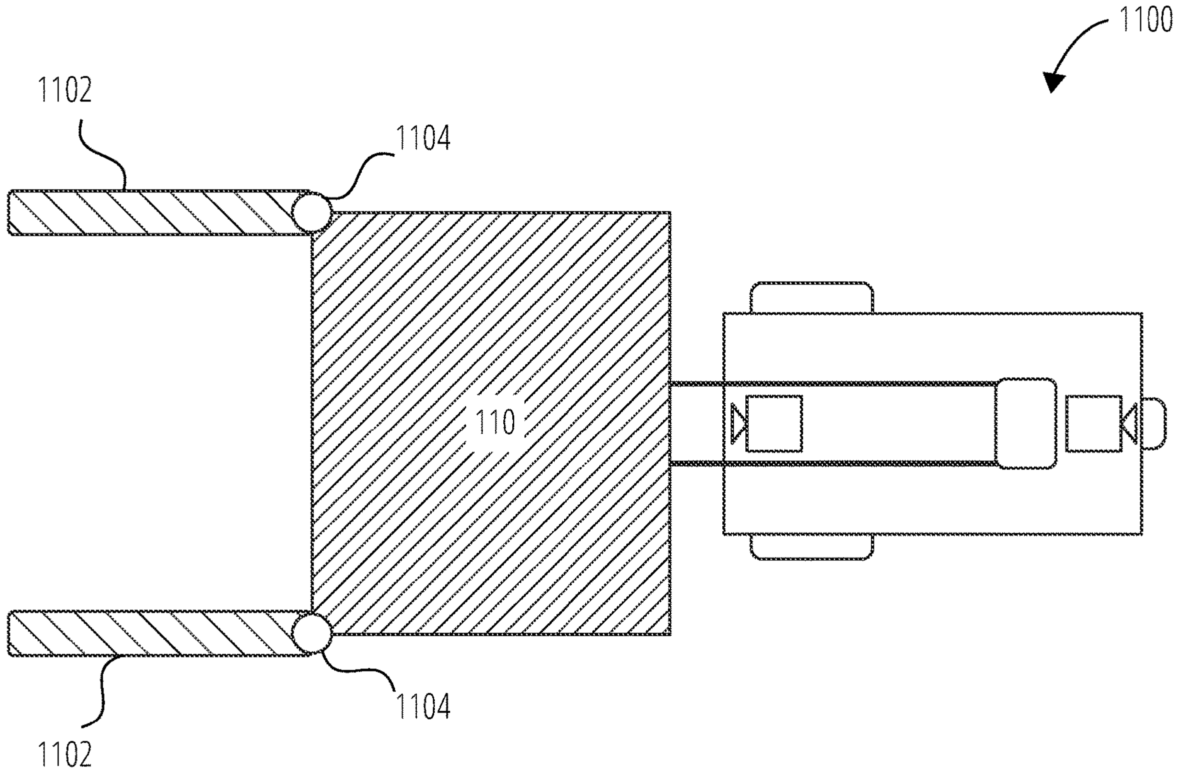
FIG. 11 illustrates a robot 1100 in accordance with one embodiment.

FIG. 11 illustrates a robot 1100 in accordance with one embodiment. The robot 1100 may be configured to perform the algorithms disclosed herein. The robot 1100 may comprise a number of features previously introduced that are not described in detail here. In addition to these, the robot 1100 may comprise shovel-mounted grabber pads 1102 and shovel-mounted pad pivot points 1104.

Rather than connecting to grabber pad arms, the shovel-mounted grabber pads 1102 may connect to the shovel 110 at shovel-mounted pad pivot points 1104. Wrist actuators at the shovel-mounted pad pivot points 1104 may allow the shovel-mounted grabber pads 1102 to pivot into and out of the shovel 110 in order to move objects into the shovel 110.

Figure 12:
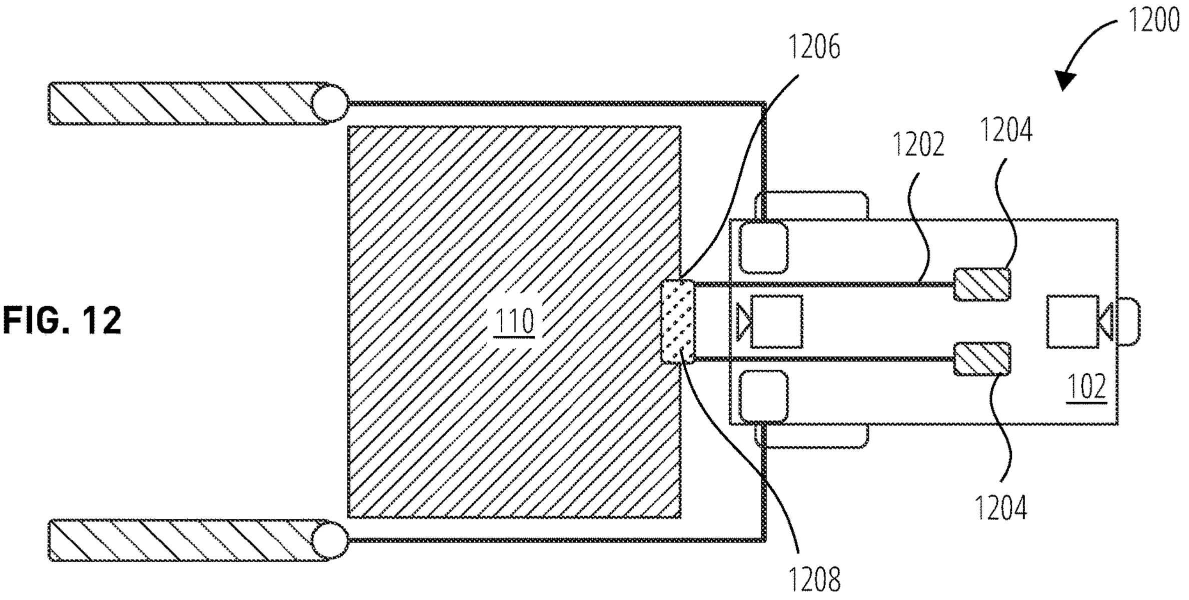
FIG. 12 illustrates a robot 1200 in accordance with one embodiment.

FIG. 12 illustrates a robot 1200 in accordance with one embodiment. The robot 1200 may be configured to perform the algorithms disclosed herein. The robot 1200 may comprise a number of features previously introduced that are not described in detail here. In addition to these, the robot 1200 may comprise a split shovel arm 1202, elevated back shovel arm pivot points 1204, a shovel pivot point 1206, and a shovel pivot actuator 1208.

The robot 1200 may have a split shovel arm 1202 that connects to the chassis 102 at two elevated back shovel arm pivot points 1204. Actuators at each elevated back shovel arm pivot points 1204 may be actuated in synchronization to raise and lower the shovel 110.

The shovel 110 may connect to the split shovel arm 1202 at a shovel pivot point 1206. A shovel pivot actuator 1208 at the shovel pivot point 1206 may allow the shovel 110 to be raised by the split shovel arm 1202 and tilted forward and down into a front drop position 500 such as was illustrated in FIG. 5.

Figure 13:
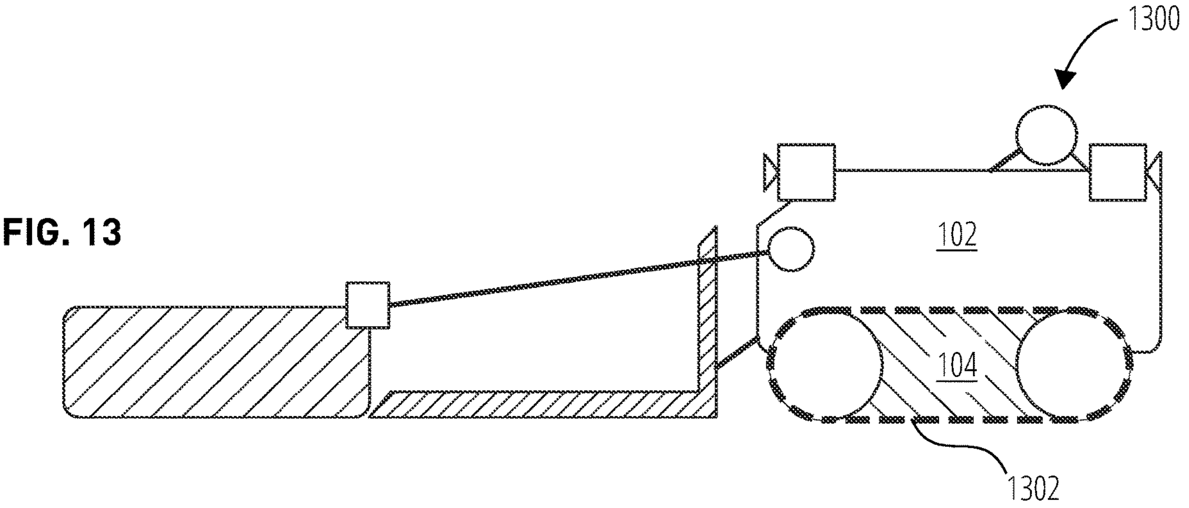
FIG. 13 illustrates a robot 1300 in accordance with one embodiment.

FIG. 13 illustrates a robot 1300 in accordance with one embodiment. The robot 1300 may be configured to perform the algorithms disclosed herein. The robot 1300 may comprise a number of features previously introduced that are not described in detail here. In addition to these, the robot 1300 may comprise a mobility system 104 equipped with tracks 1302.

These tracks 1302 may improve the mobility and stability of the robot 1300 on some surfaces. A left and right track 1302 may each be separately actuated to allow the robot 1300 to turn while traversing or while remaining in place.

Figure 14:
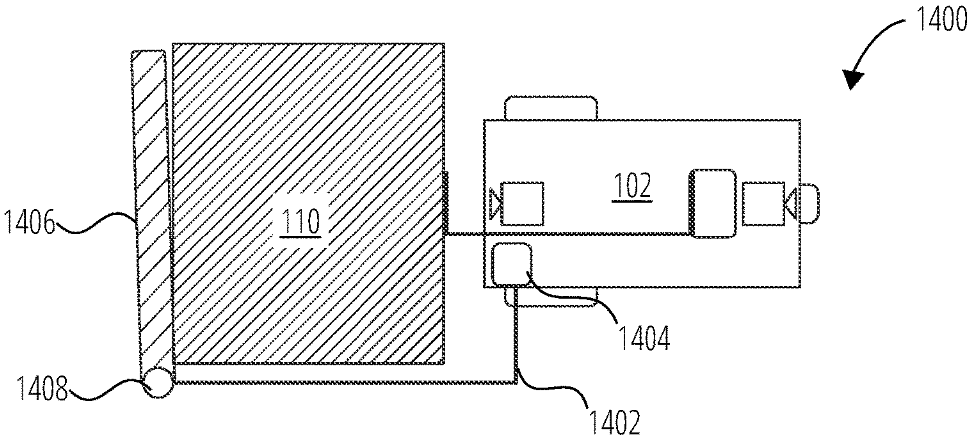
FIG. 14 illustrates a robot in accordance with one embodiment.

FIG. 14 illustrates a robot 1400 in accordance with one embodiment. The robot 1400 may be configured to perform the algorithms disclosed herein. The robot 1400 may comprise a number of features previously introduced that are not described in detail here. In addition to these, the robot 1300 may comprise a chassis 102, a shovel 110, a single grabber pad arm 1402, a single pad arm pivot point 1404, a single grabber pad 1406, and a single pad pivot point 1408.

The single grabber pad arm 1402 may connect to the chassis 102 at a single pad arm pivot point 1404, allowing the single grabber pad arm 1402 to move with respect to the robot 1400. The single grabber pad arm 1402 may have a single grabber pad 1406 connected to the single grabber pad arm 1402 at a single pad pivot point 1408, allowing the single grabber pad 1406 to move with respect to the single grabber pad arm 1402. Servos, DC motors, or other actuators at the single pad arm pivot point 1404 and single pad pivot point 1408 may impel the action of the single grabber pad arm 1402 and single grabber pad 1406 to maneuver objects into the shovel 110.

Figure 15:
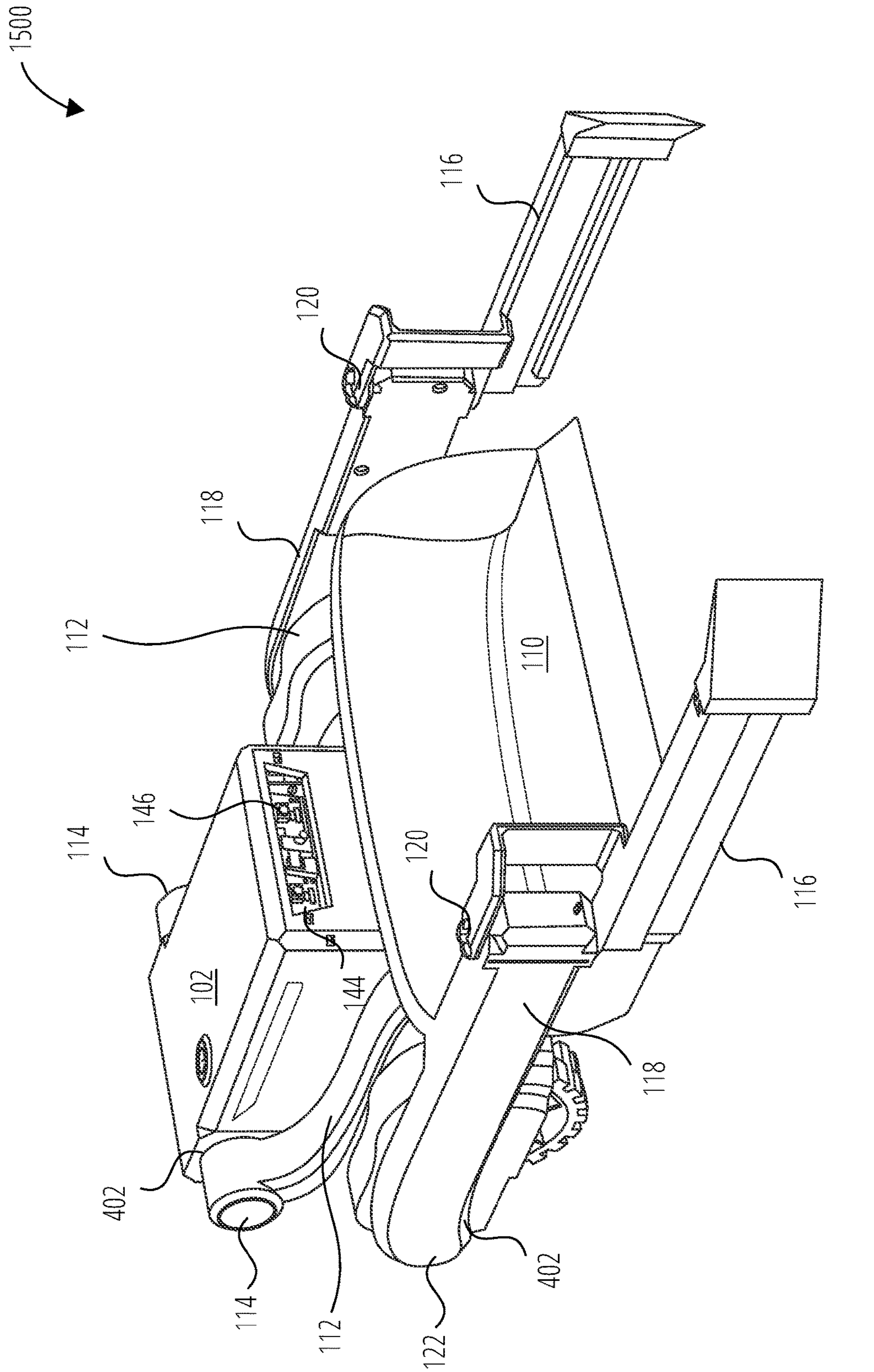
FIG. 15 illustrates a robot 1500 in accordance with one embodiment.

FIG. 15 illustrates a robot 1500 in accordance with one embodiment. The robot 1500 may be configured to perform the algorithms disclosed herein. The robot 1500 may comprise a chassis 102, a shovel 110, shovel arms 112, shovel arm pivot points 114, grabber pads 116, grabber pad arms 118, pad pivot points 120, pad arm pivot points 122, a front right camera 144, a front left camera 146, and different points of connection 402 for the shovel arms 112 and grabber pad arms 118, as previously described, in addition to other features.

Figure 16:
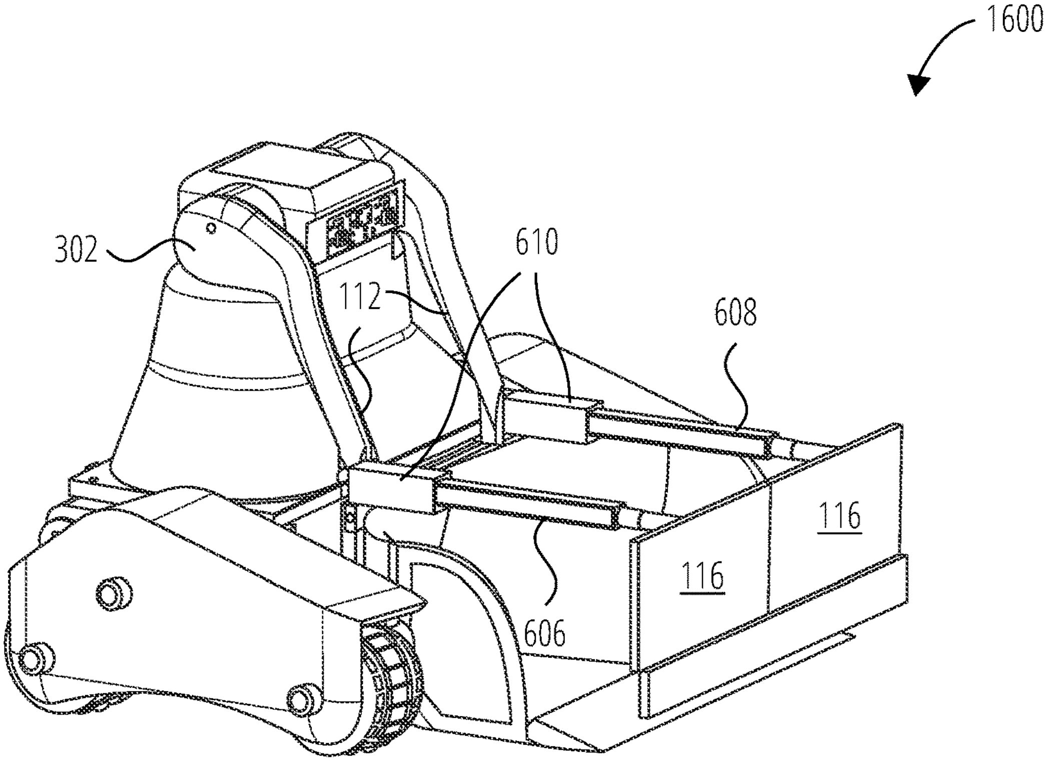
FIG. 16 illustrates a robot 1600 in accordance with one embodiment.

FIG. 16 illustrates a robot 1600 in accordance with one embodiment. The robot 1600 may be configured to perform the algorithms disclosed herein. The robot 1600 may comprise grabber pads 116, a right telescoping grabber pad arm 606, a left telescoping grabber pad arm 608, a same point of connection 302 between each shovel arm 112 and these grabber pad arms, and linear actuators 610 to extend the right telescoping grabber pad arm 606, left telescoping grabber pad arm 608, and grabber pads 116, either in synchronization or separately, as previously described, in addition to other features.

Figure 17:
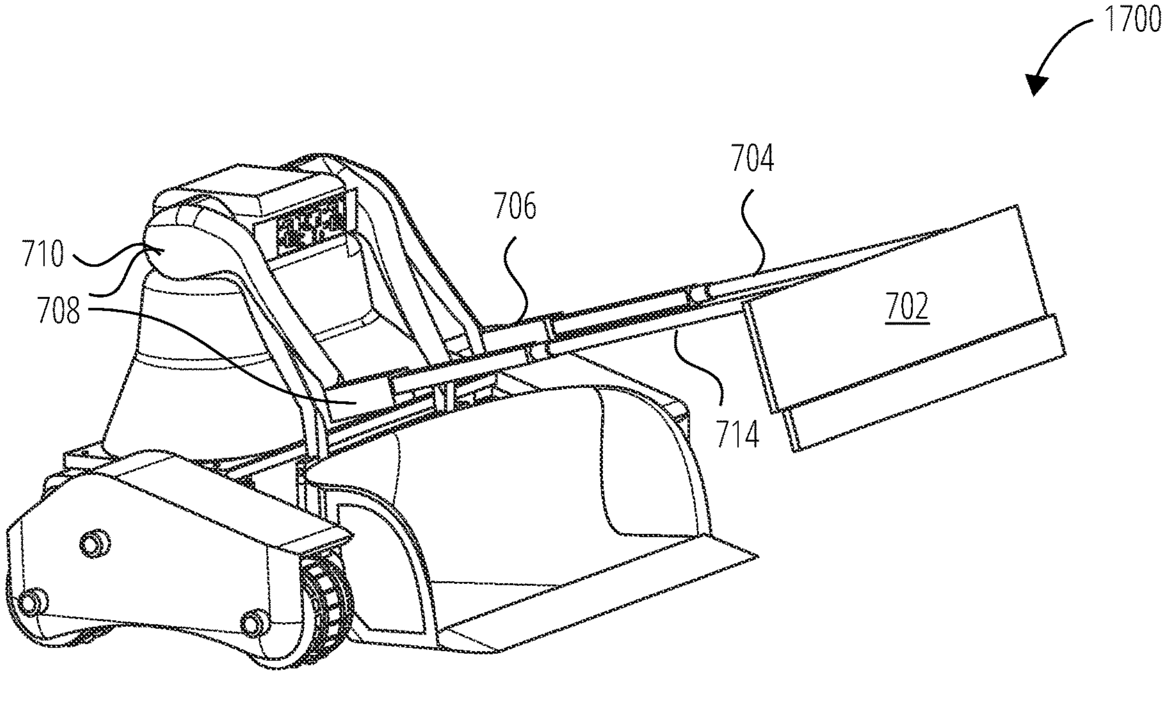
FIG. 17 illustrates a robot 1700 in accordance with one embodiment.

FIG. 17 illustrates a robot 1700 in accordance with one embodiment. The robot 1700 may be configured to perform the algorithms disclosed herein. The robot 1700 may comprise a single grabber pad 702, a single telescoping grabber pad arm 704, a linear actuator 706, bearings 708, an opposite pad arm pivot point 710, and an opposite grabber pad arm 714, as previously described, in addition to other features.

Figure 18A:
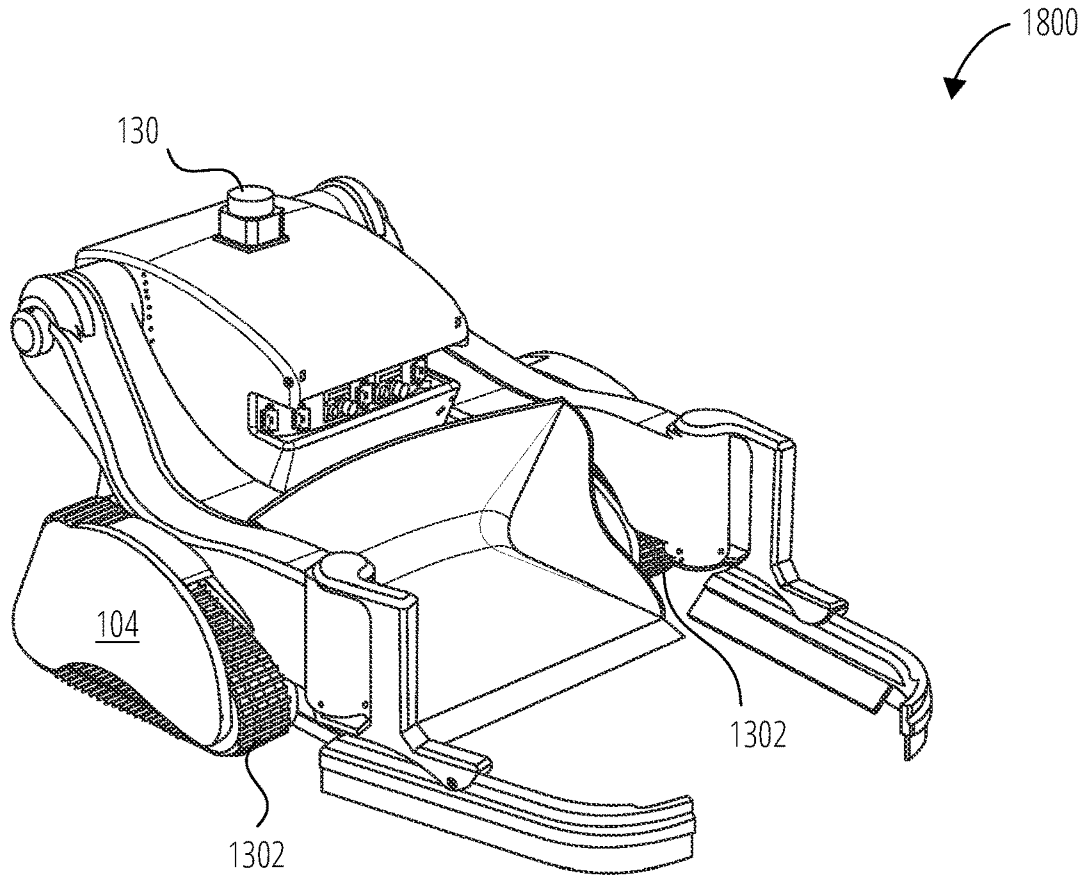
FIG. 18A and FIG. 18B illustrate a robot 1800 in accordance with one embodiment.
Figure 18B:
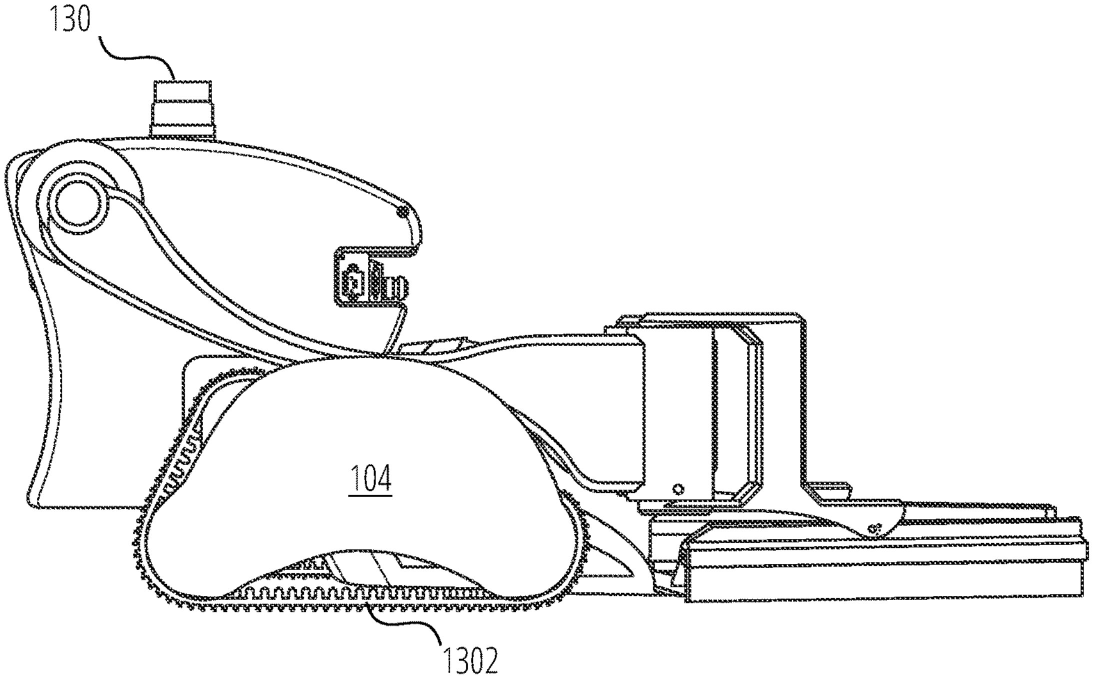

FIG. 18A and FIG. 18B illustrate a robot 1800 in accordance with one embodiment. The robot 1800 may be configured to perform the algorithms disclosed herein. The robot 1800 may comprise a mobility system 104, a lidar sensor 130, and a tracks 1302, as previously described, in addition to other features.

The features of a robot illustrated with respect to FIG. 6 through FIG. 18B may be present in various combinations in a specific embodiment. These illustrations are not intended to limit the configuration of the described features, as will be readily understood by one of ordinary skill in the art.

Figure 19:
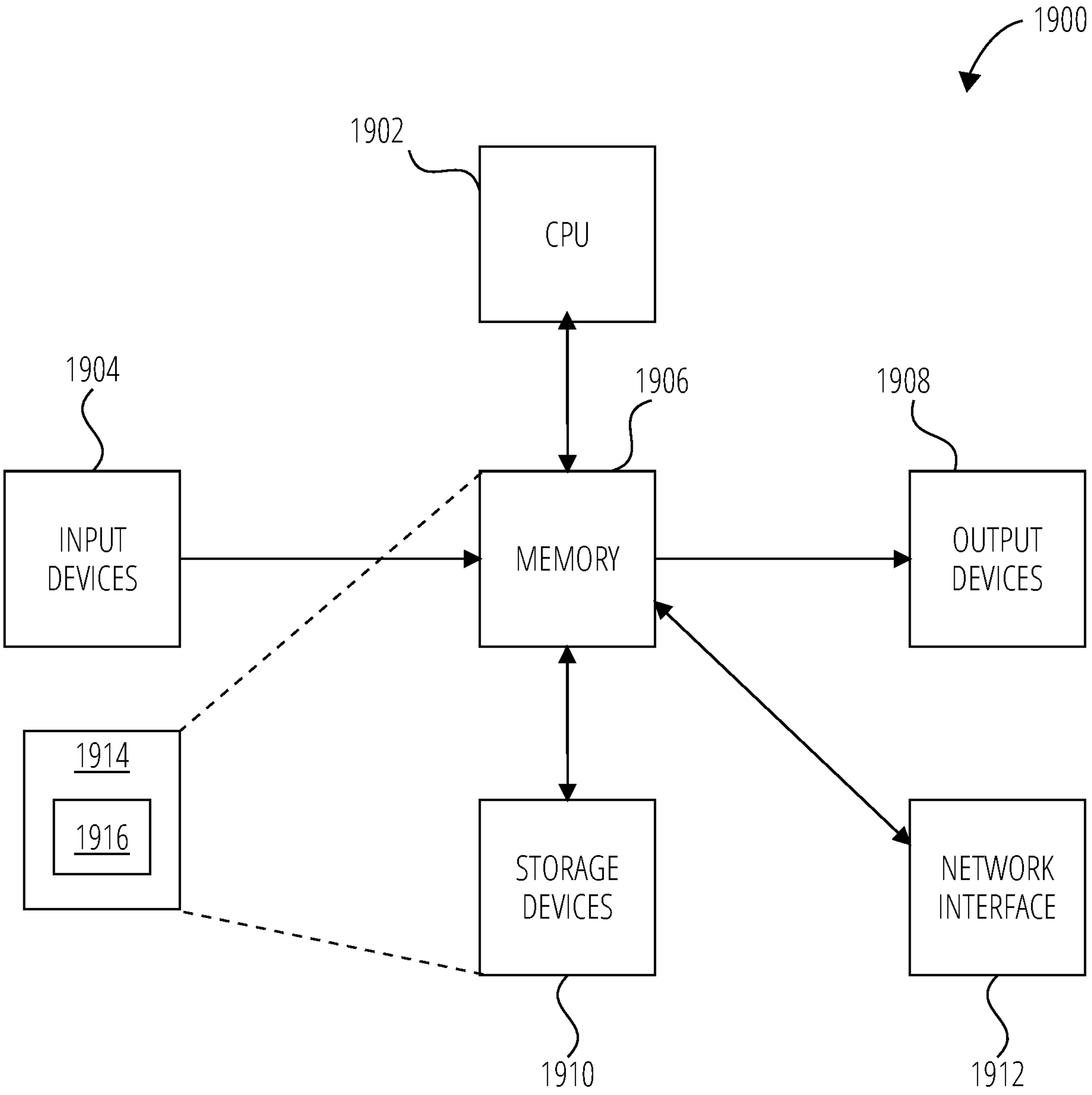
FIG. 19 illustrates an embodiment of a robotic control system 1900 to implement components and process steps of the system described herein.

FIG. 19 depicts an embodiment of a robotic control system 1900 to implement components and process steps of the systems described herein. Some or all portions of the robotic control system 1900 and its operational logic may be contained within the physical components of a robot and/or within a cloud server in communication with the robot. In one embodiment, aspects of the robotic control system 1900 on a cloud server may control more than one robot at a time, allowing multiple robots to work in concert within a working space.

Input devices 1904 (e.g., of a robot or companion device such as a mobile phone or personal computer) comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1904 are contact sensors which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1904 are provided via various machine signal conductors (e.g., busses or network interfaces) and circuits to memory 1906.

The memory 1906 is typically what is known as a first or second level memory device, providing for storage (via configuration of matter or states of matter) of signals received from the input devices 1904, instructions and information for controlling operation of the central processing unit or CPU 1902, and signals from storage devices 1910. The memory 1906 and/or the storage devices 1910 may store computer-executable instructions and thus forming logic 1914 that when applied to and executed by the CPU 1902 implement embodiments of the processes disclosed herein. Logic 1914 may include portions of a computer program, along with configuration data, that are run by the CPU 1902 or another processor. Logic 1914 may include one or more machine learning models 1916 used to perform the disclosed actions. In one embodiment, portions of the logic 1914 may also reside on a mobile or desktop computing device accessible by a user to facilitate direct user control of the robot.

Information stored in the memory 1906 is typically directly accessible to the CPU 1902 of the device. Signals input to the device cause the reconfiguration of the internal material/energy state of the memory 1906, creating in essence a new machine configuration, influencing the behavior of the robotic control system 1900 by configuring the CPU 1902 with control signals (instructions) and data provided in conjunction with the control signals.

Second or third level storage devices 1910 may provide a slower but higher capacity machine memory capability. Examples of storage devices 1910 are hard disks, optical disks, large capacity flash memories or other non-volatile memory technologies, and magnetic memories.

In one embodiment, memory 1906 may include virtual storage accessible through connection with a cloud server using the network interface 1912, as described below. In such embodiments, some or all of the logic 1914 may be stored and processed remotely.

The CPU 1902 may cause the configuration of the memory 1906 to be altered by signals in storage devices 1910. In other words, the CPU 1902 may cause data and instructions to be read from storage devices 1910 in the memory 1906 from which may then influence the operations of CPU 1902 as instructions and data signals, and from which it may also be provided to the output devices 1908. The CPU 1902 may alter the content of the memory 1906 by signaling to a machine interface of memory 1906 to alter the internal configuration, and then converted signals to the storage devices 1910 to alter its material internal configuration. In other words, data and instructions may be backed up from memory 1906, which is often volatile, to storage devices 1910, which are often non-volatile.

Output devices 1908 are transducers which convert signals received from the memory 1906 into physical phenomenon such as vibrations in the air, or patterns of light on a machine display, or vibrations (i.e., haptic devices) or patterns of ink or other materials (i.e., printers and 3-D printers).

The network interface 1912 receives signals from the memory 1906 and converts them into electrical, optical, or wireless signals to other machines, typically via a machine network. The network interface 1912 also receives signals from the machine network and converts them into electrical, optical, or wireless signals to the memory 1906. The network interface 1912 may allow a robot to communicate with a cloud server, a mobile device, other robots, and other network-enabled devices.

Figure 20:
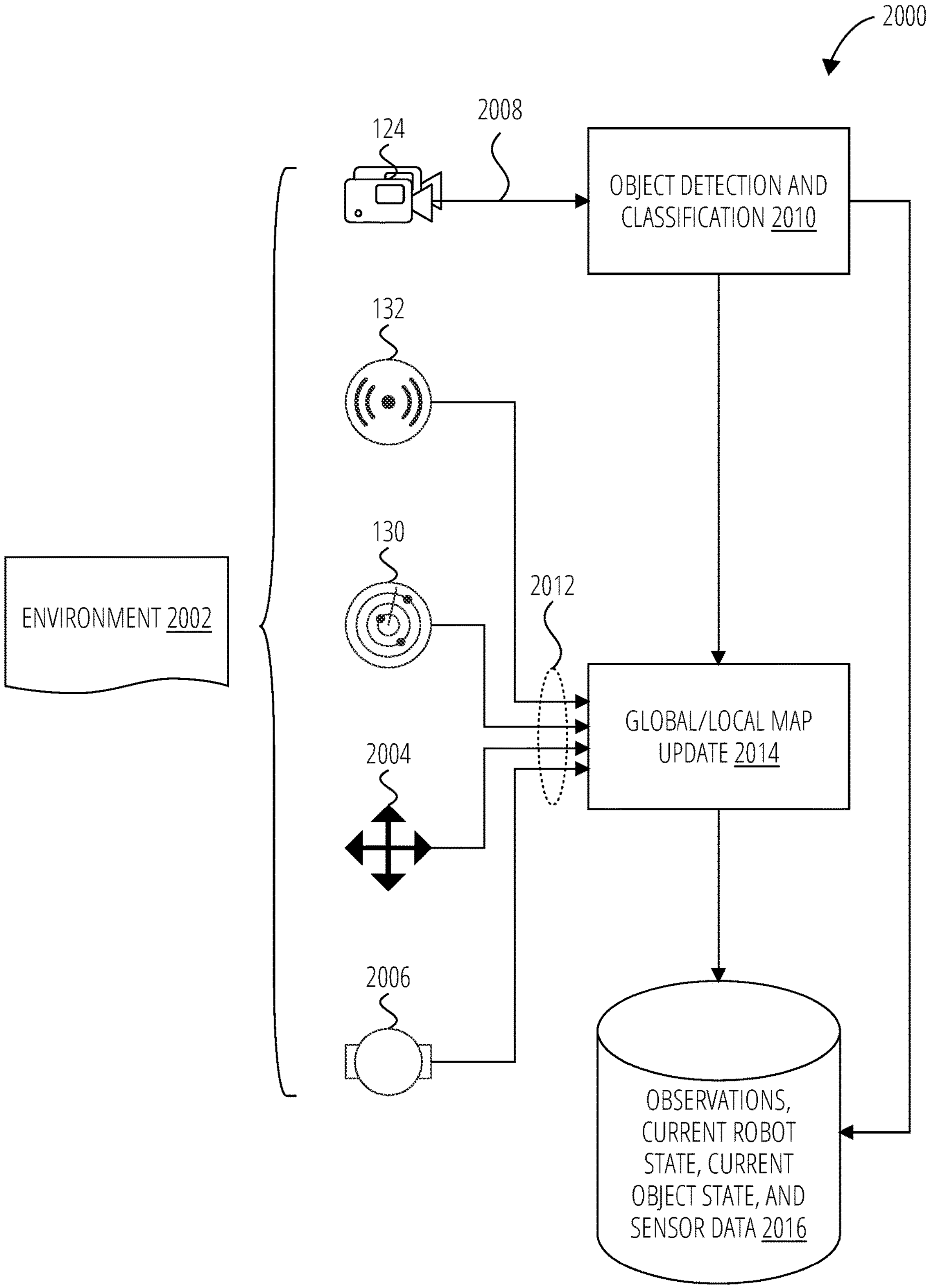
FIG. 20 illustrates sensor input analysis 2000 in accordance with one embodiment.

FIG. 20 illustrates sensor input analysis 2000 in accordance with one embodiment. Sensor input analysis 2000 may inform the robot 100 of the dimensions of its immediate environment 2002 and the location of itself and other objects within that environment 2002.

The robot 100 as previously described includes a sensing system 106. This sensing system 106 may include at least one of cameras 124, IMU sensors 132, lidar sensor 130, odometry 2004, and actuator force feedback sensor 2006. These sensors may capture data describing the environment 2002 around the robot 100.

Image data 2008 from the cameras 124 may be used for object detection and classification 2010. Object detection and classification 2010 may be performed by algorithms and models configured within the robotic control system 1900 of the robot 100. In this manner, the characteristics and types of objects in the environment 2002 may be determined.

Image data 2008, object detection and classification 2010 data, and other sensor data 2012 may be used for a global/local map update 2014. The global and/or local map may be stored by the robot 100 and may represent its knowledge of the dimensions and objects within its decluttering environment 2002. This map may be used in navigation and strategy determination associated with decluttering tasks.

The robot may use a combination of camera 124, lidar sensor 130 and the other sensors to maintain a global or local area map of the environment and to localize itself within that. Additionally, the robot may perform object detection and object classification and may generate visual re-identification fingerprints for each object. The robot may utilize stereo cameras along with a machine learning/neural network software architecture (e.g., semi-supervised or supervised convolutional neural network) to efficiently classify the type, size and location of different objects on a map of the environment.

The robot may determine the relative distance and angle to each object. The distance and angle may then be used to localize objects on the global or local area map. The robot may utilize both forward and backward facing cameras to scan both to the front and to the rear of the robot.

image data 2008, object detection and classification 2010 data, other sensor data 2012, and global/local map update 2014 data may be stored as observations, current robot state, current object state, and sensor data 2016. The observations, current robot state, current object state, and sensor data 2016 may be used by the robotic control system 1900 of the robot 100 in determining navigation paths and task strategies.

Figure 21:
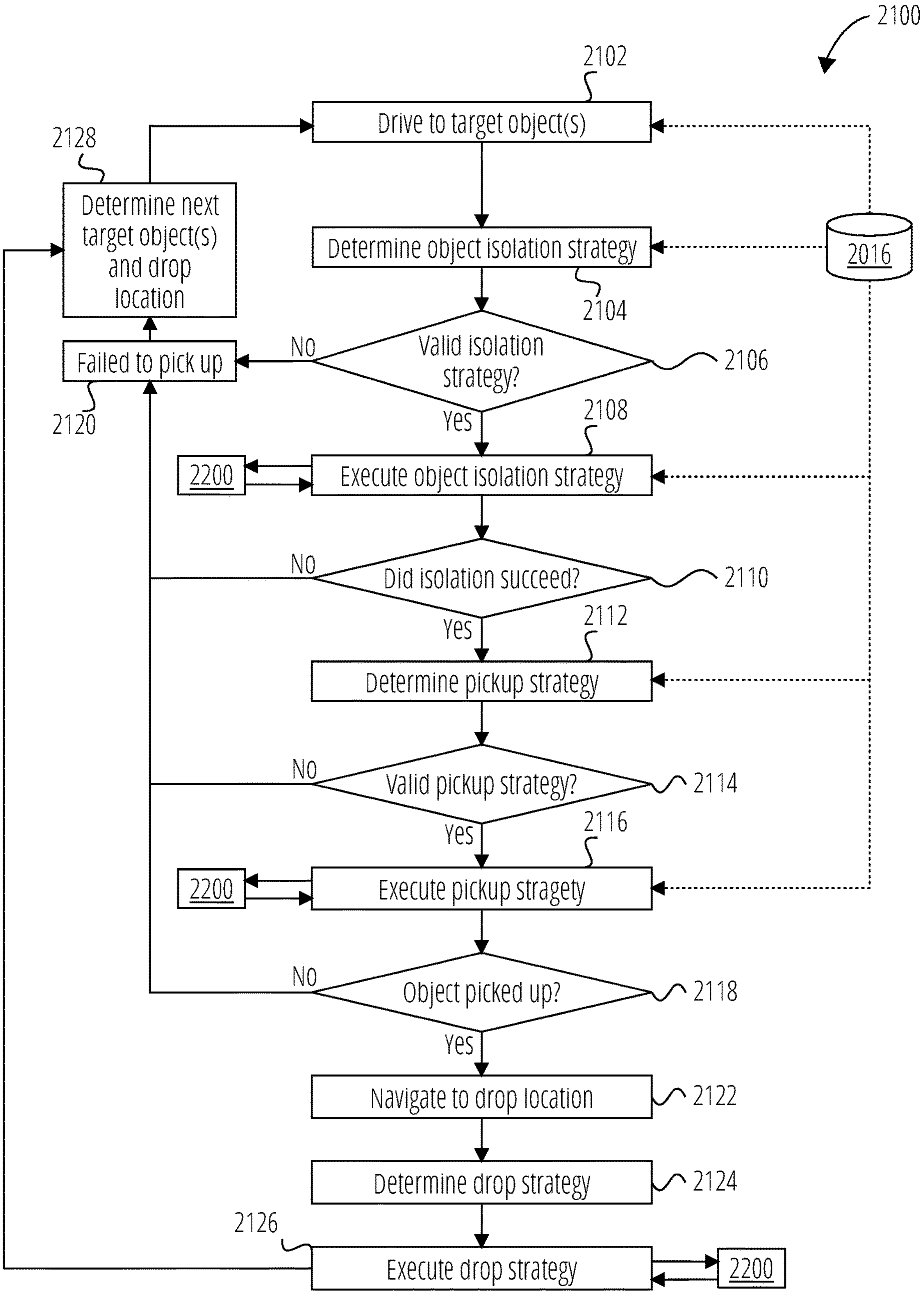
FIG. 21 illustrates a main navigation, collection, and deposition process 2100 in accordance with one embodiment.

FIG. 21 illustrates a main navigation, collection, and deposition process 2100 in accordance with one embodiment. According to some examples, the method includes driving to target object(s) at block 2102. For example, the robot 100 such as that introduced with respect to FIG. 1A may drive to target object(s) using a local map or global map to navigate to a position near the target object(s), relying upon observations, current robot state, current object state, and sensor data 2016 determined as illustrated in FIG. 20.

According to some examples, the method includes determining an object isolation strategy at block 2104. For example, the robotic control system 1900 illustrated in FIG. 1A may determine an object isolation strategy in order to separate the target object(s) from other objects in the environment based on the position of the object(s) in the environment. The object isolation strategy may be determined using a machine learning model or a rules based approach, relying upon observations, current robot state, current object state, and sensor data 2016 determined as illustrated in FIG. 20. In some cases, object isolation may not be needed, and related blocks may be skipped. For example, in an area containing few items to be picked up and moved, or where such items are not in a proximity to each other, furniture, walls, or other obstacles, that would lead to interference in picking up target objects, object isolation may not be needed.

In some cases, a valid isolation strategy may not exist. For example, the robotic control system 1900 illustrated in FIG. 1A may be unable to determine a valid isolation strategy. If it is determined at decision block 2106 that there is no valid isolation strategy, the target object(s) may be marked as failed to pick up at block 2120. The main navigation, collection, and deposition process 2100 may then advance to block 2128, where the next target object(s) are determined.

If there is a valid isolation strategy determined at decision block 2106, the robot 100 such as that introduced with respect to FIG. 1A may execute the object isolation strategy to separate the target object(s) from other objects at block 2108. The isolation strategy may follow strategy steps for isolation strategy, pickup strategy, and drop strategy 2200 illustrated in FIG. 22. The isolation strategy may be a reinforcement learning based strategy using rewards and penalties in addition to observations, current robot state, current object state, and sensor data 2016, or a rules based strategy relying upon observations, current robot state, current object state, and sensor data 2016 determined as illustrated in FIG. 20. Reinforcement learning based strategies relying on rewards and penalties are described in greater detail with reference to FIG. 22.

Rules based strategies may use conditional logic to determine the next logic based on observations, current robot state, current object state, and sensor data 2016 such as are developed in FIG. 20. Each rules based strategy may have a list of available actions it may consider. In one embodiment, a movement collision avoidance system may be used to determine the range of motion involved with each action. Rules based strategies for object isolation may include:

Navigating robot to a position facing the target object(s) to be isolated, but far enough away to open grabber pad arms and grabber pads and lower the shovel Opening the grabber pad arms and grabber pads, lowering the grabber pad arms and grabber pads, and lowering the shovel Turning robot slightly in-place so that target object(s) are centered in a front view Opening grabber pad arms and grabber pads to be slightly wider than target object(s)

Driving forward slowly until the end of the grabber pad arms and grabber pads is positioned past the target object(s)

Slightly closing the grabber pad arms and grabber pads into a V-shape so that the grabber pad arms and grabber pads surround the target object(s)

Driving backwards 100 centimeters, moving the target object(s) into an open space According to some examples, the method includes determining whether or not the isolation succeeded at decision block 2110. For example, the robotic control system 1900 illustrated in FIG. 1A may determine whether or not the target object(s) were successfully isolated. If the isolation strategy does not succeed, the target object(s) may be marked as failed to pickup at block 2120. The main navigation, collection, and deposition process 2100 advances to block 2128, where a next target object is determined. In some embodiments, rather than determining a next target object, a different strategy may be selected for the same target object. For example, if target object(s) are not able to be isolated by the current isolation strategy, a different isolation strategy may be selected and isolation retried.

If the target object(s) were successfully isolated, the method then includes determining a pickup strategy at block 2112. For example, the robotic control system 1900 illustrated in FIG. 1A may determine the pickup strategy. The pickup strategy for the particular target object(s) and location may be determined using a machine learning model or a rules based approach, relying upon observations, current robot state, current object state, and sensor data 2016 determined as illustrated in FIG. 20.

In some cases, a valid pickup strategy may not exist. For example, the robotic control system 1900 illustrated in FIG. 1A may be unable to determine a valid pickup strategy. If it is determined at decision block 2114 that there is no valid pickup strategy, the target object(s) may be marked as failed to pick up at block 2120, as previously noted. The pickup strategy may need to take into account:

An initial default position for the grabber pad arms and the shovel before starting pickup A floor type detection for hard surfaces versus carpet, which may affect pickup strategies A final shovel and grabber pad arm position for carrying If there is a valid pickup strategy determined at decision block 2114, the robot 100 such as that introduced with respect to FIG. 1A may execute a pickup strategy at block 2116. The pickup strategy may follow strategy steps for isolation strategy, pickup strategy, and drop strategy 2200 illustrated in FIG. 22. The pickup strategy may be a reinforcement learning based strategy or a rules based strategy, relying upon observations, current robot state, current object state, and sensor data 2016 determined as illustrated in FIG. 20. Rules based strategies for object pickup may include:

Navigating the robot to a position facing the target object(s), but far enough away to open the grabber pad arms and grabber pads and lower the shovel Opening the grabber pad arms and grabber pads, lowering the grabber pad arms and grabber pads, and lowering the shovel Turning the robot slightly in-place so that the target object(s) are centered in the front view Driving forward until the target object(s) are in a "pickup zone" against the edge of the shovel Determining a center location of target object(s) against the shovel—on the right, left or center If on the right, closing the right grabber pad arm and grabber pad first with the left grabber pad arm and grabber pad closing behind Otherwise, closing the left grabber pad arm and grabber pad first with the right grabber pad arm and grabber pad closing behind Determining if target object(s) were successfully pushed into the shovel If yes, then pickup was successful If no, lift grabber pad arms and grabber pads and then try again at an appropriate part of the strategy.

According to some examples, the method includes determining whether or not the target object(s) were picked up at decision block 2118. For example, the robotic control system 1900 illustrated in FIG. 1A may determine whether or not the target object(s) were picked up. Pickup success may be evaluated using:

Object detection within the area of the shovel and grabber pad arms (i.e., the containment area as previously illustrated) to determine if the object is within the shovel/grabber pad arms/containment area Force feedback from actuator force feedback sensors indicating that the object is retained by the grabber pad arms Tracking motion of object(s) during pickup into area of shovel and retaining the state of those object(s) in memory (memory is often relied upon as objects may no longer be visible when the shovel is in its carrying position)

Detecting an increased weight of the shovel during lifting indicating the object is in the shovel Utilizing a classification model for whether an object is in the shovel Using force feedback, increased weight, and/or a dedicated camera to re-check that an object is in the shovel while the robot is in motion If the pickup strategy fails, the target object(s) may be marked as failed to pick up at block 2120, as previously described. If the target object(s) were successfully picked up, the method includes navigating to drop location at block 2122. For example, the robot 100 such as that introduced with respect to FIG. 1A may navigate to a predetermined drop location. The drop location may be a container or a designated area of the ground or floor. Navigation may be controlled by a machine learning model or a rules based approach.

According to some examples, the method includes determining a drop strategy at block 2124. For example, the robotic control system 1900 illustrated in FIG. 1A may determine a drop strategy. The drop strategy may need to take into account the carrying position determined for the pickup strategy. The drop strategy may be determined using a machine learning model or a rules based approach. Rules based strategies for object drop may include:

Navigate the robot to a position 100 centimeters away from the side of a bin

Turn the robot in place to align it facing the bin

Drive toward the bin maintaining an alignment centered on the side of the bin

Stop three centimeters from the side of the bin

Verify that the robot is correctly positioned against the side of the bin

If yes, lift the shovel up and back to drop target object(s) into the bin

If no, drive away from bin and restart the process

Object drop strategies may involve navigating with a rear camera if attempting a back drop, or with the front camera if attempting a forward drop.

According to some examples, the method includes executing the drop strategy at block 2126. For example, the robot 100 such as that introduced with respect to FIG. 1A may execute the drop strategy. The drop strategy may follow strategy steps for isolation strategy, pickup strategy, and drop strategy 2200 illustrated in FIG. 22. The drop strategy may be a reinforcement learning based strategy or a rules based strategy. Once the drop strategy has been executed at block 2126, the method may proceed to determining the next target object(s) at block 2128. For example, the robotic control system 1900 illustrated in FIG. 1A may determine next target object(s). Once new target object(s) have been determined, the process may be repeated for the new target object(s).

Strategies such as the isolation strategy, pickup strategy, and drop strategy referenced above may be simple strategies, or may incorporate rewards and collision avoidance elements. These strategies may follow general approaches such as the strategy steps for isolation strategy, pickup strategy, and drop strategy 2200 illustrated in FIG. 22.

In some embodiments, object isolation strategies may include:

Using grabber pad arms and grabber pads on the floor in a V-shape to surround object(s) and backing up Precisely grasping the object(s) and backing up with grabber pad arms and grabber pads in a V-shape Loosely rolling a large object away with grabber pad arms and grabber pads elevated Spreading out dense clutter by loosely grabbing a pile and backing up Placing a single grabber pad arm/grabber pad on the floor between target object(s) and clutter, then turning Putting small toys in the shovel, then dropping them to separate them Using a single grabber pad arm/grabber pad to move object(s) away from a wall In some embodiments, pickup strategies may include:

Closing the grabber pad arms/grabber pads on the floor to pick up a simple object Picking up piles of small objects like small plastic building blocks by closing grabber pad arms/grabber pads on the ground Picking up small, rollable objects like balls by batting them lightly on their tops with grabber pad arms/grabber pads, thus rolling them into the shovel Picking up deformable objects like clothing using grabber pad arms/grabber pads to repeatedly compress the object(s) into the shovel Grabbing an oversized, soft object like a large stuffed animal by grabbing and compressing it with the grabber pad arms/grabber pads Grabbing a large ball by rolling it and holding it against the shovel with raised grabber pad arms/grabber pads Picking up flat objects like puzzle pieces by passing the grabber pads over them sideways to cause instability Grasping books and other large flat objects Picking up clothes with grabber pad arms/grabber pads, lifting them above the shovel, and then dropping them into the shovel Rolling balls by starting a first grabber pad arm movement and immediately starting a second grabber pad arm movement In some embodiments, drop strategies may include:

Back dropping into a bin

Front dropping into a bin

Forward releasing onto the floor

Forward releasing against a wall

Stacking books or other flat objects

Figure 22:
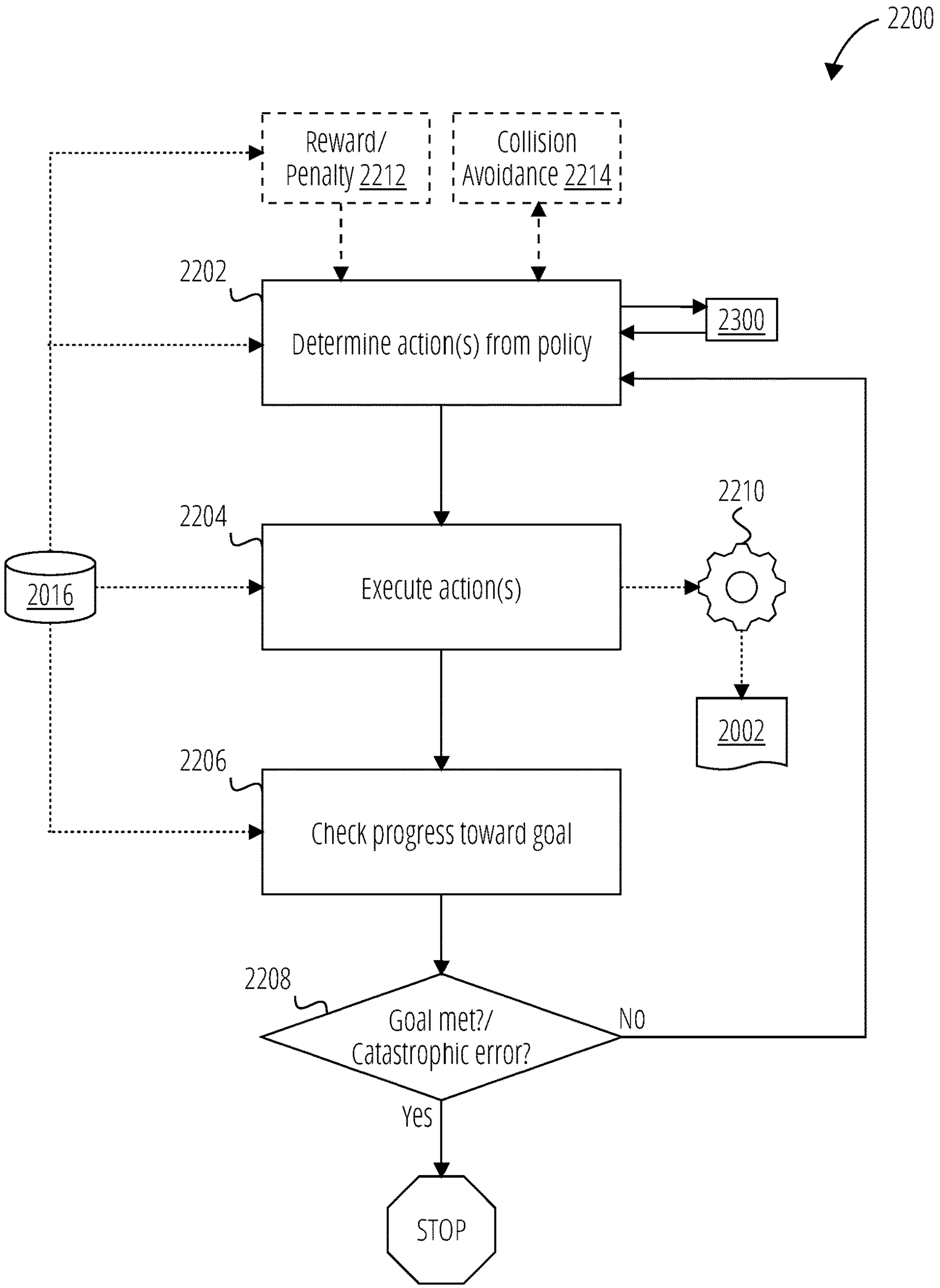
FIG. 22 illustrates strategy steps for isolation strategy, pickup strategy, and drop strategy 2200 in accordance with one embodiment.

Directly dropping a large object using grabber pad arms/grabber pads instead of relying on the shovel FIG. 22 illustrates strategy steps for isolation strategy, pickup strategy, and drop strategy 2200 in accordance with one embodiment. According to some examples, the method includes determining action(s) from a policy at block 2202. For example, the robotic control system 1900 illustrated in FIG. 1A may determine action(s) from the policy. The next action(s) may be based on the policy along with observations, current robot state, current object state, and sensor data 2016. The determination may be made through the process for determining an action from a policy 2300 illustrated in FIG. 23.

In one embodiment, strategies may incorporate a reward or penalty 2212 in determining action(s) from a policy at block 2202. These rewards or penalties 2212 may primarily be used for training the reinforcement learning model and, in some embodiments, may not apply to ongoing operation of the robot. Training the reinforcement learning model may be performed using simulations or by recording the model input/output/rewards/penalties during robot operation. Recorded data may be used to train reinforcement learning models to choose actions that maximize rewards and minimize penalties. In some embodiments, rewards or penalties 2212 for object pickup using reinforcement learning may include:

Small penalty added every second

Reward when target object(s) first touches edge of shovel

Reward when target object(s) pushed fully into shovel

Penalty when target object(s) lost from shovel

Penalty for collision with obstacle or wall (exceeding force feedback maximum)

Penalty for picking up non-target object

Penalty if robot gets stuck or drives over object

In some embodiments, rewards or penalties 2212 for object isolation (e.g., moving target object(s) away from a wall to the right) using reinforcement learning may include:

Small penalty added every second

Reward when right grabber pad arm is in-between target object(s) and wall

Reward when target object(s) distance from wall exceeds ten centimeters

Penalty for incorrectly colliding with target object(s)

Penalty for collision with obstacle or wall (exceeding force feedback maximum)

Penalty if robot gets stuck or drives over object

In some embodiments, rewards or penalties 2212 for object dropping using reinforcement learning may include:

Small penalty added every second

Reward when robot correctly docks against bin

Reward when target object(s) is successfully dropped into bin

Penalty for collision that moves bin

Penalty for collision with obstacle or wall (exceeding force feedback maximum)

Penalty if robot gets stuck or drives over object

In at least one embodiment, techniques described herein may use a reinforcement learning approach where the problem is modeled as a Markov decision process (MDP) represented as a tuple (S, O, A, P, r, $\gamma$), where S is the set of states in the environment, O is the set of observations, A is the set of actions, P: $S\times A\times S\rightarrow\mathbb{R}$ is the state transition probability function, r: $S\times A\rightarrow\mathbb{R}$ is the reward function, and $\gamma$ is a discount factor.

In at least one embodiment, the goal of training may be to learn a deterministic policy $\pi$: $O\rightarrow A$ such that taking action $a_t=\pi(o_t)$ at time t maximizes the sum of discounted future rewards from state $s_t$:

$$R_t = \sum_{i=t}^{\infty} \gamma^{i-t} r(s_i, a_i)$$

In at least one embodiment, after taking action $a_t$, the environment transitions from state $s_t$, to state $s_{t+1}$ by sampling from P. In at least one embodiment, the quality of taking action $a_t$ in state $s_t$ is measured by $Q(s_t, a_t)=\mathbb{E}[R_t|s_t, a_t]$, known as the Q-function.

In one embodiment, data from a movement collision avoidance system 2214 may be used in determining action(s) from a policy at block 2202. Each strategy may have an associated list of available actions which it may consider. A strategy may use the movement collision avoidance system to determine the range of motion for each action involved in executing the strategy. For example, the movement collision avoidance system may be used to see if the shovel may be lowered to the ground without hitting the grabber pad arms or grabber pads (if they are closed under the shovel), an obstacle such as a nearby wall, or an object (like a ball) that may have rolled under the shovel.

According to some examples, the method includes executing action(s) at block 2204. For example, the robot 100 such as that introduced with respect to FIG. 1A may execute the action(s) determined from block 2202. The actions may be based on the observations, current robot state, current object state, and sensor data 2016. The actions may be performed through motion of the robot motors and other actuators 2210 of the robot 100. The real world environment 2002 may be affected by the motion of the robot 100. The changes in the environment 2002 may be detected as described with respect to FIG. 20.

According to some examples, the method includes checking progress toward a goal at block 2206. For example, the robotic control system 1900 illustrated in FIG. 1A may check the progress of the robot 100 toward the goal. If this progress check determines that the goal of the strategy has been met, or that a catastrophic error has been encountered at decision block 2208, execution of the strategy will be stopped. If the goal has not been met and no catastrophic error has occurred, the strategy may return to block 2202.

Figure 23:
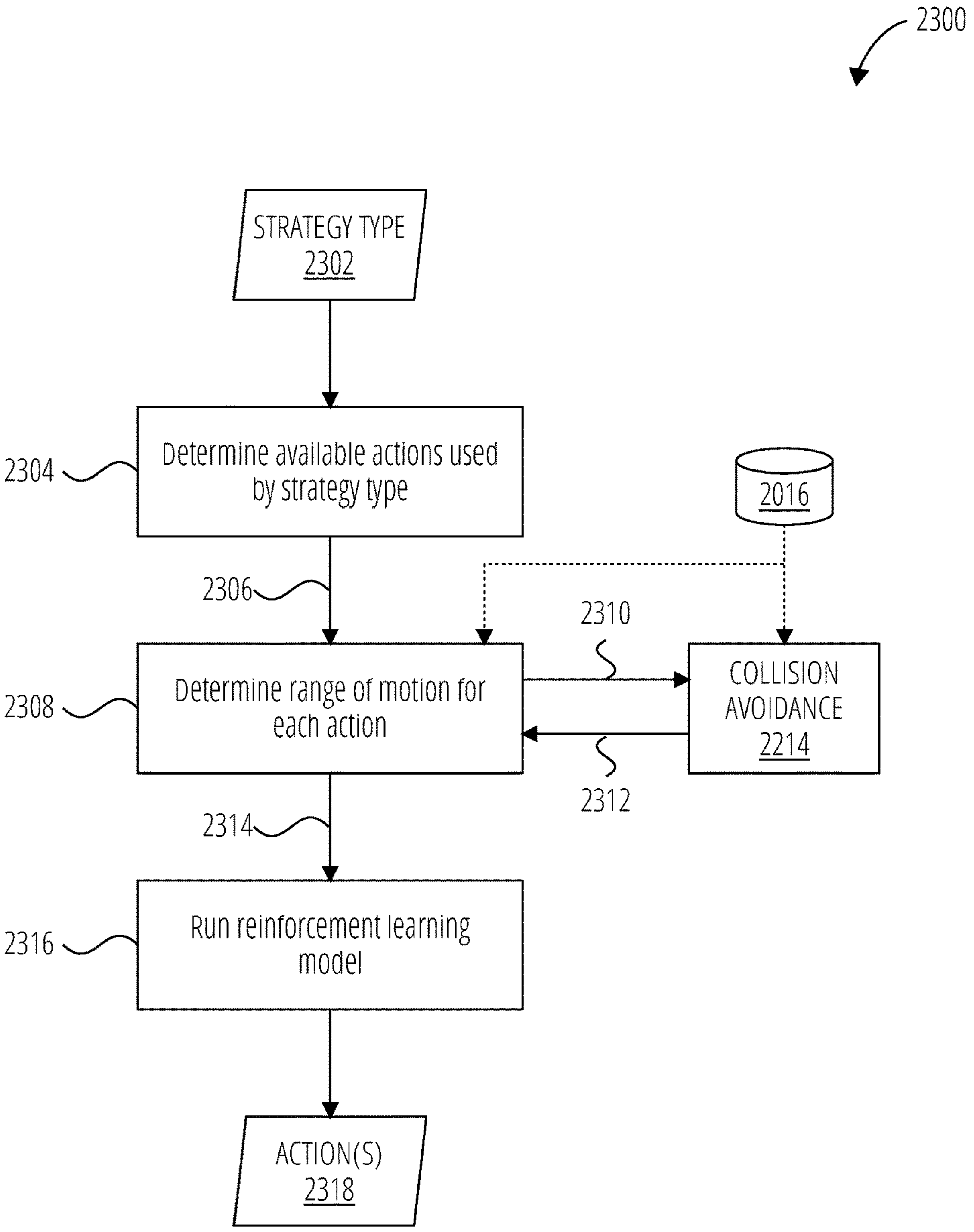
FIG. 23 illustrates process for determining an action from a policy 2300 in accordance with one embodiment.

FIG. 23 illustrates process for determining an action from a policy 2300 in accordance with one embodiment. The process for determining an action from a policy 2300 may take into account a strategy type 2302, and may, at block 2304 determined the available actions to be used based on the strategy type 2302. Reinforcement learning algorithms or rules based algorithms may take advantage of both simple actions and pre-defined composite actions. Examples of simple actions controlling individual actuators may include:

Moving the left grabber pad arm to a new position (rotating up or down)

Moving the left grabber pad wrist to a new position (rotating left or right)

Moving the right grabber pad arm to a new position (rotating up or down)

Moving the right grabber pad wrist to a new position (rotating left or right)

Lifting the shovel to a new position (rotating up or down)

Changing the shovel angle (with a second motor or actuator for front dropping)

Driving a left wheel

Driving a right wheel

Examples of pre-defined composite actions may include:

Driving the robot following a path to a position/waypoint

Turning the robot in place left or right

Centering the robot with respect to object(s)

Aligning grabber pad arms with objects' top/bottom/middle

Driving forward until an object is against the edge of the shovel

Closing both grabber pad arms, pushing object(s) with a smooth motion

Lifting the shovel and grabber pad arms together while grasping object(s)

Closing both grabber pad arms, pushing object(s) with a quick tap and slight release Setting the shovel lightly against the floor/carpet Pushing the shovel down against the floor/into the carpet Closing the grabber pad arms until resistance is encountered/pressure is applied and hold that position Closing the grabber pad arms with vibration and left/right turning to create instability and slight bouncing of flat objects over shovel edge At block 2308, the process for determining an action from a policy 2300 may take the list of available actions 2306 determined at block 2304, and may determine a range of motion 2312 for each action. The range of motion 2312 may be determined based on the observations, current robot state, current object state, and sensor data 2016 available to the robot control system. Action types 2310 may also be indicated to the movement collision avoidance system 2214, and the movement collision avoidance system 2214 may determine the range of motion 2312.

Block 2308 of process for determining an action from a policy 2300 may determine an observations list 2314 based on the ranges of motion 2312 determined. An example observations list 2314 may include:

Detected and categorized objects in the environment

Global or local environment map

State 1: Left arm position 20 degrees turned in

State 2: Right arm position 150 degrees turned in

State 3: Target object 15 centimeters from shovel edge

State 4: Target object 5 degrees right of center

Action 1 max range: Drive forward 1 centimeter max

Action 2 max range: Drive backward 10 centimeters max

Action 3 max range: Open left arm 70 degrees max

Action 4 max range: Open right arm 90 degrees max

Action 5 max range: Close left arm 45 degrees max

Action 6 max range: Close right arm 0 degrees max

Action 7 max range: Turn left 45 degrees max

Action 8 max range: Turn right 45 degrees max

At block 2316, a reinforcement learning model may be run based on the observations list 2314. The reinforcement learning model may return action(s) 2318 appropriate for the strategy the robot 100 is attempting to complete based on the policy involved.

Figure 24:
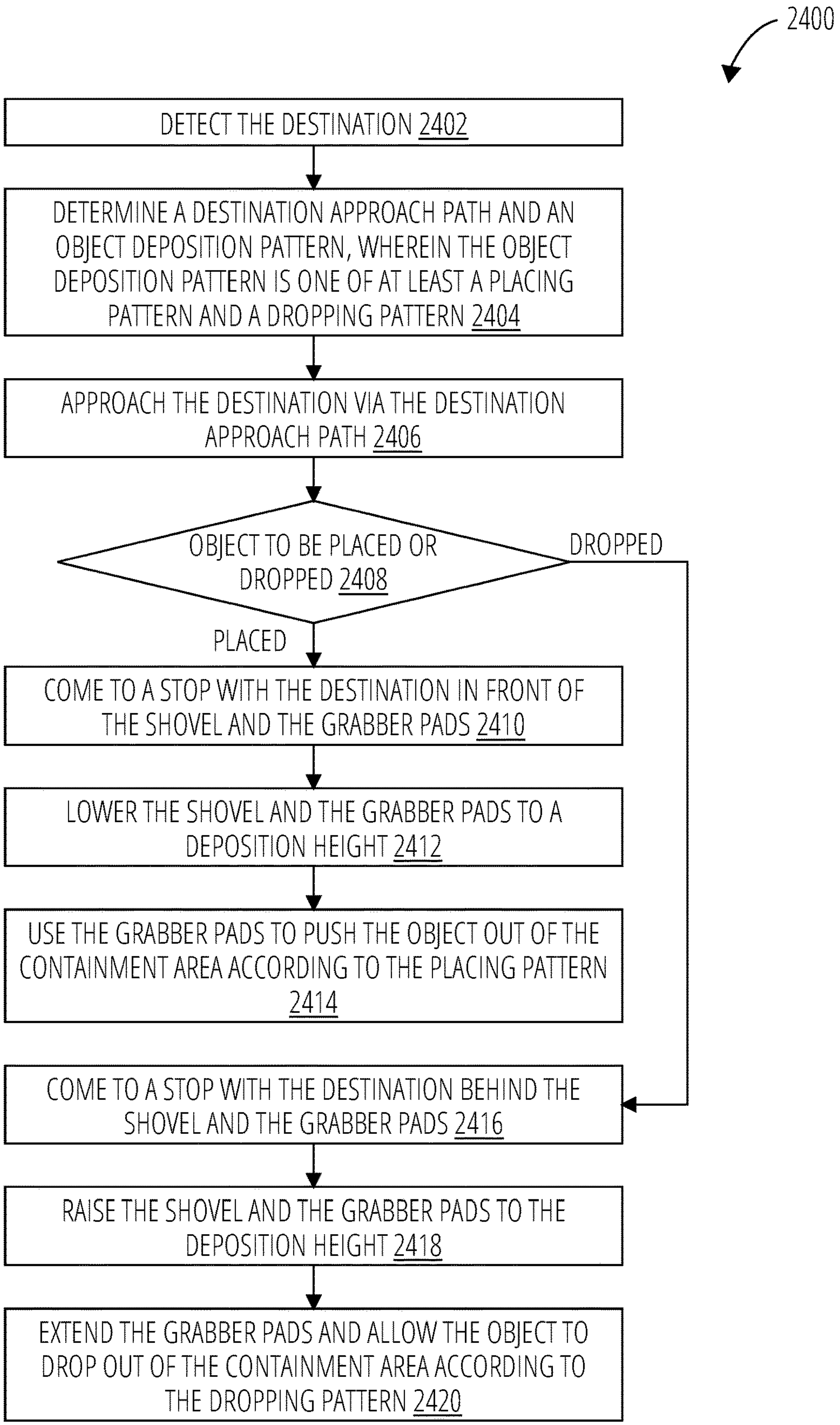
FIG. 24 illustrates a deposition process 2400 portion of the disclosed algorithm in accordance with one embodiment.

FIG. 24 illustrates a deposition process 2400 in accordance with one embodiment. The deposition process 2400 may be performed by a robot 100 such as that introduced with respect to FIG. 1A as part of the algorithm disclosed herein. This robot may have the sensing system, control system, mobility system, grabber pads, grabber pad arms, and shovel illustrated in FIG. 1A through FIG. 1D or similar systems and features performing equivalent functions as is well understood in the art.

In block 2402, the robot may detect the destination where an object carried by the robot is intended to be deposited. In block 2404, the robot may determine a destination approach path to the destination. This path may be determined so as to avoid obstacles in the vicinity of the destination. In some embodiments, the robot may perform additional navigation steps to push objects out of and away from the destination approach path. The robot may also determine an object deposition pattern, wherein the object deposition pattern is one of at least a placing pattern and a dropping pattern. Some neatly stackable objects such as books, other media, narrow boxes, etc., may be most neatly decluttered by stacking them carefully. Other objects may not be neatly stackable, but may be easy to deposit by dropping into a bin. Based on object attributes, the robot may determine which object deposition pattern is most appropriate to the object.

In block 2406, the robot may approach the destination via the destination approach path. How the robot navigates the destination approach path may be determined based on the object deposition pattern. If the object being carried is to be dropped over the back of the robot's chassis, the robot may traverse the destination approach path in reverse, coming to a stop with the back of the chassis nearest the destination. Alternatively, for objects to be stacked or placed in front of the shovel, i.e., at the area of the shovel that is opposite the chassis, the robot may travel forward along the destination approach path so as to bring the shovel nearest the destination.

At decision block 2408, the robot may proceed in one of at least two ways, depending on whether the object is to be placed or dropped. If the object deposition pattern is intended to be a placing pattern, the robot may proceed to block 2410. If the object deposition pattern is intended to be a dropping pattern, the robot may proceed to block 2416.

For objects to be placed via the placing pattern, the robot may come to a stop with the destination in front of the shovel and the grabber pads at block 2410. In block 2412, the robot may lower the shovel and the grabber pads to a deposition height. For example, if depositing a book on an existing stack of books, the deposition height may be slightly above the top of the highest book in the stack, such that the book may be placed without disrupting the stack or dropping the book from a height such that it might have enough momentum to slide off the stack or destabilize the stack. Finally, at block 2414, the robot may use its grabber pads to push the object out of the containment area and onto the destination. In one embodiment, the shovel may be tilted forward to drop objects, with or without the assistance of the grabber pads pushing the objects out from the shovel.

If in decision block 2408 the robot determines that it will proceed with an object deposition pattern that is a dropping pattern, the robot may continue to block 2416. At block 2416, the robot may come to a stop with the destination behind the shovel and the grabber pads, and by virtue of this, behind the chassis for a robot such as the one illustrated beginning in FIG. 1A. In block 2418, the robot may raise the shovel and the grabber pads to the deposition height. In one embodiment the object may be so positioned that raising the shovel and grabber pad arms from the carrying position to the deposition height results in the object dropping out of the containment area into the destination area. Otherwise, in block 2420, the robot may extend the grabber pads and allow the object to drop out of the containment area, such that the object comes to rest at or in the destination area. In one embodiment, the shovel may be tilted forward to drop objects, with or without the assistance of the grabber pads pushing the objects out from the shovel.

Figure 25:
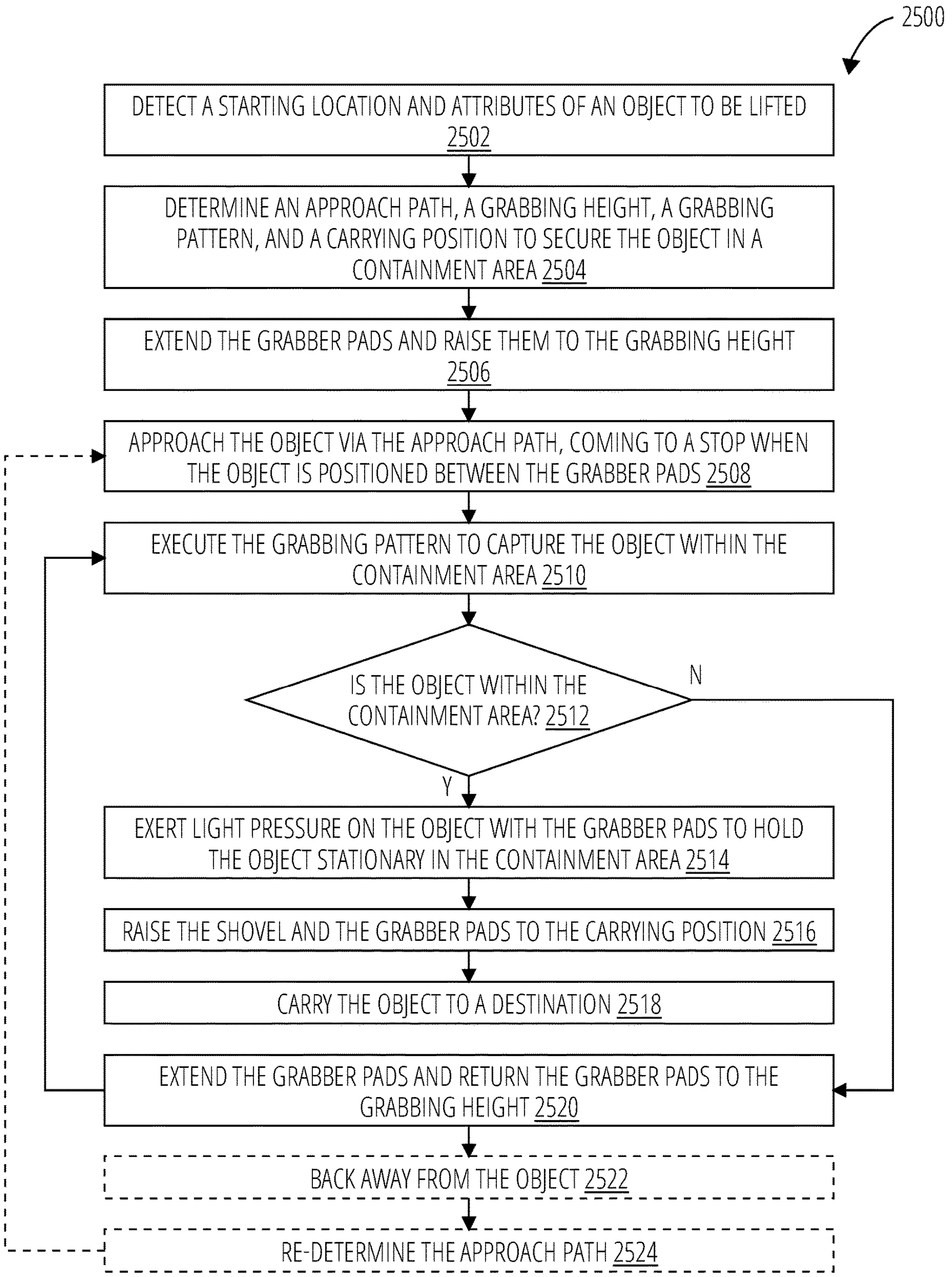
FIG. 25 illustrates a capture process 2500 portion of the disclosed algorithm in accordance with one embodiment.

The disclosed algorithm may comprise a capture process 2500 as illustrated in FIG. 25. The capture process 2500 may be performed by a robot 100 such as that introduced with respect to FIG. 1A. This robot may have the sensing system, control system, mobility system, grabber pads, grabber pad arms, and shovel illustrated in FIG. 1A through FIG. 1D, or similar systems and features performing equivalent functions as is well understood in the art.

The capture process 2500 may begin in block 2502 where the robot detects a starting location and attributes of an object to be lifted. Starting location may be determined relative to a learned map of landmarks within a room the robot is programmed to declutter. Such a map may be stored in memory within the electrical systems of the robot. These systems are described in greater detail with regard to FIG. 19. Object attributes may be detected based on input from a sensing system, which may comprise cameras, LIDAR, or other sensors. In some embodiments, data detected by such sensors may be compared to a database of common objects to determine attributes such as deformability and dimensions. In some embodiments, the robot may use known landmark attributes to calculate object attributes such as dimensions. In some embodiments, machine learning may be used to improve attributes detection and analysis.

In block 2504, the robot may determine an approach path to the starting location. The approach path may take into account the geometry of the surrounding space, obstacles detected around the object, and how components the robot may be configured as the robot approaches the object. The robot may further determine a grabbing height for initial contact with the object. This grabbing height may take into account an estimated center of gravity for the object in order for the grabber pads to move the object with the lowest chance of slipping off of, under, or around the object, or deflecting the object in some direction other than into the shovel. The robot may determine a grabbing pattern for movement of the grabber pads during object capture, such that objects may be contacted from a direction and with a force applied in intervals optimized to direct and impel the object into the shovel. Finally, the robot may determine a carrying position of the grabber pads and a shovel that secures the object in a containment area for transport after the object is captured. This position may take into account attributes such as the dimensions of the object, its weight, and its center of gravity.

In block 2506, the robot may extend its grabber pads out and forward with respect to the grabber pad arms and raise the grabber pads to the grabbing height. This may allow the robot to approach the object as nearly as possible without having to leave room for this extension after the approach. Alternately, the robot may perform some portion of the approach with arms folded in close to the chassis and shovel to prevent impacting obstacles along the approach path. In some embodiments, the robot may first navigate the approach path and deploy arms and shovel to clear objects out of and away from the approach path. In block 2508, the robot may finally approach the object via the approach path, coming to a stop when the object is positioned between the grabber pads.

In block 2510, the robot may execute the grabbing pattern determined in block 2502 to capture the object within the containment area. The containment area may be an area roughly described by the dimensions of the shovel and the disposition of the grabber pad arms with respect to the shovel. It may be understood to be an area in which the objects to be transported may reside during transit with minimal chances of shifting or being dislodged or dropped from the shovel and grabber pad arms. In decision block 2512, the robot may confirm that the object is within the containment area. If the object is within the containment area, the robot may proceed to block 2514.

In block 2514, the robot may exert a light pressure on the object with the grabber pads to hold the object stationary in the containment area. This pressure may be downward in some embodiments to hold an object extending above the top of the shovel down against the sides and surface of the shovel. In other embodiments this pressure may be horizontally exerted to hold an object within the shovel against the back of the shovel. In some embodiments, pressure may be against the bottom of the shovel in order to prevent a gap from forming that may allow objects to slide out of the front of the shovel.

In block 2516, the robot may raise the shovel and the grabber pads to the carrying position determined in block 2502. The robot may then at block 2518 carry the object to a destination. The robot may follow a transitional path between the starting location and a destination where the object will be deposited. To deposit the object at the destination, the robot may follow the deposition process 2400 illustrated in FIG. 24.

If at decision block 2512 the object is not detected within the containment area, or is determined to be partially or precariously situated within the containment area, the robot may at block 2520 extend the grabber pads out of the shovel 2946 and forward with respect to the grabber pad arms and return the grabber pads to the grabbing height. The robot may then return to block 2510. In some embodiments, the robot may at block 2522 back away from the object if simply releasing and reattempting to capture the object is not feasible. This may occur if the object has been repositioned or moved by the initial attempt to capture it. In block 2524, the robot may re-determine the approach path to the object. The robot may then return to block 2508.

Figure 26:
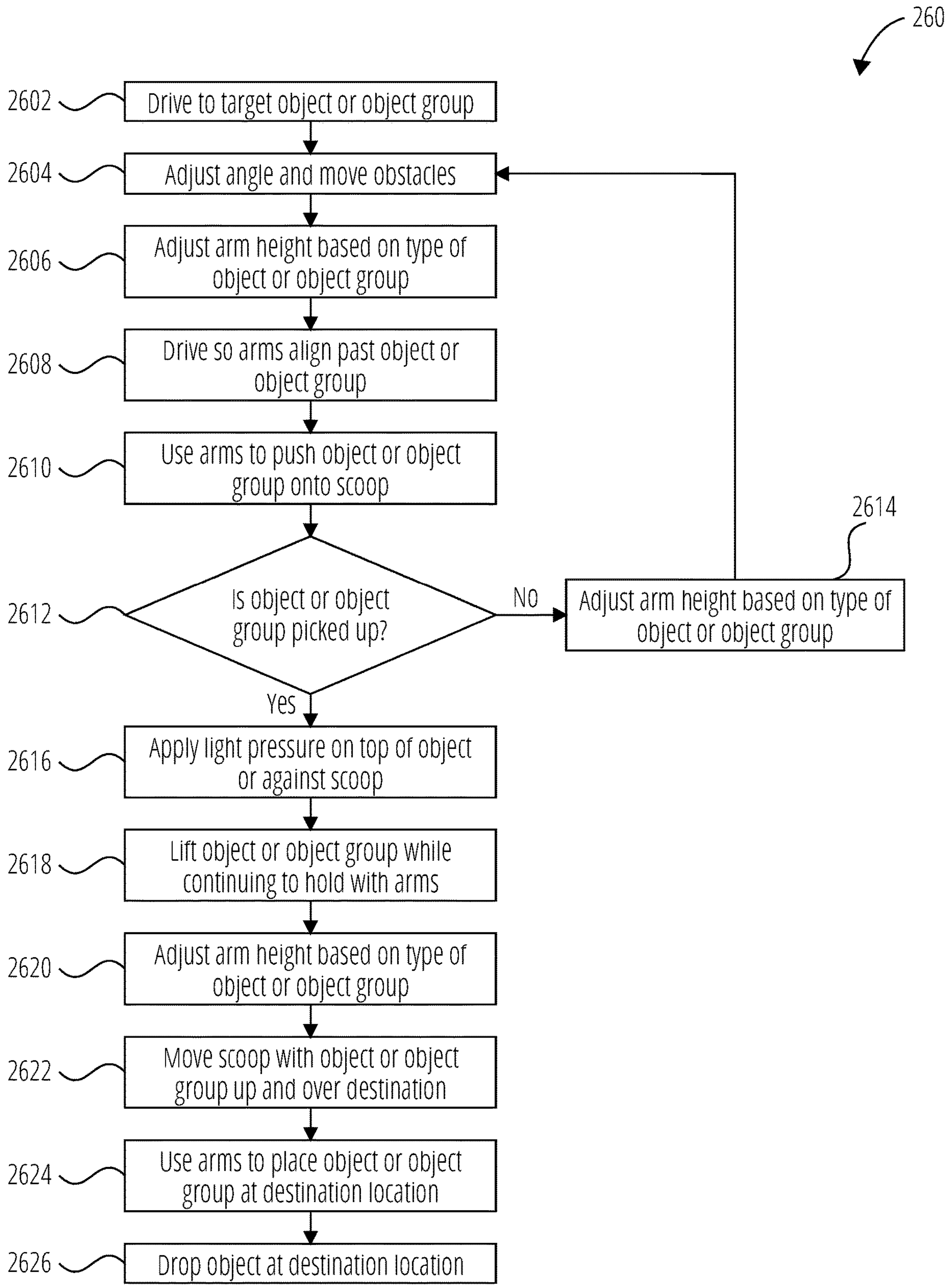
FIG. 26 illustrates a first part of a process diagram 2600 in accordance with one embodiment.

FIG. 26 illustrates the beginning of a process diagram 2600 in accordance with one embodiment of the deposition process 2400 and capture process 2500 illustrated above. In step 2602, the robot may drive to a target object or object group. The robot may use a local map or a global map to navigate to be near the target object or object group.

In step 2604, the robot may adjust the approach angle and move obstacles. The best angle of approach may be determined for the particular object, such as approaching a book from the direction of its spine. The grabber pad arms may be used to push obstacles out of the way, and the robot may drive to adjust its angle of approach.

In step 2606, the robot may adjust its arm height based on the type of object or object group. The strategy for picking up the target object or object group includes the arm height and may differ by object to be picked up. For example, a basketball may be pushed from its top so it will roll. A stuffed animal may be pushed from its middle so it will slide and not fall sideways and become harder to push, or flop over the grabber pad arms. A book may be pushed from its sides, very near the floor. Legos may be pushed with the arms against the floor.

At step 2608, the robot may drive such that arms are aligned past the object or object group. The object or object group may be in contact with the shovel or scoop, and may lie within the area inside the two grabber pad arms.

At step 2610, the robot may use its arms to push the object or object group onto the shovel or scoop. The arms may be used intelligently, per a grabbing pattern as described previously. In some instances, both arms may push gradually together, but adjustments may be made as objects tumble and move.

At step 2612, the robot may determine if the object is picked up or not. The camera sensor or other sensor may be utilized to see or detect if the object or object group has been successfully pushed into onto the shovel or scoop. If the object is not picked up, then in step 2614 the robot may release arms up and open. The arms may first be released slightly, such that the object is not being squeezed, then moved up and over the object or object group so that it is not pushed farther out of or farther away from the shovel or scoop than it is. This allows the robot to make incremental progress with picking up if the initial actions are not sufficient. From here the robot may return to step 2604. If the object is detected to be within the shovel at step 2612, the robot may proceed to step 2616.

In step 2616, the robot may apply light pressure on top of the object or against the shovel or scoop. Based on the object type, the robot may thereby apply pressure to the object in order to hold the object or object group within the shovel or scoop. For example, the robot may hold the top of a basketball firmly, squeeze a stuffed animal, push down on a book, or push against the shovel or scoop to retain a group of small objects such as marbles or plastic construction blocks.

At step 2618, the robot may lift the object or object group while continuing to hold with the grabber pad arms. The shovel or scoop and the arms may be lifted together to an intended angle, such as forty-five degrees, in order to carry the object or the object group without them rolling out of or being dislodged from the shovel or scoop. With the shovel and arms raised to the desired angle, the arms may continue to apply pressure to keep the object secure in the shovel.

At step 2620, the robot may drive to the destination location to place the object. The robot may use a local or a global map to navigate to the destination location in order to place the object or object group. For example, this may be a container intended to hold objects, a stack of books, or a designated part of the floor where the object or object group may be out of the way.

At step 2622, the robot may move the shovel or scoop holding the object or object group up and over the destination. The shovel height or position may be adjusted to align with the destination location. For example, the shovel or scoop may be lifted over a container, or aligned with the area above the top of an existing pile of books.

At step 2624, the robot may use its grabber pad arms to place the object or object group at the destination location. The arms may be opened to drop the object or object group into the container, or may be used to push objects forward out of the shovel or scoop. For example, a basketball may be dropped into a container, over the back of the robot, and a book may be carefully pushed forward onto an existing stack of books. Finally, the process ends at step 2626, with the object successfully dropped or placed at the destination.

Figure 27A:
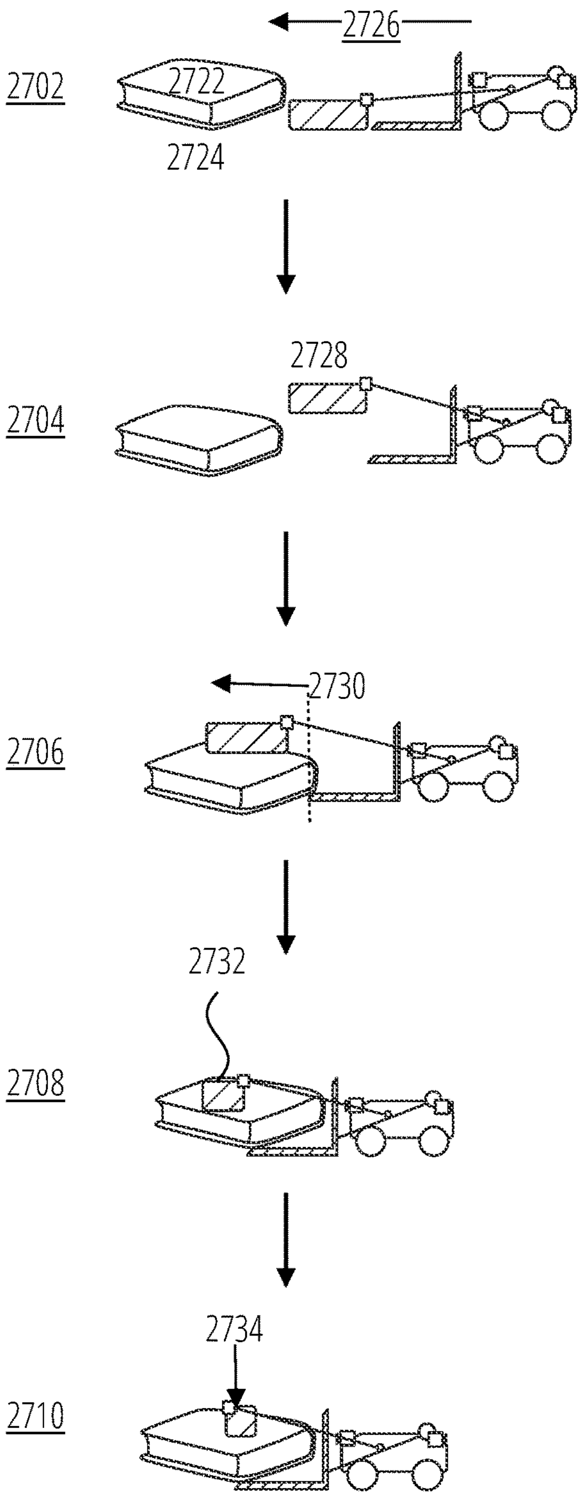
FIG. 27A through FIG. 27D illustrate a process for a stackable object 2700 in accordance with one embodiment.
Figure 27B:
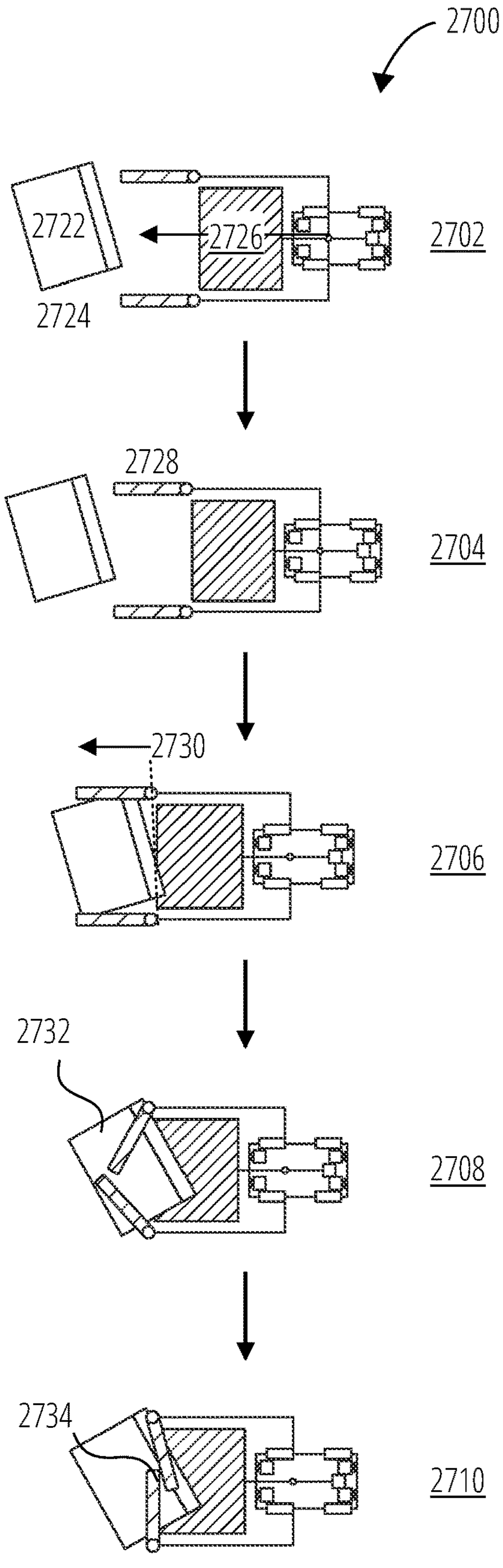
Figure 27C:
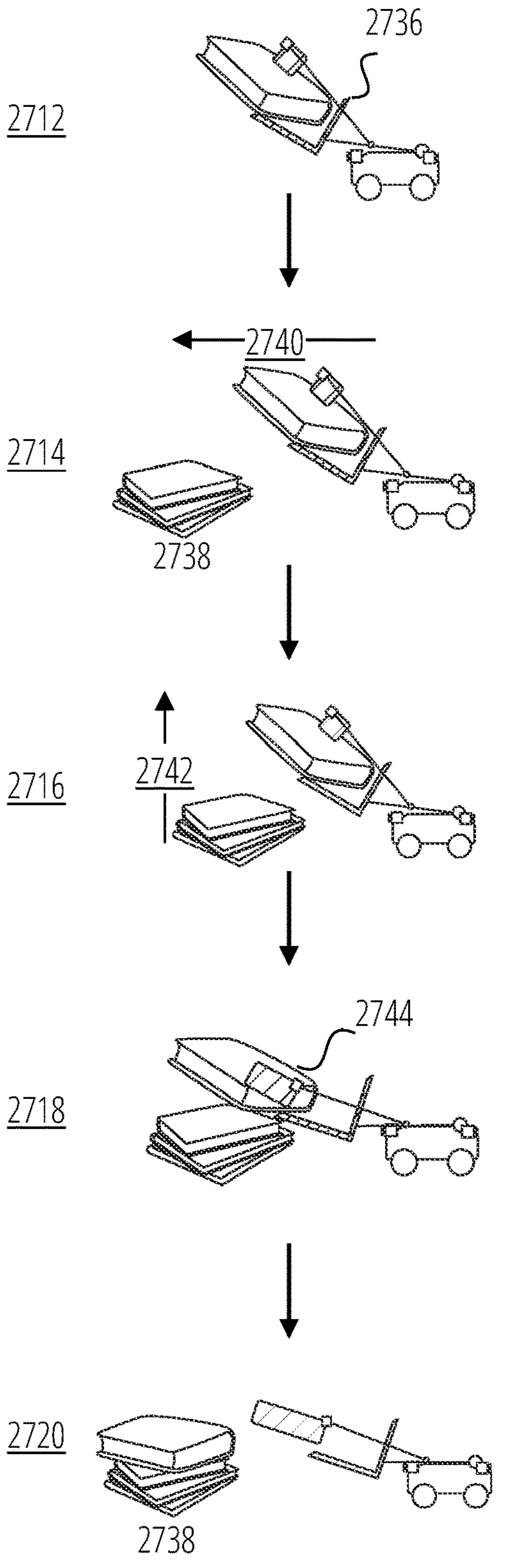
Figure 27D:
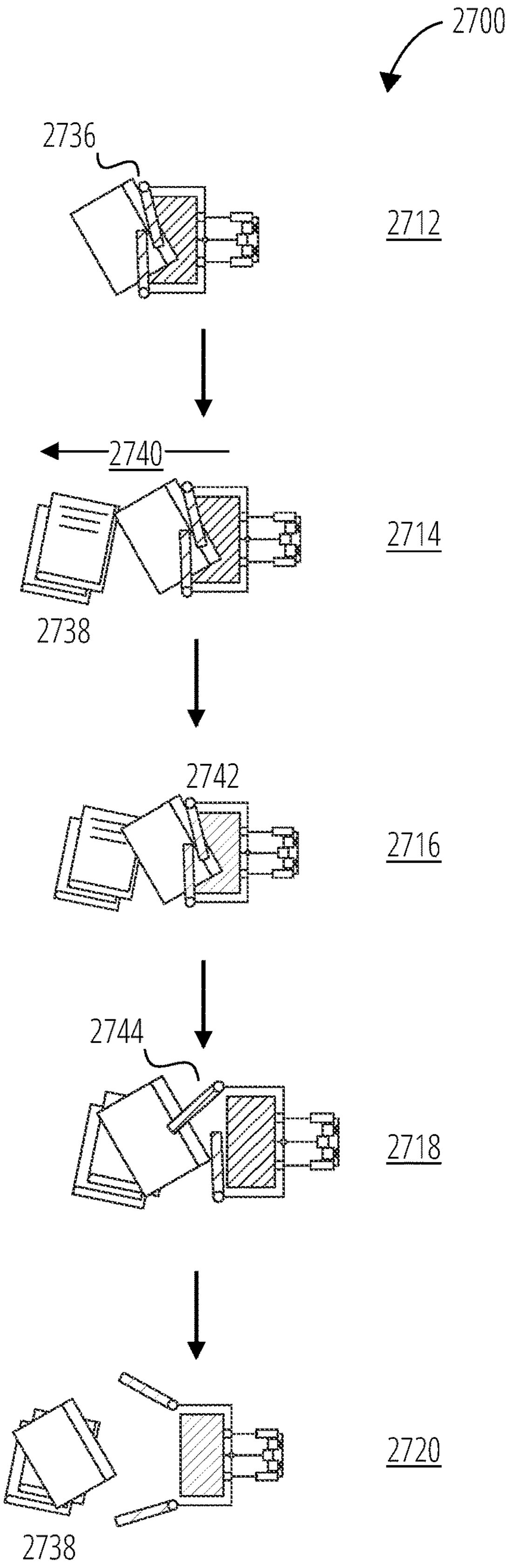

FIG. 27A through FIG. 27D illustrate a process for a stackable object 2700 in accordance with one embodiment. FIG. 27A shows a side view of a robot performing steps 2702-2710, while FIG. 27B shows a top view of the performance of these same steps. FIG. 27C illustrates a side view of steps 2712-2720, and FIG. 27D shows a top view of these steps. A stackable object may be a book, a case holding a compact disc (CD), digital video disc (DVD), or other media, a narrow box such as a puzzle box, or some other object that may be easily and neatly stacked.

As illustrated in FIG. 27A and FIG. 27B, the robot may first drive to the stackable object 2722 located at a starting location 2724, as shown at step 2702. The robot may drive to the stackable object 2722 following an approach path 2726. As shown at step 2704 and step 2712, the robot may adjust its grabber pad arms to a grabbing height 2728 based on the type of object. For a stackable object like a book, this may just above the top of the book. The robot, at step 2706 and step 2706, may drive so that its arms align past the object 2730. The robot may employ a grabbing pattern 2732 at step 2708 and step 2708, using its arms to push the book onto the shovel or scoop. Using the grabber pad arms at step 2710 and step 2710, the robot may apply a light pressure 2734 to the top of the book to hold it securely within or atop the shovel.

As shown in FIG. 27C and FIG. 27D, the robot may lift the book while continuing to hold it with its grabber pad arms, maintaining the book within the shovel in a carrying position 2736 at step 2712. At step 2714, the robot may drive to the destination 2738 where the book is intended to be placed, following a destination approach path 2740. The robot may adjust the shovel and grabber pad arms at step 2716 to position the book at a deposition height 2742. For a stackable object such as a book, this may position the book level with an area above the top of an existing stack. At step 2718, the robot may use its arms to push and place the book at the destination (i.e., on top of the stack) using a placing pattern 2744 The book may in this manner be dropped or deposited at its destination at step 2720.

This process for a stackable object 2700 may be performed by any of the robots disclosed herein, such as those illustrated in FIG. 1A through FIG. 1D, FIG. 2A through FIG. 2E, FIG. 3A through FIG. 3C, FIG. 4A through FIG. 4C, FIG. 5, FIG. 6, FIG. 7, FIG. 8, FIG. 9, FIG. 10, FIG. 11, FIG. 12, FIG. 13, FIG. 14, FIG. 15, FIG. 16 and FIG. 17, and FIG. 18A and FIG. 18B.

Figure 28A:
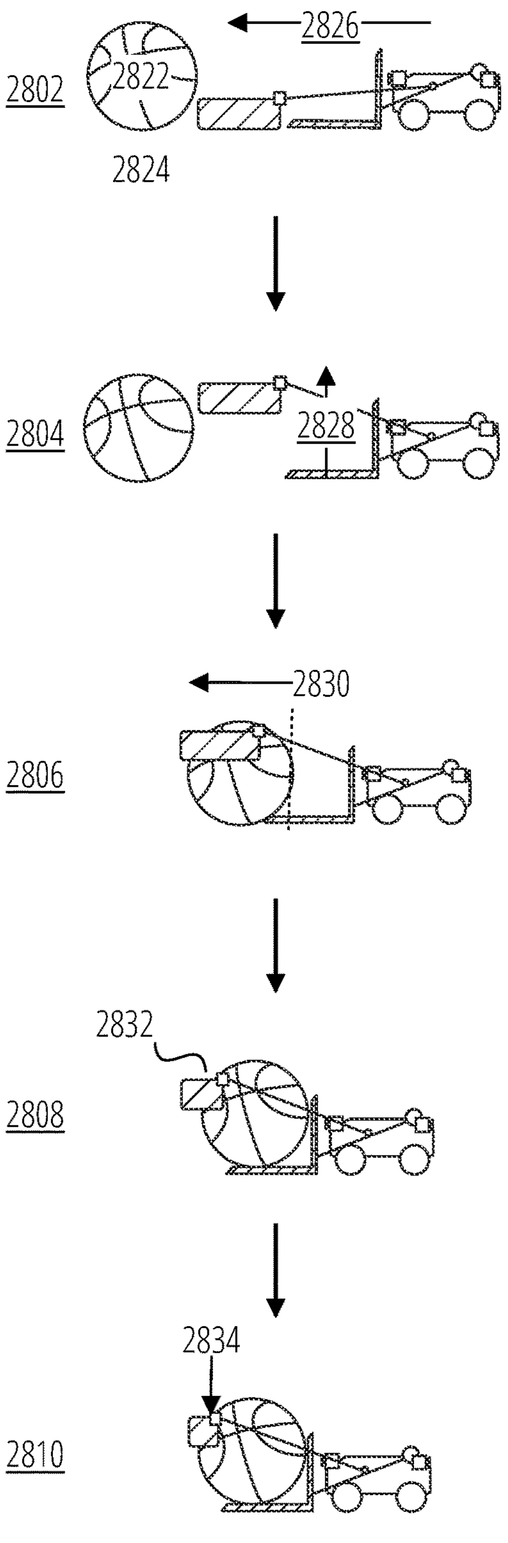
FIG. 28A through FIG. 28D illustrate a process for a large, highly deformable object 2800 in accordance with one embodiment.
Figure 28B:
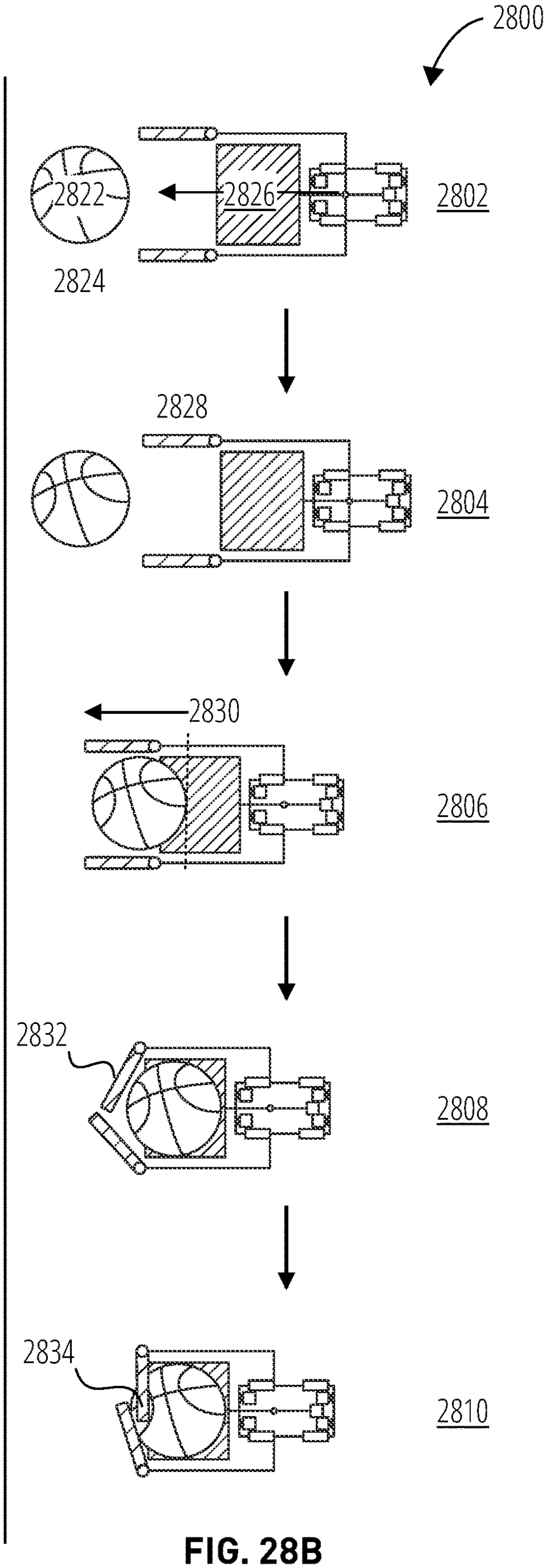
Figure 28C:
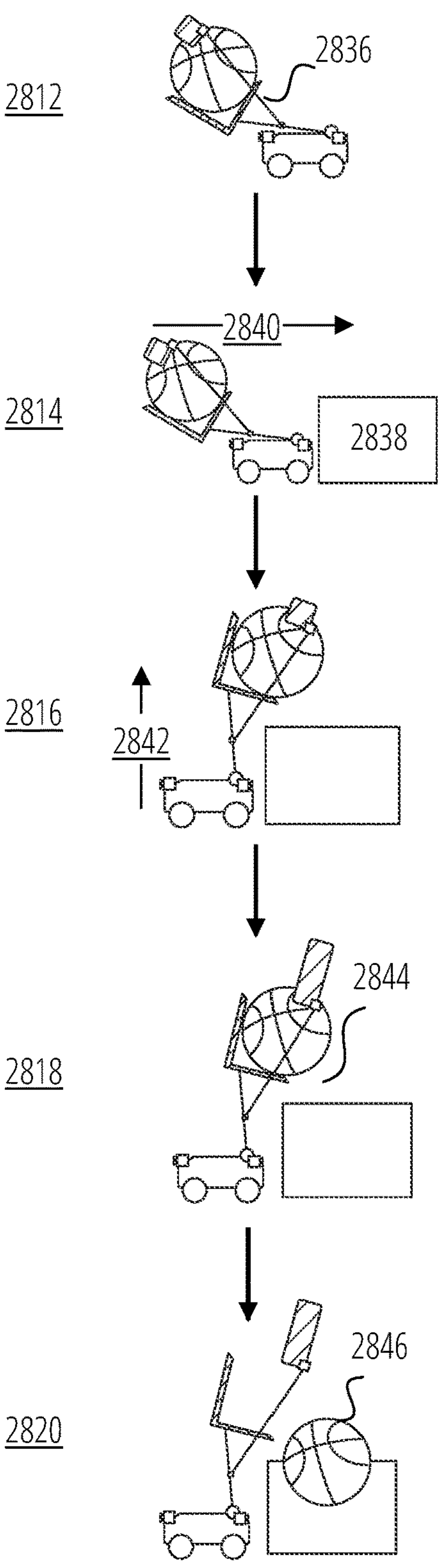
Figure 28D:
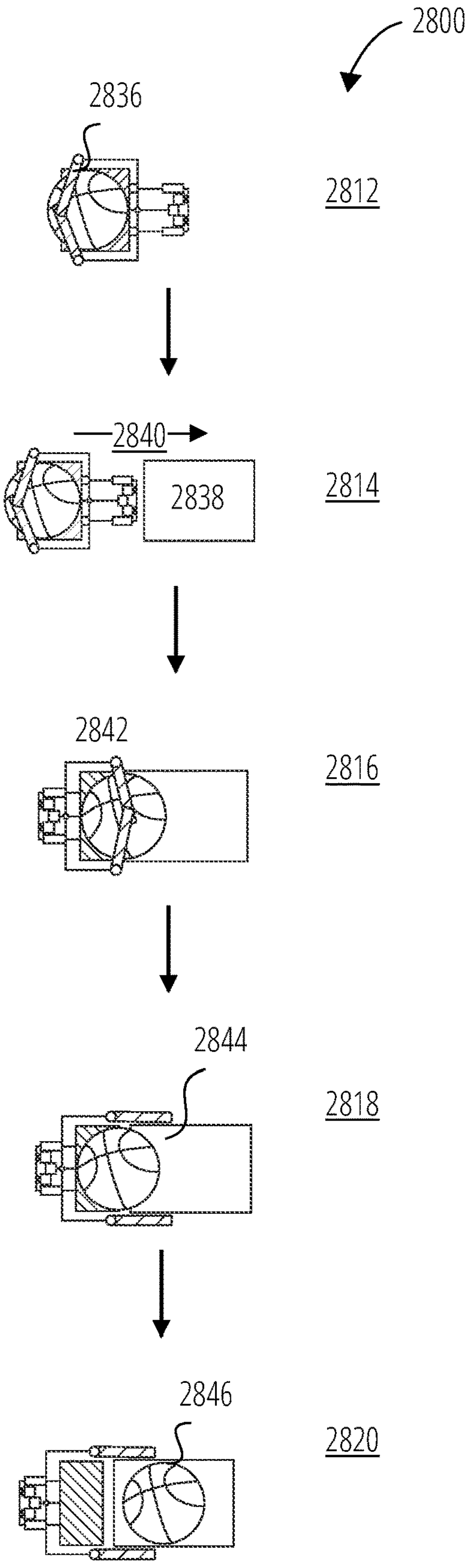

FIG. 28A through FIG. 28D illustrate a process for a large, slightly deformable object 2800 in accordance with one embodiment. FIG. 28A shows a side view of the robot performing steps 2802-2810, while FIG. 28B shows a top view of the performance of these same steps. FIG. 28C illustrates a side view of steps 2812-2820, and FIG. 28D shows a top view of these steps. A large, slightly deformable object may be an object such as a basketball, which extends outside of the dimensions of the shovel, and may respond to pressure with very little deformation or change of shape.

As illustrated in FIG. 28A and FIG. 28B, the robot may first drive to the large, slightly deformable object 2822, such as a basketball, located at a starting location 2824, following an approach path 2826 at step 2802. The robot may adjust its grabber pad arms to a grabbing height 2828 based on the type of object at step 2804. For a large, slightly deformable object 2822 such as a basketball, this may be near or above the top of the basketball. The robot, at step 2806, may drive so that its arms align past the object 2830. The robot may employ a grabbing pattern 2832 at step 2808 to use its arms to push or roll the basketball onto the shovel or scoop. Using the grabber pad arms at step 2810, the robot may apply a light pressure 2834 to the top of the basketball to hold it securely within or atop the shovel.

As shown in FIG. 28C and FIG. 28D, the robot may lift the basketball at step 2812 while continuing to hold it with its grabber pad arms, maintaining the ball within the shovel in a carrying position 2836. Next, at step 2814, the robot may drive to the destination 2838 where the basketball is intended to be placed, following a destination approach path 2840. At step 2816, the robot may adjust the shovel and grabber pad arms to position the basketball at a deposition height 2842. For an object such as a basketball, this may position the shovel and ball in an area above the robot, tilted or aimed toward a container. The robot may at step 2818 open its arms to release the object into the destination container using a dropping pattern 2844. The basketball may then fall out of the shovel 2846 and come to rest in its destination container at step 2820.

The process for a large, slightly deformable object 2800 may be performed by any of the robots disclosed herein, such as those illustrated in FIG. 1A through FIG. 1D, FIG. 2A through FIG. 2E, FIG. 3A through FIG. 3C, FIG. 4A through FIG. 4C, FIG. 5, FIG. 6, FIG. 7, FIG. 8, FIG. 9, FIG. 10, FIG. 11, FIG. 12, FIG. 13, FIG. 14, FIG. 15, FIG. 16 and FIG. 17, and FIG. 18A and FIG. 18B.

Figure 29A:
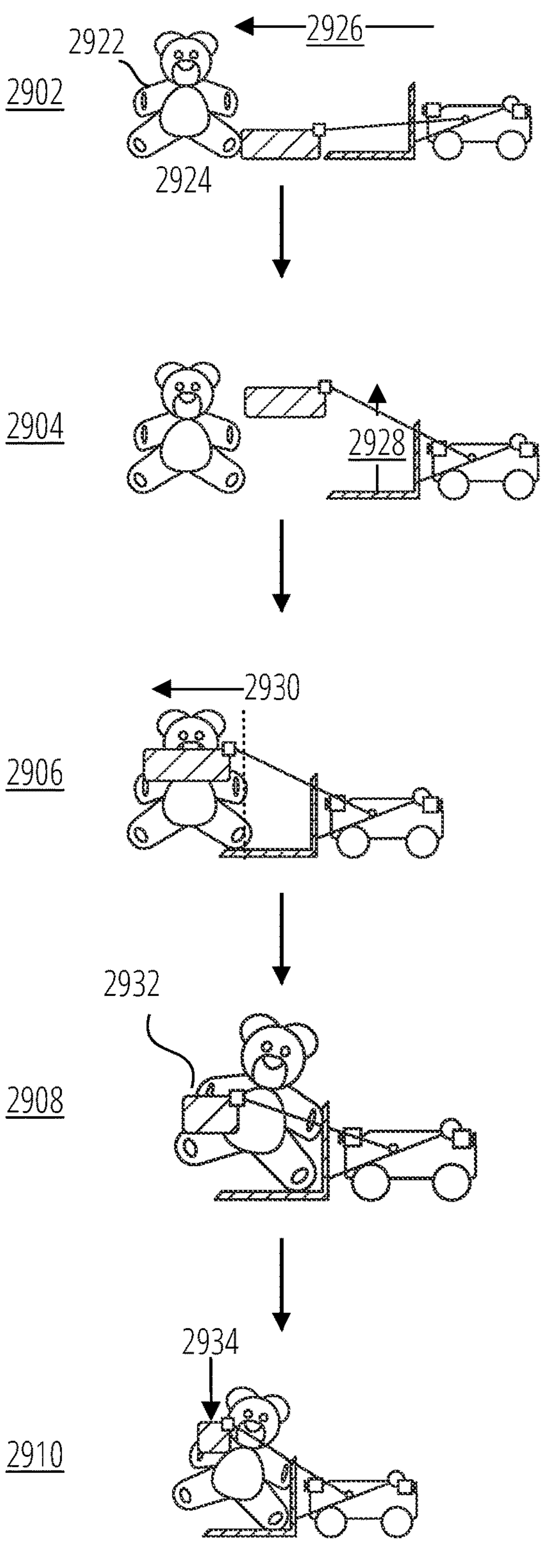
FIG. 29A and FIG. 29C illustrate a process for a large, highly deformable object 2900 in accordance with one embodiment.
Figure 29B:
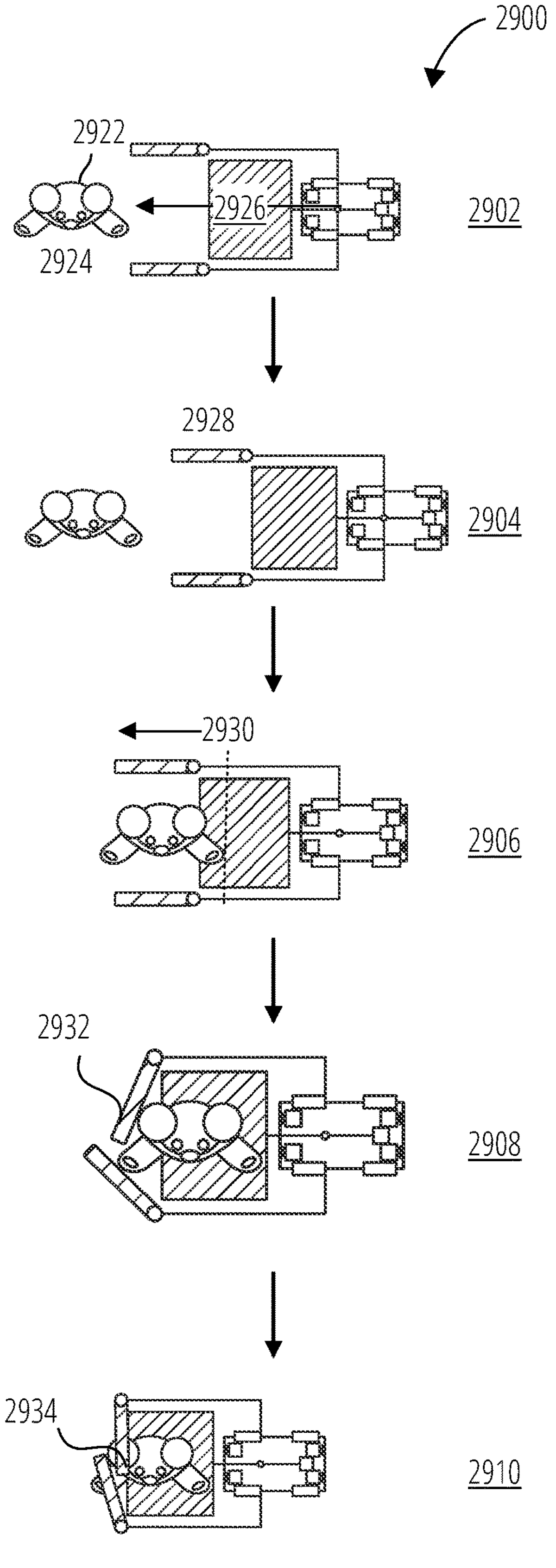
FIG. 29B illustrates an aspect of the subject matter in accordance with one embodiment.
Figure 29C:
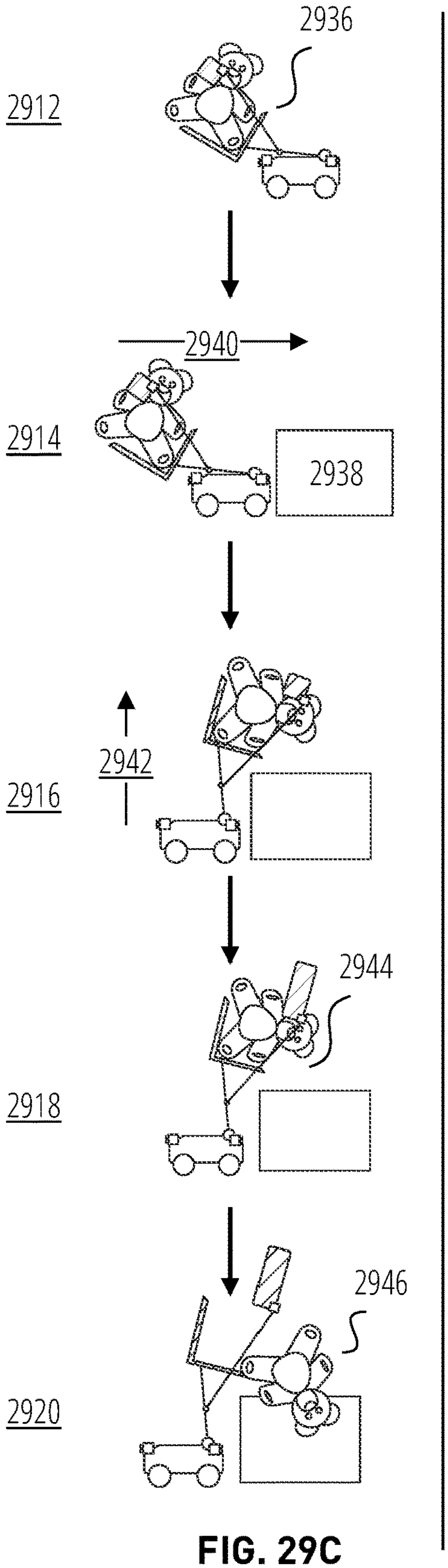
Figure 29D:
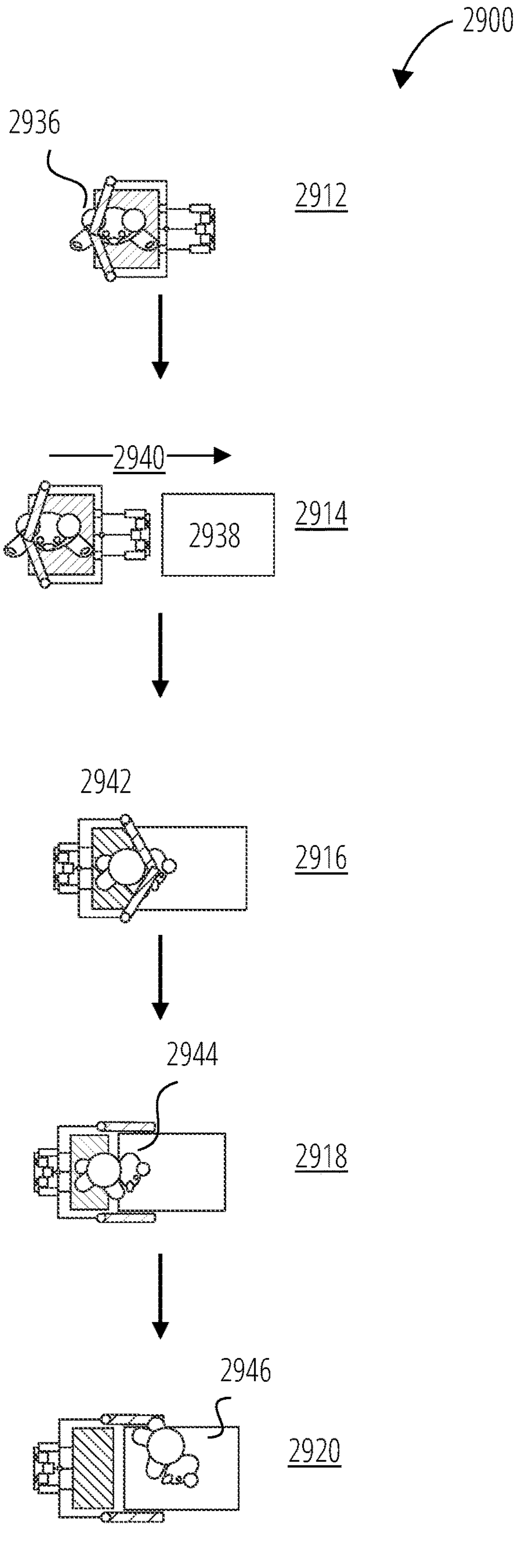
FIG. 29D illustrates an aspect of the subject matter in accordance with one embodiment.

FIG. 29A through FIG. 29D illustrate a process for a large, highly deformable object 2900 in accordance with one embodiment. FIG. 29A shows a side view of the robot performing steps 2902-2910, while FIG. 29B shows a top view of the performance of these same steps. FIG. 29C illustrates a side view of steps 2912-2920, and FIG. 29D shows a top view of these steps. A large, highly deformable object may be an object such as a stuffed animal, a beanbag toy, an empty backpack, etc., which extends outside of the dimensions of the shovel, and may respond to pressure with significant deformation or change of shape.

As illustrated in FIG. 29A and FIG. 29B, the robot may first drive to the large, highly deformable object 2922, such as a stuffed animal, located at a starting location 2924, following an approach path 2926 at step 2902. The robot may adjust its grabber pad arms to a grabbing height 2928 at step 2904 based on the type of object. For a large, highly deformable object such as a stuffed animal, this may be near the vertical center of the object, or even with an estimated center of gravity. At step 2906, the robot may drive so that its arms are aligned past the object 2930. The robot may employ a grabbing pattern 2932 at step 2908 to use its arms to push the stuffed animal onto the shovel or scoop. Using the grabber pad arms at step 2910, the robot may apply a light pressure 2934 to the top of the stuffed animal to hold it securely within or atop the shovel.

As shown in FIG. 29C and FIG. 29D, the robot may lift the stuffed animal at step 2912 while continuing to hold it with its grabber pad arms, maintaining the stuffed animal within the shovel in a carrying position 2936. Next, at step 2914, the robot may drive to the destination 2938 where the stuffed animal is intended to be placed, following a destination approach path 2940. At step 2916, the robot may adjust the shovel and grabber pad arms to position the stuffed animal at a deposition height 2942. For an object such as a stuffed animal, this may position the shovel and stuffed animal in an area above the robot, tilted or aimed toward a container. At step 2918, the robot may open its arms to release the object into the destination container using a dropping pattern 2944. The stuffed animal may then roll, slide, or fall out of the shovel 2946 and come to rest in its destination container at step 2920.

The process for a large, highly deformable object 2900 may be performed by any of the robots disclosed herein, such as those illustrated in FIG. 1A through FIG. 1D, FIG. 2A through FIG. 2E, FIG. 3A through FIG. 3C, FIG. 4A through FIG. 4C, FIG. 5, FIG. 6, FIG. 7, FIG. 8, FIG. 9, FIG. 10, FIG. 11, FIG. 12, FIG. 13, FIG. 14, FIG. 15, FIG. 16 and FIG. 17, and FIG. 18A and FIG. 18B.

Figure 30A:
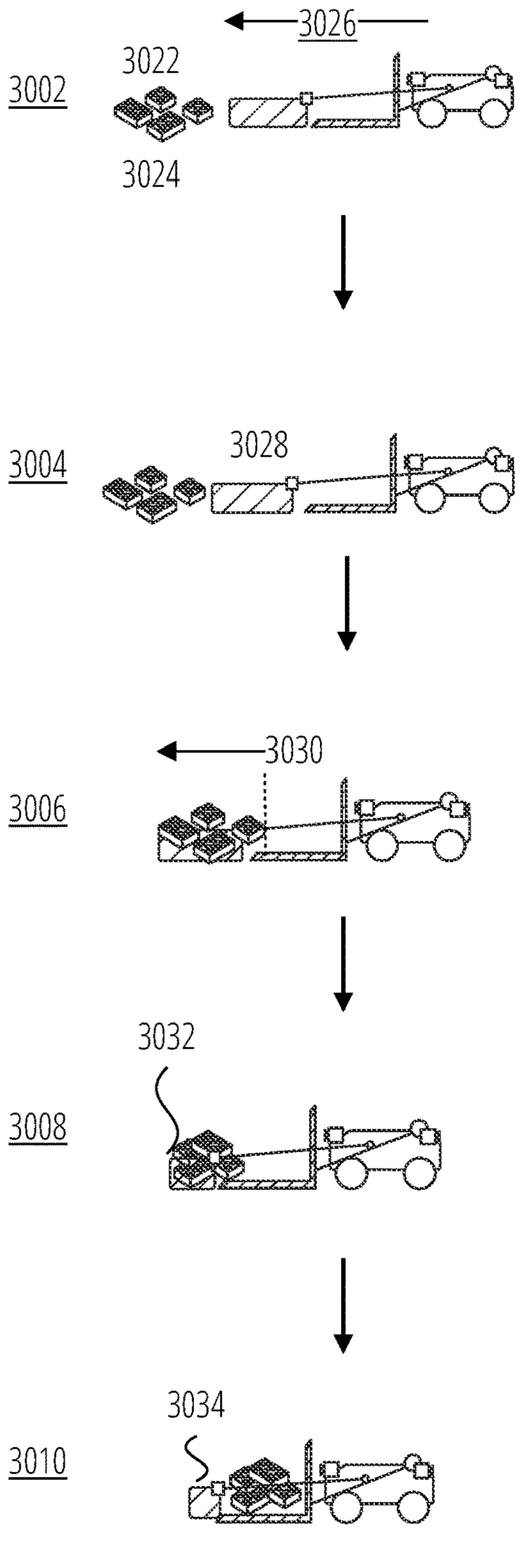
FIG. 30A and FIG. 30C illustrate a process for small, easily scattered objects 3000 in accordance with one embodiment.
Figure 30B:
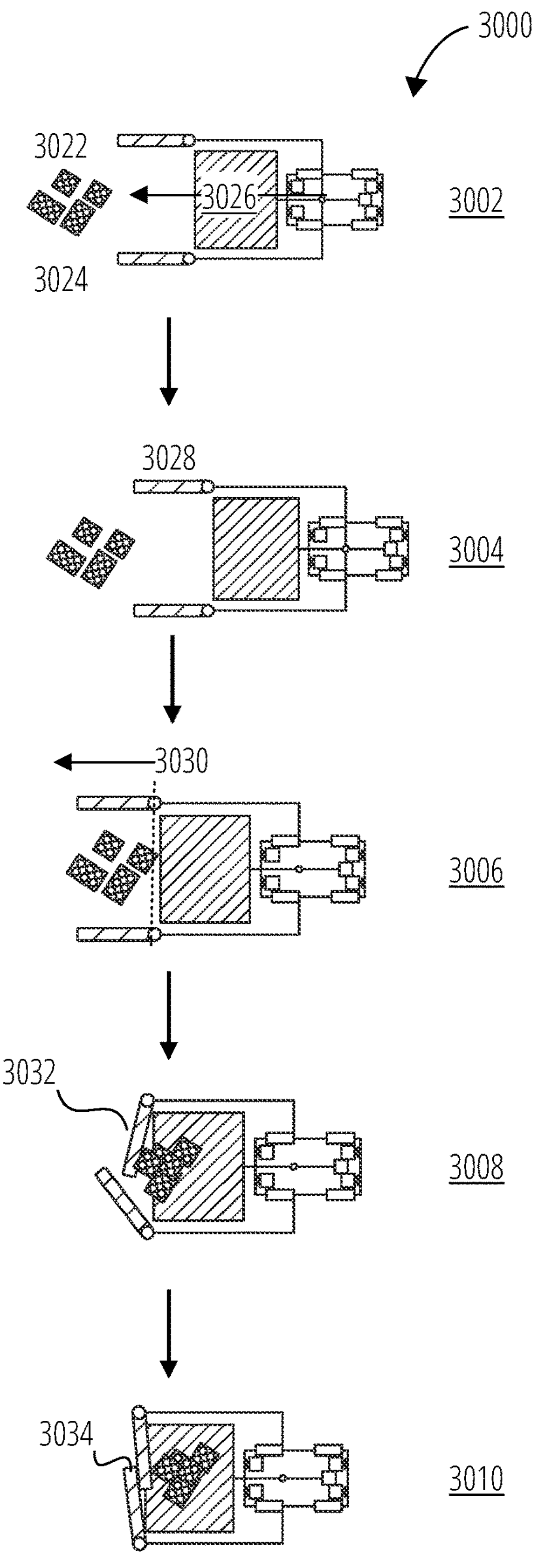
FIG. 30B illustrates an aspect of the subject matter in accordance with one embodiment.
Figures 30C, 30D:
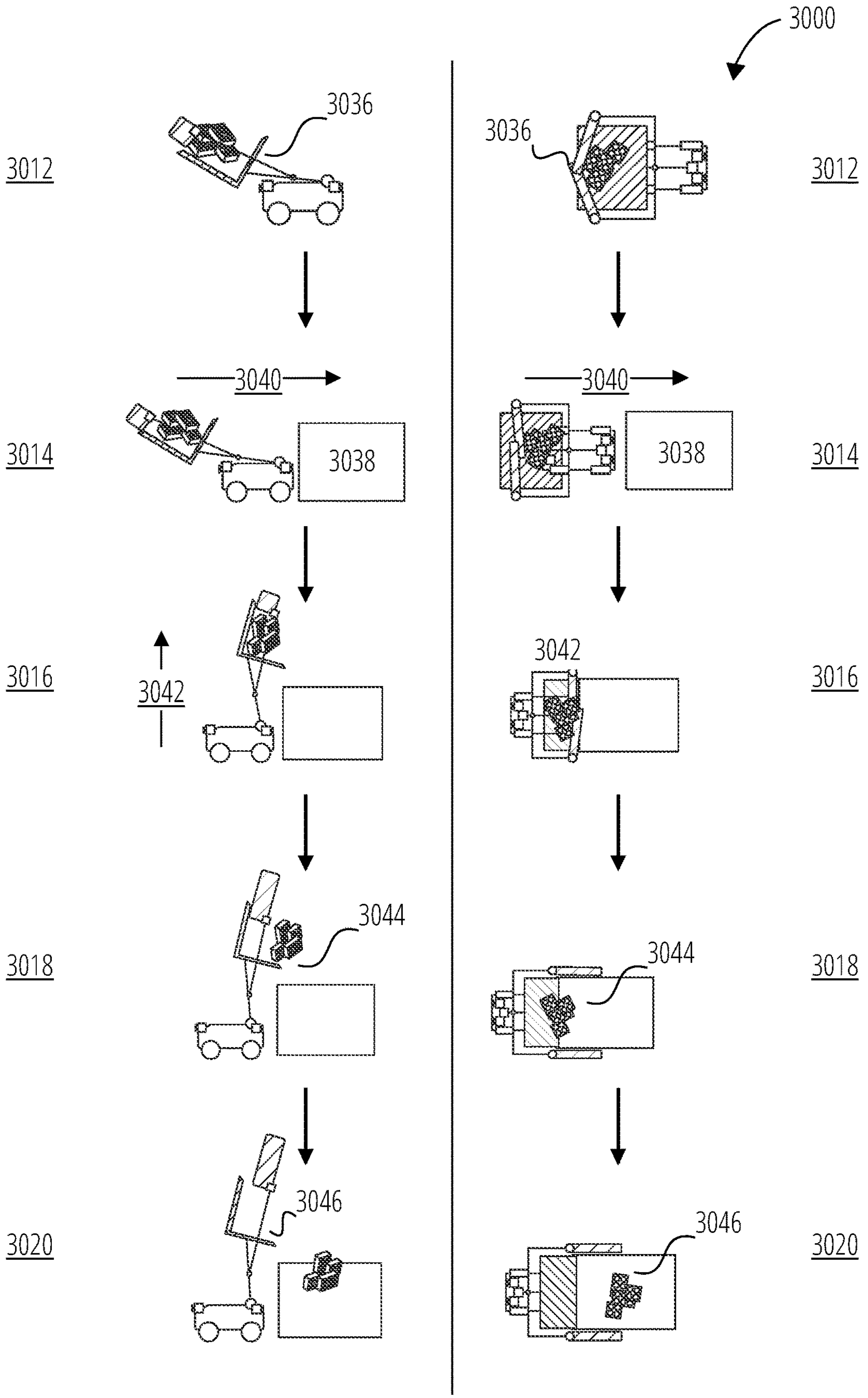
FIG. 30D illustrates an aspect of the subject matter in accordance with one embodiment.

FIG. 30A through FIG. 30D illustrate a process for small, easily scattered objects 3000 in accordance with one embodiment. FIG. 30A shows a side view of the robot performing steps step 3002-3010, while FIG. 30B shows a top view of the performance of these same steps. FIG. 30C illustrates a side view of steps 3012-3020, and FIG. 30D shows a top view of these steps. Small, easily scattered objects may be small, light objects such as small plastic construction blocks, marbles, cereal, etc., that may be easily dispersed when contacted with the robot's grabber pad arms, or may slip out of the shovel during transit if appropriate care is not taken.

As illustrated in FIG. 30A and FIG. 30B, the robot may first drive to the small, easily scattered objects 3022, such as a group of plastic construction blocks, located at a starting location 3024, following an approach path 3026 at step 3002. The robot may, at step 3004, adjust its grabber pad arms to a grabbing height 3028 based on the type of object. For small, easily scattered objects, this may be near or in contact with the floor. At step 3006, the robot may drive so that its arms are aligned past the objects 3030. The robot may employ a grabbing pattern 3032 at step 3008 to use its arms to push the objects onto the shovel or scoop. The grabbing pattern 3032 for such objects may apply less force, or use small, sweeping motions rather than a continuous pressure. At step 3010, the robot may close its arms 3034 across the front of the shovel, and may apply light pressure against the shovel, to prevent the objects from rolling or sliding out.

As shown in FIG. 30C and FIG. 30D, the robot may lift the construction blocks at step 3012 while continuing to block the shovel front opening with its grabber pad arms, maintaining the objects within the shovel in a carrying position 3036. Next, at step 3014, the robot may drive to the destination 3038 where the objects are intended to be placed, following a destination approach path 3040. The robot may adjust the shovel and grabber pad arms at step 3016 to position the objects at a deposition height 3042. For an object such as small plastic construction blocks, this may position the shovel in an area above the robot, tilted or aimed toward a container. At step 3018, the robot may open its arms to release any objects trapped by them into the destination container using a dropping pattern 3044. The blocks may then roll, slide, or fall out of the shovel 3046 and come to rest in their destination container at step 3020.

The process for small, easily scattered objects 3000 may be performed by any of the robots disclosed herein, such as those illustrated in FIG. 1A through FIG. 1D, FIG. 2A through FIG. 2E, FIG. 3A through FIG. 3C, FIG. 4A through FIG. 4C, FIG. 5, FIG. 6, FIG. 7, FIG. 8, FIG. 9, FIG. 10, FIG. 11, FIG. 12, FIG. 13, FIG. 14, FIG. 15, FIG. 16 and FIG. 17, and FIG. 18A and FIG. 18B.

Figure 31:
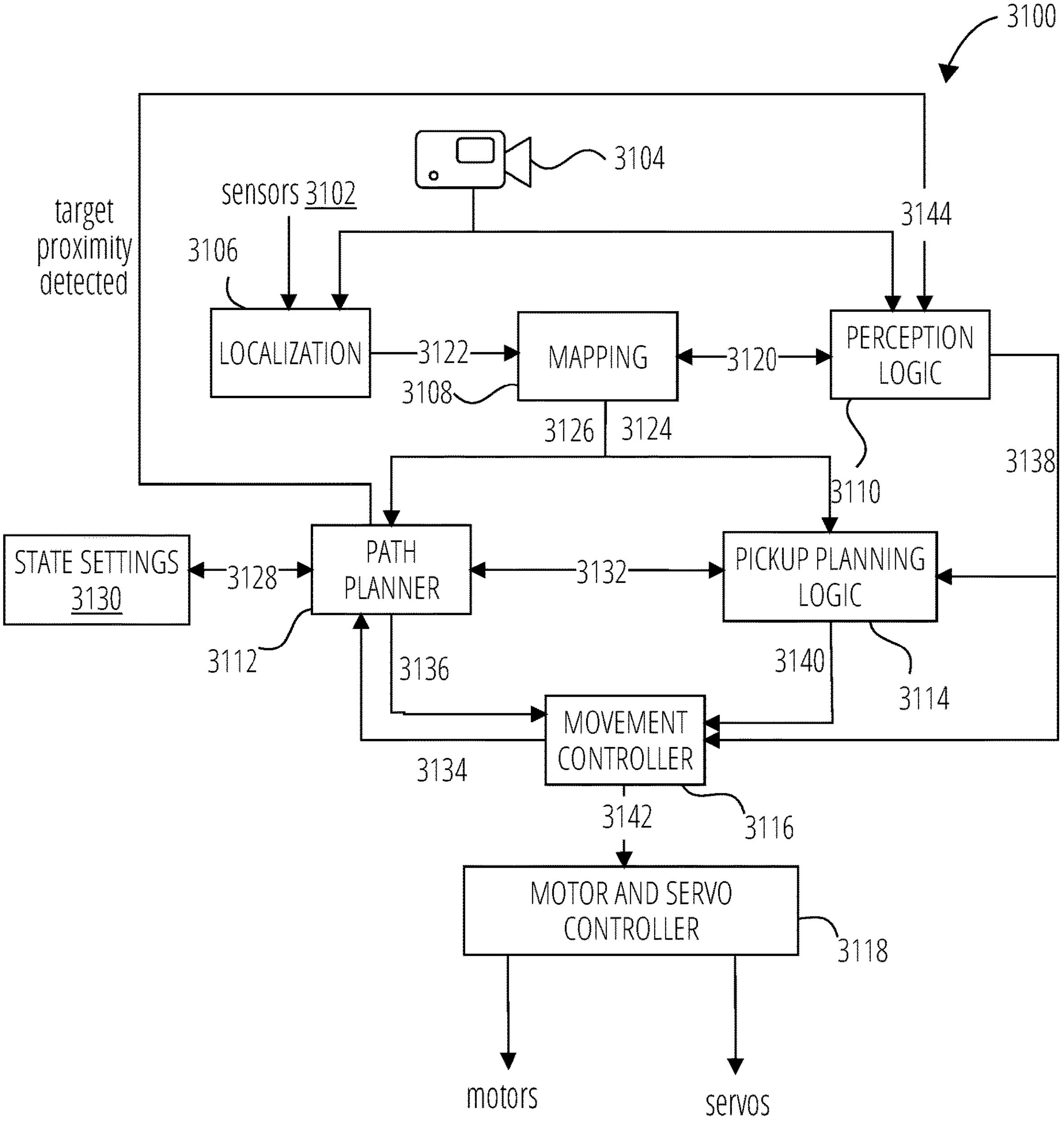
FIG. 31 depicts a robotics system 3100 in accordance with one embodiment.

FIG. 31 depicts a robotics system 3100 in one embodiment. The robotics system 3100 receives inputs from one or more sensors 3102 and one or more cameras 3104 and provides these inputs for processing by localization logic 3106, mapping logic 3108, and perception logic 3110. Outputs of the processing logic are provided to the robotics system 3100 path planner 3112, pick-up planner 3114, and motion controller 3116, which in turn drives the system's motor and servo controller 3118.

The cameras may be disposed in a front-facing stereo arrangement, and may include a rear-facing camera or cameras as well. Alternatively, a single front-facing camera may be utilized, or a single front-facing along with a single rear-facing camera. Other camera arrangements (e.g., one or more side or oblique-facing cameras) may also be utilized in some cases.

One or more of the localization logic 3106, mapping logic 3108, and perception logic 3110 may be located and/or executed on a mobile robot, or may be executed in a computing device that communicates wirelessly with the robot, such as a cell phone, laptop computer, tablet computer, or desktop computer. In some embodiments, one or more of the localization logic 3106, mapping logic 3108, and perception logic 3110 may be located and/or executed in the "cloud", i.e., on computer systems coupled to the robot via the Internet or other network.

The perception logic 3110 is engaged by an image segmentation activation 3144 signal, and utilizes any one or more of well-known image segmentation and object recognition algorithms to detect objects in the field of view of the camera 3104. The perception logic 3110 may also provide calibration and objects 3120 signals for mapping purposes. The localization logic 3106 uses any one or more of well-known algorithms to localize the mobile robot in its environment. The localization logic 3106 outputs a local to global transform 3122 reference frame transformation and the mapping logic 3108 combines this with the calibration and objects 3120 signals to generate an environment map 3124 for the pick-up planner 3114, and object tracking 3126 signals for the path planner 3112.

In addition to the object tracking 3126 signals from the mapping logic 3108, the path planner 3112 also utilizes a current state 3128 of the system from the system state settings 3130, synchronization signals 3132 from the pick-up planner 3114, and movement feedback 3134 from the motion controller 3116. The path planner 3112 transforms these inputs into navigation waypoints 3136 that drive the motion controller 3116. The pick-up planner 3114 transforms local perception with image segmentation 3138 inputs from the perception logic 3110, the 3124 from the mapping logic 3108, and synchronization signals 3132 from the path planner 3112 into manipulation actions 3140 (e.g., of robotic graspers, shovels) to the motion controller 3116. Embodiments of algorithms utilized by the path planner 3112 and pick-up planner 3114 are described in more detail below.

In one embodiment simultaneous localization and mapping (SLAM) algorithms may be utilized to generate the global map and localize the robot on the map simultaneously. A number of SLAM algorithms are known in the art and commercially available.

The motion controller 3116 transforms the navigation waypoints 3136, manipulation actions 3140, and local perception with image segmentation 3138 signals to target movement 3142 signals to the motor and servo controller 3118.

Figure 32:
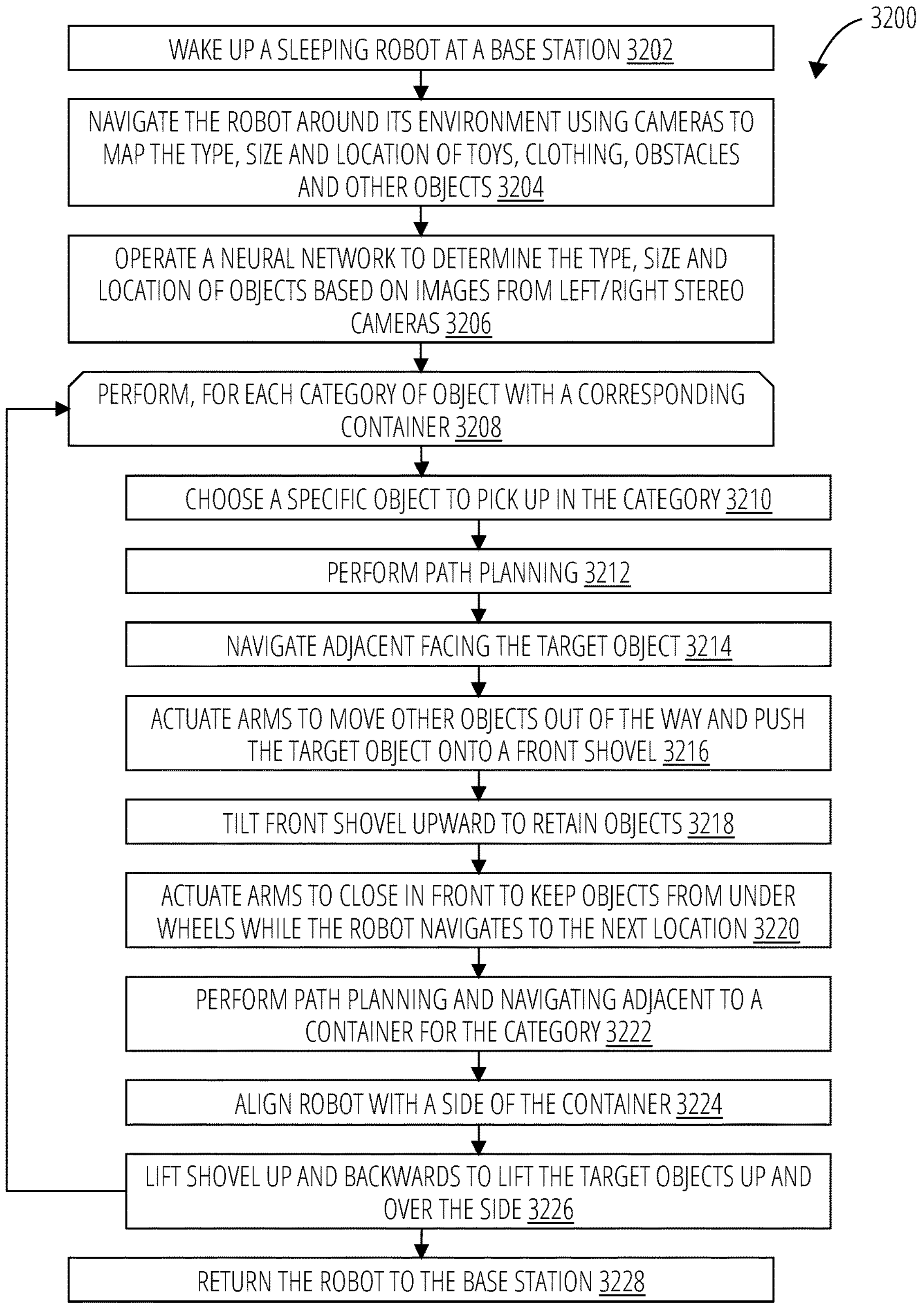
FIG. 32 depicts a robotic process 3200 in accordance with one embodiment.

FIG. 32 depicts a robotic process 3200 in one embodiment. In block 3202, the robotic process 3200 wakes up a sleeping robot at a base station. In block 3204, the robotic process 3200 navigates the robot around its environment using cameras to map the type, size and location of toys, clothing, obstacles and other objects. In block 3206, the robotic process 3200 operates a neural network to determine the type, size and location of objects based on images from left/right stereo cameras. In opening loop block 3208, the robotic process 3200 performs, for each category of object with a corresponding container. In block 3210, the robotic process 3200 chooses a specific object to pick up in the category. In block 3212, the robotic process 3200 performs path planning. In block 3214, the robotic process 3200 navigates adjacent to and facing the target object. In block 3216, the robotic process 3200 actuates arms to move other objects out of the way and push the target object onto a front shovel. In block 3218, the robotic process 3200 tilts the front shovel upward to retain them on the shovel (creating a "bowl" configuration of the shovel). In block 3220, the robotic process 3200 actuates the arms to close in front to keep objects from under the wheels while the robot navigates to the next location. In block 3222, the robotic process 3200 performs path planning and navigating adjacent to a container for the current object category for collection. In block 3224, the robotic process 3200 aligns the robot with a side of the container. In block 3226, the robotic process 3200 lifts the shovel up and backwards to lift the target objects up and over the side of the container. In block 3228, the robotic process 3200 returns the robot to the base station.

In a less sophisticated operating mode, the robot may opportunistically picks up objects in its field of view and drop them into containers, without first creating a global map of the environment. For example, the robot may simply explore until it finds an object to pick up and then explore again until it finds the matching container. This approach may work effectively in single-room environments where there is a limited area to explore.

Figure 33:
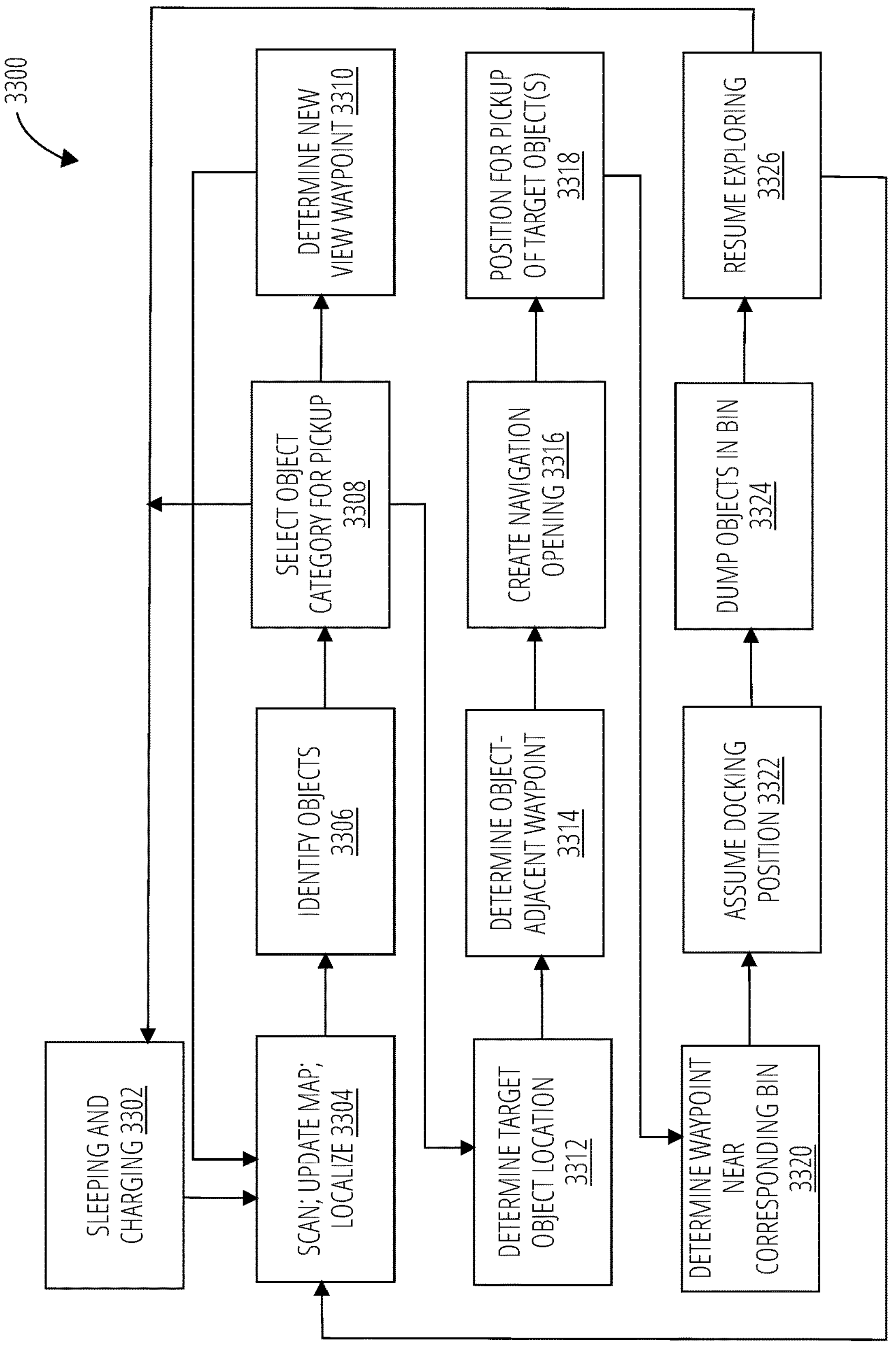
FIG. 33 depicts another robotic process 3300 in accordance with one embodiment.
Figure 34:
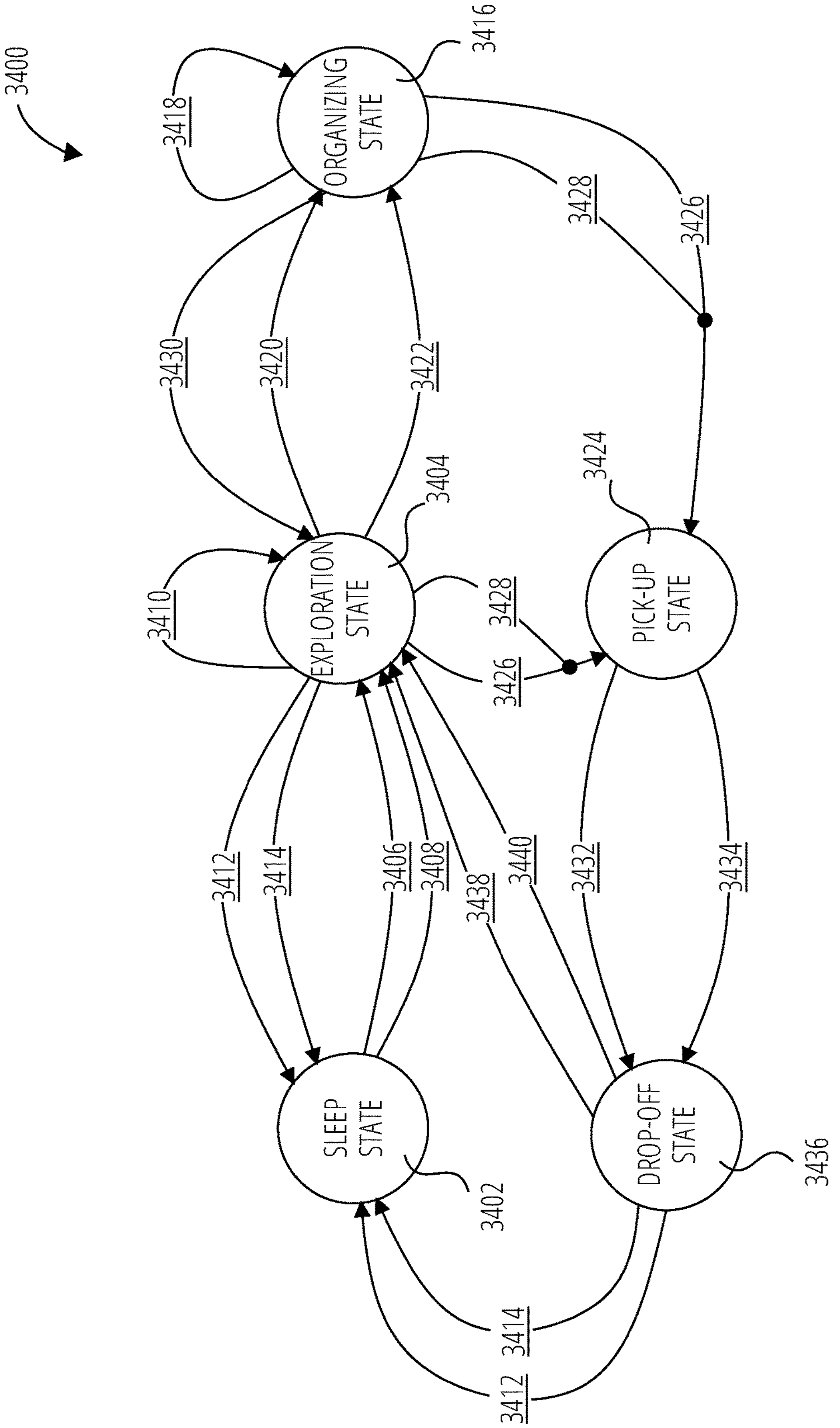
FIG. 34 depicts a state space map 3400 for a robotic system in accordance with one embodiment.

FIG. 33 also depicts a robotic process 3300 in one embodiment, in which the robotic system sequences through an embodiment of a state space map 3400 as depicted in FIG. 34.

The sequence begins with the robot sleeping (sleep state 3402) and charging at the base station (block 3302). The robot is activated, e.g., on a schedule, and enters an exploration mode (environment exploration state 3404, activation action 3406, and schedule start time 3408). In the environment exploration state 3404, the robot scans the environment using cameras (and other sensors) to update its environmental map and localize its own position on the map (block 3304, explore for configured interval 3410). The robot may transition from the environment exploration state 3404 back to the sleep state 3402 on condition that there are no more objects to pick up 3412, or the battery is low 3414.

From the environment exploration state 3404, the robot may transition to the object organization state 3416, in which it operates to move the items on the floor to organize them by category 3418. This transition may be triggered by the robot determining that objects are too close together on the floor 3420, or determining that the path to one or more objects is obstructed 3422. If none of these triggering conditions is satisfied, the robot may transition from the environment exploration state 3404 directly to the object pick-up state 3424 on condition that the environment map comprises at least one drop-off container for a category of objects 3426, and there are unobstructed items for pickup in the category of the container 3428. Likewise the robot may transition from the object organization state 3416 to the object pick-up state 3424 under these latter conditions. The robot may transition back to the environment exploration state 3404 from the object organization state 3416 on condition that no objects are ready for pick-up 3430.

In the environment exploration state 3404 and/or the object organization state 3416, image data from cameras is processed to identify different objects (block 3306). The robot selects a specific object type/category to pick up, determines a next waypoint to navigate to, and determines a target object and location of type to pick up based on the map of environment (block 3308, block 3310, and block 3312).

In the object pick-up state 3424, the robot selects a goal location that is adjacent to the target object(s) (block 3314). It uses a path planning algorithm to navigate itself to that new location while avoiding obstacles. The robot actuates left and right pusher arms to create an opening large enough that the target object may fit through, but not so large that other unwanted objects are collected when the robot drives forwards (block 3316). The robot drives forwards so that the target object is between the left and right pusher arms, and the left and right pusher arms work together to push the target object onto the collection shovel (block 3318).

The robot may continue in the object pick-up state 3424 to identify other target objects of the selected type to pick up based on the map of environment. If other such objects are detected, the robot selects a new goal location that is adjacent to the target object. It uses a path planning algorithm to navigate itself to that new location while avoiding obstacles, while carrying the target object(s) that were previously collected. The robot actuates left and right pusher arms to create an opening large enough that the target object may fit through, but not so large that other unwanted objects are collected when the robot drives forwards. The robot drives forwards so that the next target object(s) are between the left and right pusher arms. Again, the left and right pusher arms work together to push the target object onto the collection shovel.

On condition that all identified objects in category are picked up 3432, or if the shovel is at capacity 3434, the robot transitions to the object drop-off state 3436 and uses the map of the environment to select goal location that is adjacent to bin for the type of objects collected and uses a path planning algorithm to navigate itself to that new location while avoiding obstacles (block 3320). The robot backs up towards the bin into a docking position where back of the robot is aligned with the back of the bin (block 3322). The robot lifts the shovel up and backwards rotating over a rigid arm at the back of the robot (block 3324). This lifts the target objects up above the top of the bin and dumps them into the bin.

From the object drop-off state 3436, the robot may transition back to the environment exploration state 3404 on condition that there are more items to pick up 3438, or it has an incomplete map of the environment 3440. The robot resumes exploring and the process may be repeated (block 3326) for each other type of object in the environment having an associated collection bin.

The robot may alternatively transition from the object drop-off state 3436 to the sleep state 3402 on condition that there are no more objects to pick up 3412 or the battery is low 3414. Once the battery recharges sufficiently, or at the next activation or scheduled pick-up interval, the robot resumes exploring and the process may be repeated (block 3326) for each other type of object in the environment having an associated collection bin.

Figure 35:
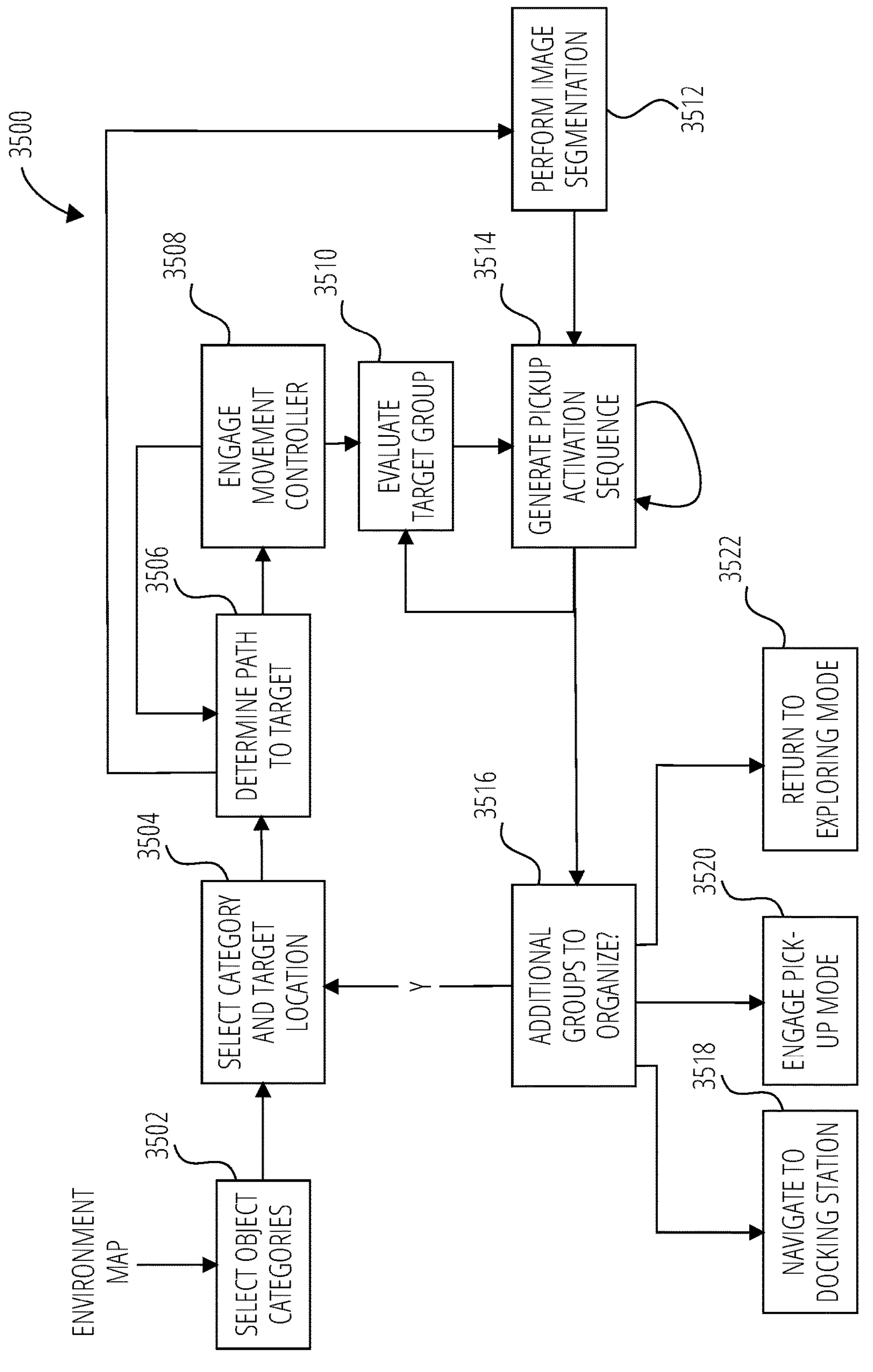
FIG. 35 depicts a robotic control algorithm 3500 for a robotic system in accordance with one embodiment.

FIG. 35 depicts a robotic control algorithm 3500 for a robotic system in one embodiment. The robotic control algorithm 3500 begins by selecting one or more category of objects to organize (block 3502). Within the selected category or categories, a grouping is identified that determines a target category and starting location for the path (block 3504). Any of a number of well-known clustering algorithms may be utilized to identify object groupings within the category or categories.

A path is formed to the starting goal location, the path comprising zero or more waypoints (block 3506). Movement feedback is provided back to the path planning algorithm. The waypoints may be selected to avoid static and/or dynamic (moving) obstacles (objects not in the target group and/or category). The robot's movement controller is engaged to follow the waypoints to the target group (block 3508). The target group is evaluated upon achieving the goal location, including additional qualifications to determine if it may be safely organized (block 3510).

The robot's perception system is engaged (block 3512) to provide image segmentation for determination of a sequence of activations generated for the robot's manipulators (e.g., arms) and positioning system (e.g., wheels) to organize the group (block 3514). The sequencing of activations is repeated until the target group is organized, or fails to organize (failure causing regression to block 3510). Engagement of the perception system may be triggered by proximity to the target group. Once the target group is organized, and on condition that there is sufficient battery life left for the robot and there are more groups in the category or categories to organize, these actions are repeated (block 3516).

In response to low battery life the robot navigates back to the docking station to charge (block 3518). However, if there is adequate battery life, and on condition that the category or categories are organized, the robot enters object pick-up mode (block 3520), and picks up one of the organized groups for return to the drop-off container. Entering pickup mode may also be conditioned on the environment map comprising at least one drop-off container for the target objects, and the existence of unobstructed objects in the target group for pick-up. On condition that no group of objects is ready for pick up, the robot continues to explore the environment (block 3522).

Figure 36:
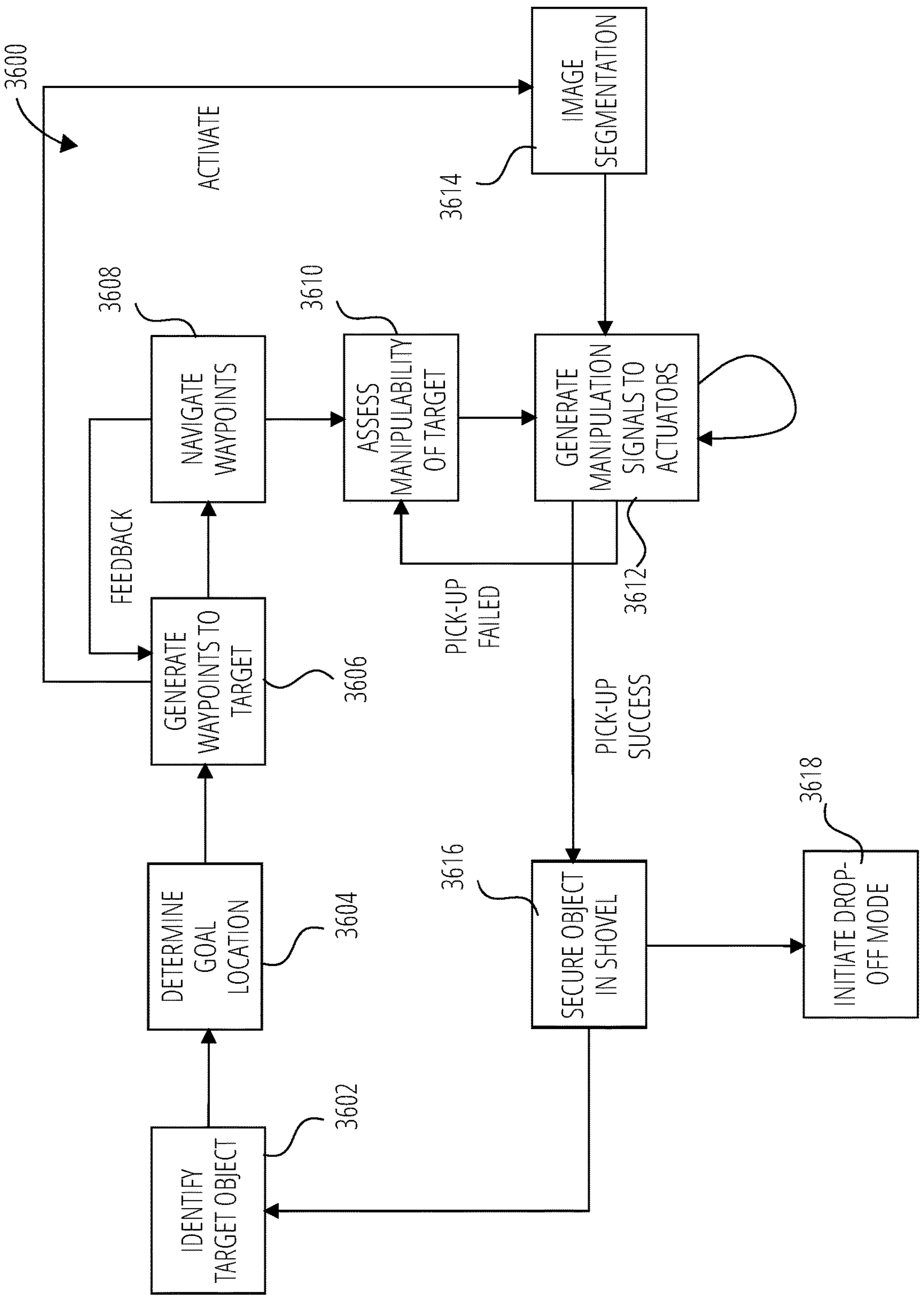
FIG. 36 depicts a robotic control algorithm 3600 for a robotic system in accordance with one embodiment.

FIG. 36 depicts a robotic control algorithm 3600 for a robotic system in one embodiment. A target object in the chosen object category is identified (item 3602) and a goal location for the robot is determined as an adjacent location of the target object (item 3604). A path to the target object is determined as a series of waypoints (item 3606) and the robot is navigated along the path while avoiding obstacles (item 3608).

Once the adjacent location is reached, as assessment of the target object is made to determine if may be safely manipulated (item 3610). On condition that the target object may be safely manipulated, the robot is operated to lift the object using the robot's manipulator arm, e.g., shovel (item 3612). The robot's perception module may by utilized at this time to analyze the target object and nearby objects to better control the manipulation (item 3614).

The target object, once on the shovel or other manipulator arm, is secured (item 3616). On condition that the robot does not have capacity for more objects, or it's the last object of the selected category(ies), object drop-off mode is initiated (item 3618). Otherwise the robot may begin the process again (3602).

Figure 37:
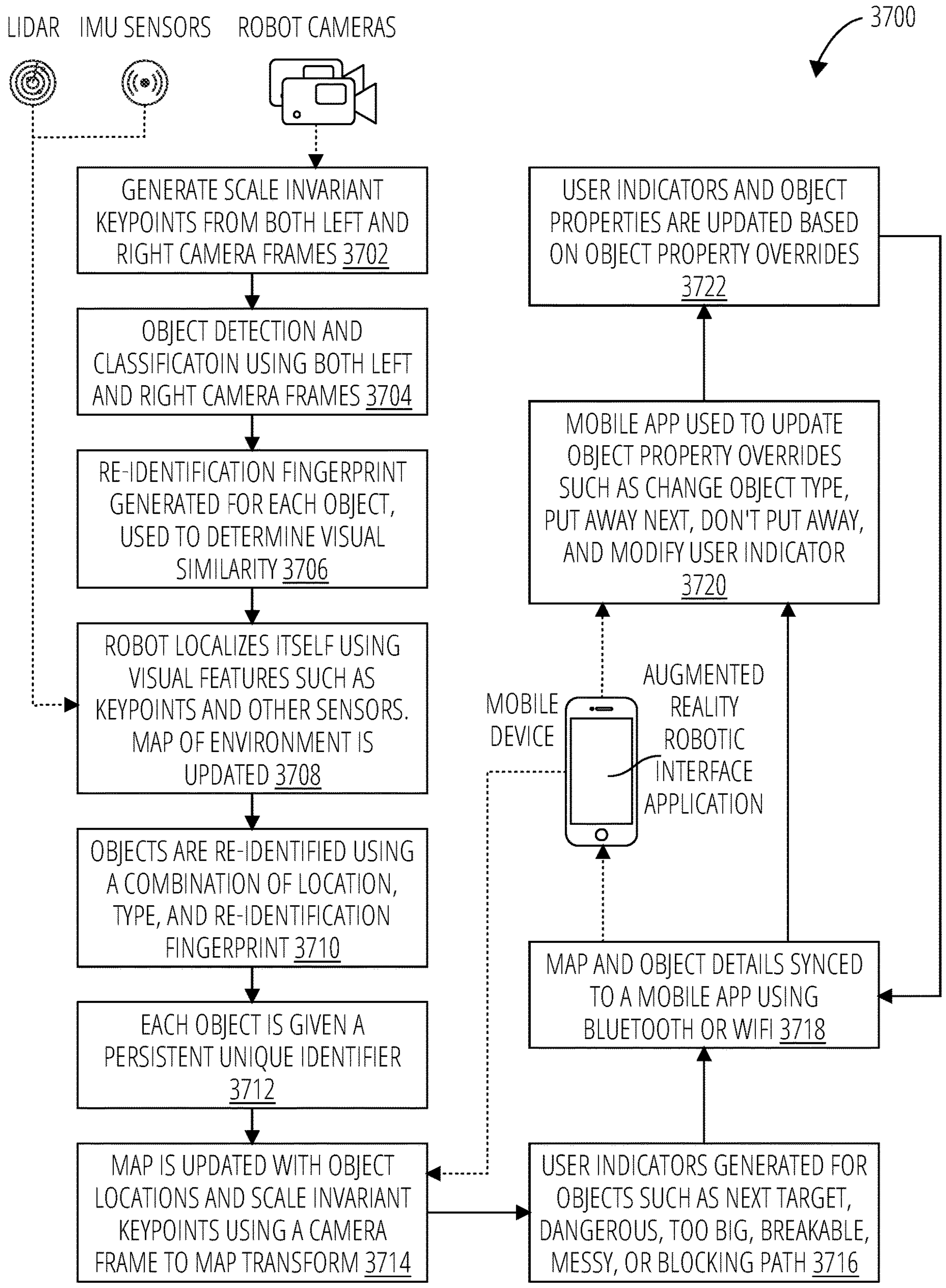
FIG. 37 depicts a robotic control algorithm 3700 in accordance with one embodiment.

FIG. 37 illustrates a robotic control algorithm 3700 in accordance with one embodiment. At block 3702, a left camera and a right camera, or some other configuration of robot cameras, of a robot such as that disclosed herein, may provide input that may be used to generate scale invariant keypoints within a robot's working space.

"Scale invariant keypoint" or "visual keypoint" in this disclosure refers to a distinctive visual feature that may be maintained across different perspectives, such as photos taken from different areas. This may be an aspect within an image captured of a robot's working space that may be used to identify a feature of the area or an object within the area when this feature or object is captured in other images taken from different angles, at different scales, or using different resolutions from the original capture.

Scale invariant keypoints may be detected by a robot or an augmented reality robotic interface installed on a mobile device based on images taken by the robot's cameras or the mobile device's cameras. Scale invariant keypoints may help a robot or an augmented reality robotic interface on a mobile device to determine a geometric transform between camera frames displaying matching content. This may aid in confirming or fine-tuning an estimate of the robot's or mobile device's location within the robot's working space.

Scale invariant keypoints may be detected, transformed, and matched for use through algorithms well understood in the art, such as (but not limited to) Scale-Invariant Feature Transform (SIFT), Speeded-Up Robust Features (SURF), Oriented Robust Binary features (ORB), and SuperPoint.

Objects located in the robot's working space may be detected at block 3704 based on the input from the left camera and the right camera, thereby defining starting locations for the objects and classifying the objects into categories. At block 3706, re-identification fingerprints may be generated for the objects, wherein the re-identification fingerprints are used to determine visual similarity of objects detected in the future with the objects. The objects detected in the future may be the same objects, redetected as part of an update or transformation of the global area map, or may be similar objects located similarly at a future time, wherein the re-identification fingerprints may be used to assist in more rapidly classifying the objects.

At block 3708, the robot may be localized within the robot's working space. Input from at least one of the left camera, the right camera, light detecting and ranging (LIDAR) sensors, and inertial measurement unit (IMU) sensors may be used to determine a robot location. The robot's working space may be mapped to create a global area map that includes the scale invariant keypoints, the objects, and the starting locations of the objects. The objects within the robot's working space may be re-identified at block 3710 based on at least one of the starting locations, the categories, and the re-identification fingerprints. Each object may be assigned a persistent unique identifier at block 3712.

At block 3714, the robots may receive a camera frame from an augmented reality robotic interface installed as an application on a mobile device operated by a user, and may update the global area map with the starting locations and scale invariant keypoints using a camera frame to global area map transform based on the camera frame. In the camera frame to global area map transform, the global area map may be searched to find a set of scale invariant keypoints that match the those detected in the mobile camera frame by using a specific geometric transform. This transform may maximize the number of matching keypoints and minimize the number of non-matching keypoints while maintaining geometric consistency.

At block 3716, user indicators may be generated for objects, wherein user indicators may include next target, target order, dangerous, too big, breakable, messy, and blocking travel path. The global area map and object details may be transmitted to the mobile device at block 3718, wherein object details may include at least one of visual snapshots, the categories, the starting locations, the persistent unique identifiers, and the user indicators of the objects. This information may be transmitted using wireless signaling such as BlueTooth or Wifi, as supported by the communications 134 module introduced in FIG. 1C and the network interface 1912 introduced in FIG. 19.

The updated global area map, the objects, the starting locations, the scale invariant keypoints, and the object details, may be displayed on the mobile device using the augmented reality robotic interface. The augmented reality robotic interface may accept user inputs to the augmented reality robotic interface, wherein the user inputs indicate object property overrides including change object type, put away next, don't put away, and modify user indicator, at block 3720. The object property overrides may be transmitted from the mobile device to the robot, and may be used at block 3722 to update the global area map, the user indicators, and the object details. Returning to block 3718, the robot may re-transmit its updated global area map to the mobile device to resynchronize this information.

Figure 38:
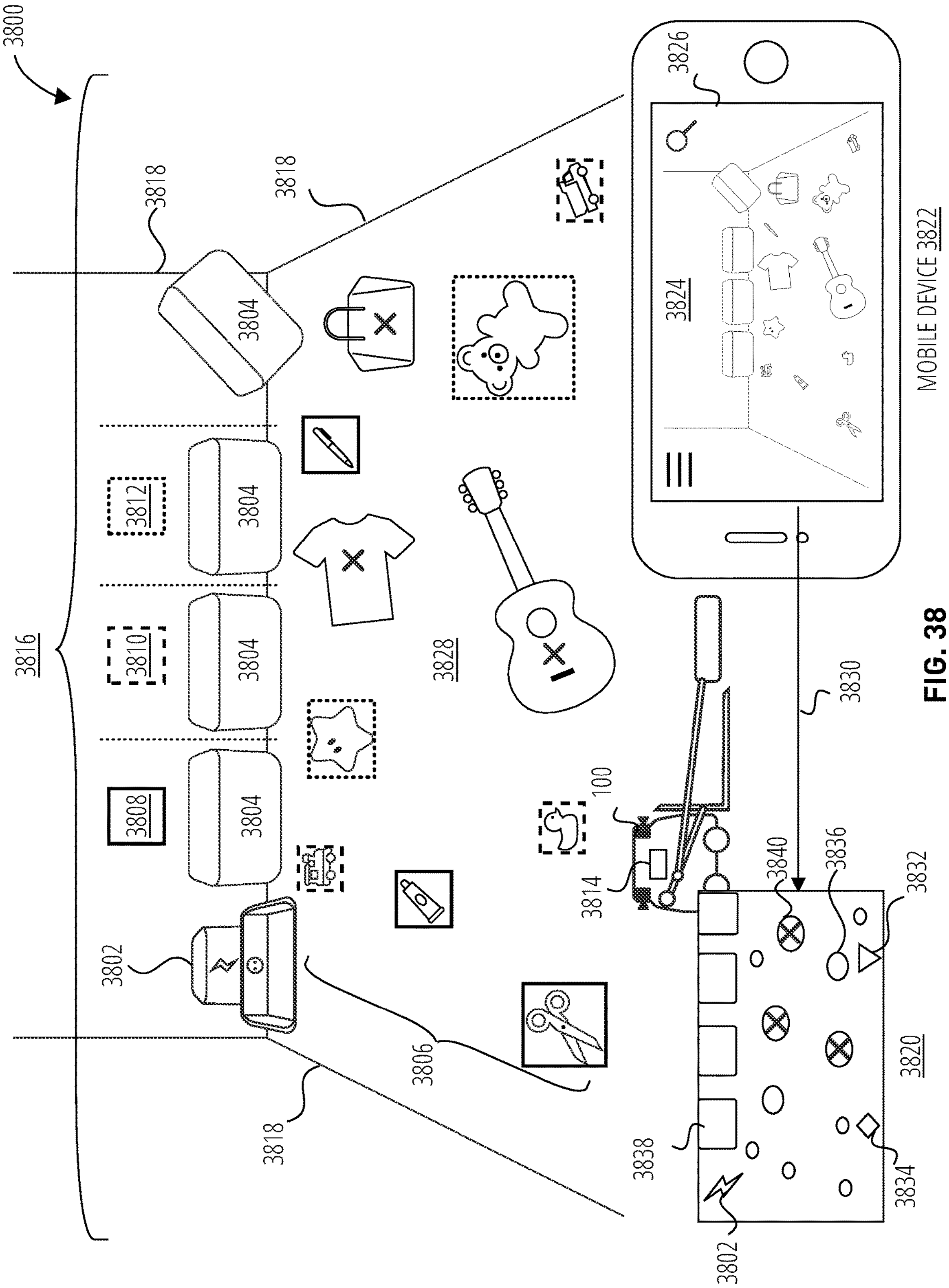
FIG. 38 illustrates a robotic system 3800 in accordance with one embodiment.

FIG. 38 illustrates a robotic system 3800 in accordance with one embodiment. The robotic system 3800 may include a robot 100, a charging station 3802, a plurality of destination bins 3804 where objects 3806 may be placed, each associated with at least one object category, such as object category 3808, object category 3810, and object category 3812, and logic 3814 that allows the robot 100 to perform the disclosed methods. The robot 100, charging station 3802, objects 3806, and destination bins 3804 may be located in an area that may be considered the robot's working space 3816.

The robot 100 may use its sensors and cameras illustrated in FIG. 1C and FIG. 1D to detect the features of a robot's working space 3816. These features may include scale invariant keypoints 3818, such as walls, corners, furniture, etc. The robot 100 may also detect objects 3806 on the floor of the robot's working space 3816 and destination bins 3804 where those objects 3806 may be placed based on categories the robot 100 may determine based on user input, recognition of similarity to objects handled in the past, machine learning, or some combination of these. The robot 100 may use its sensors and cameras to localize itself within the robot's working space 3816 as well. The robot 100 may synthesize all of this data into a global area map 3820 as described with regard to FIG. 37.

In one embodiment, the robotic system 3800 may also include a mobile device 3822 with an augmented reality robotic interface application 3824 installed and the ability to provide a camera frame 3826. The robotic system 3800 may include a user in possession of a mobile device 3822 such as a tablet or a smart phone. The mobile device 3822 may have an augmented reality robotic interface application 3824 installed that functions in accordance with the present disclosure. The augmented reality robotic interface application 3824 may provide a camera frame 3826 using a camera configured as part of the mobile device 3822. The camera frame 3826 may include a ground plane 3828 that may be identified and used to localize the mobile device 3822 within the robotic system 3800 such that information regarding the robot's working space 3816 detected by the robot 100 may be transformed according camera frame to global area map transform 3830 to allow the robot 100 and the mobile device 3822 to stay synchronized with regard to the objects 3806 in the robot's working space 3816 and user indicators and object property overrides that may be attached to those objects 3806.

The global area map 3820 may be a top-down two-dimensional representation of the robot's working space 3816 in one embodiment. The global area map 3820 may undergo a camera frame to global area map transform 3830 such that the information detected by the robot 100 may be represented in the augmented reality robotic interface application 3824 from a user's point of view. The global area map 3820 may be updated to include the mobile device location 3832, the robot location 3834, object starting locations 3836, and object drop locations 3838. In one embodiment, the global area map 3820 may identify furniture or other objects 3806 as obstacles 3840. Objects 3806 other than the target object currently under consideration by the 100 may be considered obstacles 3840 during that phase of pickup. In one embodiment, the augmented reality robotic interface application 3824 may also show the mobile device location 3832 and robot location 3834, those these are not indicated in the present illustration.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed field programmable gate array (FPGA), for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A method comprising:

receiving a starting location and attributes of a target object to be lifted by a robot, the robot comprising a robotic control system, a shovel, grabber pad arms with grabber pads to open and close across a front end of the shovel at a front end of the robot, and at least one wheel or one track for mobility of the robot, wherein the grabber pad arms with the grabber pads include a first grabber pad coupled to a first grabber pad arm at a first pad pivot point adjacent to a first front side of the shovel and a second grabber pad coupled to a second grabber pad arm at a second pad pivot point adjacent to a second front side of the shovel, wherein the first grabber pad arm and the second grabber pad arm are telescoping grabber pad arms comprising linear actuators configured to extend and retract to increase and decrease in length, and wherein the first pad pivot point allows the first grabber pad to open and close across the first front side of the shovel and the second pad pivot point allows the second grabber pad to open and close across the second front side of the shovel;

determining an object isolation strategy, including at least one of using a reinforcement learning based strategy including rewards and penalties, a rules based strategy, relying upon observations, current object state, and sensor data, wherein the object isolation strategy comprises actions performable by the robot to separate the target object from another object;

executing the object isolation strategy to separate the target object from another object;

determining a pickup strategy, including:

an approach path for the robot to the target object;

a grabbing height for initial contact with the target object;

a grabbing pattern for movement of the grabber pads while capturing the target object, the grabbing pattern including an opening and closing action of the grabber pads; and a carrying position of the grabber pads and the shovel that secures the target object in a containment area on the robot for transport, the containment area including at least two of the grabber pad arms, the grabber pads, and the shovel, wherein the containment area is configured to capture the target object using coordinated contact with both grabber pads and the shovel;

executing the pickup strategy, including:

extending the grabber pads out and forward with respect to the shovel by extending the linear actuators of the telescoping grabber pad arms, wherein extending the telescoping grabber pad arms positions the grabber pads forward of the shovel to expand a forward boundary of the containment area prior to closing of the grabber pads, and raising the grabber pads to the grabbing height;

approaching the target object via the approach path, coming to a stop when the target object is positioned between the grabber pads;

executing the grabbing pattern to allow capture of the target object within the containment area; and confirming the target object is within the containment area;

on condition that the target object is within the containment area:

exerting pressure on the target object with the grabber pads to hold the target object stationary in the containment area; and raising at least one of the shovel and the grabber pads, holding the target object, to the carrying position; and on condition that the target object is not within the containment area:

altering the pickup strategy with at least one of a different reinforcement learning based strategy, a different rules based strategy, and relying upon different observations, current object state, and sensor data, wherein altering the pickup strategy comprises modifying, based on confirming that the target object is not within the containment area, at least one of:

an extension length of the telescoping grabber pad arms;

a timing of extension relative to closing; and a degree of forward projection of the grabber pads beyond the shovel; and executing the altered pickup strategy.

2. The method of claim 1, further comprising:

navigating to a drop location at a destination;

determining a drop strategy using a machine learning model or a rules based approach; and executing the drop strategy, including:

determining a destination approach path and an object deposition pattern, wherein the object deposition pattern is one of a dropping pattern and a placing pattern; and approaching the destination via the destination approach path;

on condition that the object deposition pattern is the placing pattern:

coming to a stop with the destination in front of the shovel and the grabber pads;

lowering the shovel and the grabber pads to a deposition height; and performing at least one of:

using the grabber pads to push the target object out of the containment area and into the drop location; and tilting the shovel forward allowing the target object to fall out of the containment area and into the drop location; and on condition that the object deposition pattern is the dropping pattern:

coming to a stop with the destination behind the shovel and the grabber pads;

raising the shovel and the grabber pads to the deposition height; and extending the grabber pads and allowing the target object to drop out of the containment area and into the drop location.

3. The method of claim 2, wherein the rules based strategy for the drop strategy includes at least one of:

navigating the robot to a position in close proximity to a side of a bin;

turning the robot in place to align it facing the bin;

driving the robot toward the bin maintaining an alignment centered on the side of the bin;

stopping a short distance from the side of the bin;

navigating with a rear camera if attempting a back drop;

navigating with a front camera if attempting a forward drop; and verifying that the robot is correctly positioned against the side of the bin;

on condition the robot is correctly positioned, performing at least one of:

lifting the shovel up and back to drop the target object into the bin; and lifting the shovel up and tilting the shovel forward to drop the target object into the bin; and on condition the robot is not correctly positioned:

driving away from the bin and re-executing the drop strategy.

4. The method of claim 2, wherein the rewards and penalties for executing the drop strategy include at least one of:

a penalty added for every second beyond a maximum time;

a reward when the robot correctly docks against a storage bin;

a reward when the target object is successfully dropped into the storage bin;

a penalty for a collision that moves the storage bin;

a penalty for a collision with an obstacle or wall exceeding a force feedback maximum; and a penalty if the robot gets stuck or drives over the target object.

5. The method of claim 1, wherein the rewards and penalties for executing the object isolation strategy include at least one of:

a penalty added for every second beyond a maximum time;

a reward when a correct grabber pad arm is in-between the target object and a wall;

a reward when a target object distance from the wall exceeds a predetermined distance;

a penalty for incorrectly colliding with the target object;

a penalty for collision with an obstacle or wall exceeding a force feedback maximum; and a penalty if the robot gets stuck or drives over the target object.

6. The method of claim 1, wherein the rewards and penalties for executing the pickup strategy include at least one of:

a penalty added for every second beyond a maximum time;

a reward when the target object first touches edge of the shovel;

a reward when the target object is pushed fully into the shovel;

a penalty when the target object is lost from the shovel;

a penalty for collision with an obstacle or wall exceeding a force feedback maximum;

a penalty for picking up a non-target object; and a penalty if the robot gets stuck or drives over the target object.

7. The method of claim 1, wherein rules based strategies for object isolation include at least one of:

navigating the robot to a position facing a target object to be isolated, but far enough away to open the grabber pad arms and the grabber pads and lower the shovel;

opening the grabber pad arms and the grabber pads, lowering the grabber pad arms and the grabber pads, and lowering the shovel;

turning the robot slightly in-place so that the target object is centered in a front view;

opening the grabber pad arms and the grabber pads to be slightly wider than the target object;

driving forward slowly until an end of the grabber pad arms and the grabber pads is positioned past the target object;

slightly closing the grabber pad arms and the grabber pads into a V-shape so that the grabber pad arms and the grabber pads surround the target object; and driving backwards a short distance, thereby moving the target object into an open space.

8. The method of claim 1, further comprising evaluating target object pickup success, including at least one of:

detecting the target object within the containment area of the shovel and the grabber pad arms to determine if the target object is within the containment area;

receiving force feedback from actuator force feedback sensors indicating that the target object is retained by the grabber pad arms;

tracking motion of the target object during pickup into an area of the shovel and retaining a state of that target object in a memory;

detecting an increased weight of the shovel during lifting the target object indicating the target object is in the shovel;

utilizing a classification model to determine if the target object is in the shovel; and using at least one of the force feedback, the increased weight, and a dedicated camera to re-check that the target object is in the shovel while the robot is in motion.

9. The method of claim 1, wherein reinforcement learning strategies and rules based strategies include actions controlling individual actuators comprising at least one of:

moving a left grabber pad arm to a new position by rotating up or down;

moving a left grabber pad wrist to a new position by rotating left or right;

moving a right grabber pad arm to a new position by rotating up or down;

moving a right grabber pad wrist to a new position by rotating left or right;

lifting the shovel to a new position by rotating up or down;

changing a shovel angle with a second motor or second actuator resulting in target object front dropping;

driving a left wheel or a left track on the robot; and driving a right wheel or a right track on the robot.

10. The method of claim 1, wherein reinforcement learning strategies and rules based strategies include composite actions controlling actuators comprising at least one of:

driving the robot following a path to a position or a waypoint;

turning the robot in place left or right;

centering the robot with respect to the target object;

aligning the grabber pad arms with the target object's top or bottom or middle section;

driving forward until the target object is against an edge of the shovel;

closing both of the grabber pad arms and pushing the target object with a smooth motion;

lifting the shovel and the grabber pad arms together while grasping the target object;

closing both of the grabber pad arms and pushing the target object with a quick tap and a slight release;

setting the shovel lightly against the floor;

pushing the shovel down against the floor;

closing the grabber pad arms until resistance is encountered and holding that position; and closing the grabber pad arms with vibration and left or right turning to create instability and slight bouncing of flat target objects over the edge of the shovel.

11. A robotic system comprising:

a robot including:

a shovel;

grabber pad arms with grabber pads to open and close across a front end of the shovel at a front end of the robot, wherein the grabber pad arms with the grabber pads include a first grabber pad coupled to a first grabber pad arm at a first pad pivot point adjacent to a first front side of the shovel and a second grabber pad coupled to a second grabber pad arm at a second pad pivot point adjacent to a second front side of the shovel, wherein the first grabber pad arm and the second grabber pad arm are telescoping grabber pad arms comprising linear actuators configured to extend and retract to increase and decrease in length, and wherein the first pad pivot point allows the first grabber pad to open and close across the first front side of the shovel and the second pad pivot point allows the second grabber pad to open and close across the second front side of the shovel;

at least one wheel or one track for mobility of the robot;

a processor; and a memory storing instructions that, when executed by the processor, allow operation and control of the robot;

a base station;

a plurality of bins storing objects;

a robotic control system in at least one of the robot and a cloud server; and logic, to:

receive a starting location and attributes of a target object to be lifted by the robot;

determine an object isolation strategy, including at least one of using a reinforcement learning based strategy including rewards and penalties, a rules based strategy, relying upon observations, current object state, and sensor data, wherein the object isolation strategy comprises actions performable by the robot to separate the target object from another object;

execute the object isolation strategy to separate the target object from another object;

determine a pickup strategy, including:

an approach path for the robot to the target object;

a grabbing height for initial contact with the target object;

a grabbing pattern for movement of the grabber pads while capturing the target object, the grabbing pattern including an opening and closing motion of the grabber pads; and a carrying position of the grabber pads and the shovel that secures the target object in a containment area on the robot for transport, the containment area includes at least two of the grabber pad arms, the grabber pads, and the shovel, wherein the containment area is configured to capture the target object using coordinated contact with both grabber pads and the shovel;

execute the pickup strategy, including:

extend the grabber pads out and forward with respect to the shovel by extending the linear actuators of the telescoping grabber pad arms, wherein extending the telescoping grabber pad arms positions the grabber pads forward of the shovel to expand a forward boundary of the containment area prior to closing of the gragger pads, and raising the grabber pads to the grabbing height;

approach the target object via the approach path, coming to a stop when the target object is positioned between the grabber pads;

execute the grabbing pattern to allow capture of the target object within the containment area; and confirm the target object is within the containment area;

on condition that the target object is within the containment area:

exert pressure on the target object with the grabber pads to hold the target object stationary in the containment area; and raise at least one of the shovel and the grabber pads, holding the target object, to the carrying position;

on condition that the target object is not within the containment area:

alter the pickup strategy with at least one of a different reinforcement learning based strategy, a different rules based strategy, and relying upon different observations, current object state, and sensor data, wherein altering the pickup strategy comprises modifying, based on confirming that the target object is not within the containment area, at least one of:

an extension length of the telescoping grabber pad arms;

a timing of extension relative to closing; and a degree of forward projection of the grabber pads beyond the shovel; and execute the altered pickup strategy.

12. The robotic system of claim 11, further comprising logic to:

navigate to a drop location at a destination;

determine a drop strategy using a machine learning model or a rules based approach;

execute the drop strategy, including:

determine a destination approach path and an object deposition pattern, wherein the object deposition pattern is one of a dropping pattern and a placing pattern; and approach the destination via the destination approach path;

on condition that the object deposition pattern is the placing pattern:

come to a stop with the destination in front of the shovel and the grabber pads;

lower the shovel and the grabber pads to a deposition height; and perform at least one of:

using the grabber pads to push the target object out of the containment area and into the drop location; and tilting the shovel forward allowing the target object to fall out of the containment area and into the drop location; and on condition that the object deposition pattern is the dropping pattern:

come to a stop with the destination behind the shovel and the grabber pads;

raise the shovel and the grabber pads to the deposition height; and extend the grabber pads and allow the target object to drop out of the containment area and into the drop location.

13. The robotic system of claim 12, wherein the rules based strategy for the drop strategy includes at least one of:

navigate the robot to a position in close proximity to a side of a bin;

turn the robot in place to align it facing the bin;

drive the robot toward the bin maintaining an alignment centered on the side of the bin;

stop a short distance from the side of the bin;

navigate with a rear camera if attempting a back drop;

navigate with a front camera if attempting a forward drop; and verify that the robot is correctly positioned against the side of the bin;

on condition the robot is correctly positioned, perform at least one of:

lift the shovel up and back to drop the target object into the bin; and lift the shovel up and tilt the shovel forward to drop the target object into the bin; and on condition the robot is not correctly positioned:

drive away from the bin and re-execute the drop strategy.

14. The robotic system of claim 12, wherein the rewards and penalties for executing the drop strategy include at least one of:

a penalty added for every second beyond a maximum time;

a reward when the robot correctly docks against a storage bin;

a reward when the target object is successfully dropped into the storage bin;

a penalty for a collision that moves the storage bin;

a penalty for a collision with an obstacle or wall exceeding a force feedback maximum; and a penalty if the robot gets stuck or drives over the target object.

15. The robotic system of claim 11, wherein the rewards and penalties for executing the object isolation strategy include at least one of:

a penalty added for every second beyond a maximum time;

a reward when a correct grabber pad arm is in-between the target object and a wall;

a reward when a target object distance from the wall exceeds a predetermined distance;

a penalty for incorrectly colliding with the target object;

a penalty for collision with an obstacle or wall exceeding a force feedback maximum; and a penalty if the robot gets stuck or drives over the target object.

16. The robotic system of claim 11, wherein the rewards and penalties for executing the pickup strategy include at least one of:

a penalty added for every second beyond a maximum time;

a reward when the target object first touches edge of the shovel;

a reward when the target object is pushed fully into the shovel;

a penalty when the target object is lost from the shovel;

a penalty for collision with an obstacle or wall exceeding a force feedback maximum;

a penalty for picking up a non-target object; and a penalty if the robot gets stuck or drives over the target object.

17. The robotic system of claim 11, wherein rules based strategies for object isolation include at least one of:

navigating the robot to a position facing a target object to be isolated, but far enough away to open the grabber pad arms and the grabber pads and lower the shovel;

opening the grabber pad arms and the grabber pads, lowering the grabber pad arms and the grabber pads, and lowering the shovel;

turning the robot slightly in-place so that the target object is centered in a front view;

opening the grabber pad arms and the grabber pads to be slightly wider than the target object;

driving forward slowly until an end of the grabber pad arms and the grabber pads is positioned past the target object;

slightly closing the grabber pad arms and the grabber pads into a V-shape so that the grabber pad arms and the grabber pads surround the target object; and driving backwards a short distance, thereby moving the target object into an open space.

18. The robotic system of claim 11, further comprising logic to evaluate target object pickup success, including at least one of:

detecting the target object within the containment area of the shovel and the grabber pad arms to determine if the target object is within the containment area;

receiving force feedback from actuator force feedback sensors indicating that the target object is retained by the grabber pad arms;

tracking motion of the target object during pickup into an area of the shovel and retaining a state of that target object in the memory;

detecting an increased weight of the shovel during lifting the target object indicating the target object is in the shovel;

utilizing a classification model to determine if the target object is in the shovel; and using at least one of the force feedback, the increased weight, and a dedicated camera to re-check that the target object is in the shovel while the robot is in motion.

19. The robotic system of claim 11, wherein reinforcement learning strategies and rules based strategies include actions controlling individual actuators comprising at least one of:

moving a left grabber pad arm to a new position by rotating up or down;

moving a left grabber pad wrist to a new position by rotating left or right;

moving a right grabber pad arm to a new position by rotating up or down;

moving a right grabber pad wrist to a new position by rotating left or right;

lifting the shovel to a new position by rotating up or down;

changing a shovel angle with a second motor or second actuator resulting in target object front dropping;

driving a left wheel or a left track on the robot; and driving a right wheel or a right track on the robot.

20. The robotic system of claim 11, wherein reinforcement learning strategies and rules based strategies include composite actions controlling actuators comprising at least one of:

driving the robot following a path to a position or a waypoint;

turning the robot in place left or right;

centering the robot with respect to the target object;

aligning the grabber pad arms with the target object's top or bottom or middle section;

driving forward until the target object is against an edge of the shovel;

closing both of the grabber pad arms and pushing the target object with a smooth motion;

lifting the shovel and the grabber pad arms together while grasping the target object;

closing both of the grabber pad arms and pushing the target object with a quick tap and a slight release;

setting the shovel lightly against the floor;

pushing the shovel down against the floor;

closing the grabber pad arms until resistance is encountered and holding that position; and closing the grabber pad arms with vibration and left or right turning to create instability and slight bouncing of flat target objects over the edge of the shovel.

* * * * *